US012114365B2

(12) United States Patent
Mochizuki et al.

(10) Patent No.: US 12,114,365 B2
(45) Date of Patent: Oct. 8, 2024

(54) USER APPARATUS, BASE STATION AND COMMUNICATION SYSTEM

(71) Applicant: Mitsubishi Electric Corporation, Tokyo (JP)

(72) Inventors: Mitsuru Mochizuki, Tokyo (JP); Tadahiro Shimoda, Tokyo (JP); Noriyuki Fukui, Tokyo (JP); Daichi Uchino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/163,582

(22) Filed: Feb. 2, 2023

(65) Prior Publication Data

US 2023/0180304 A1 Jun. 8, 2023

Related U.S. Application Data

(63) Continuation of application No. 17/259,782, filed as application No. PCT/JP2019/030445 on Aug. 2, 2019, now abandoned.

(30) Foreign Application Priority Data

Aug. 7, 2018 (JP) .................................. 2018-148621

(51) Int. Cl.
*H04W 74/0833* (2024.01)
*H04W 56/00* (2009.01)
(Continued)

(52) U.S. Cl.
CPC ... *H04W 74/0833* (2013.01); *H04W 56/0045* (2013.01); *H04W 74/006* (2013.01); *H04W 76/34* (2018.02)

(58) Field of Classification Search
CPC .......... H04W 74/0833; H04W 74/006; H04W 56/0045; H04W 56/0015; H04W 76/34;
(Continued)

(56) References Cited

U.S. PATENT DOCUMENTS

2011/0158104 A1 6/2011 Frenger et al.
2013/0021979 A1 1/2013 Kwon et al.
(Continued)

FOREIGN PATENT DOCUMENTS

JP 2013-528968 A 7/2013
JP 2014-522602 A 9/2014
(Continued)

OTHER PUBLICATIONS

3GPP TSG-RAN WG2 #102, Tdoc R2-1807079, "MCG failure handling in case of NE-DC", Ericsson, May 2018. (Year: 2018).*
(Continued)

*Primary Examiner* — Ricardo H Castaneyra
(74) *Attorney, Agent, or Firm* — PROCOPIO, CORY, HARGREAVES & SAVITCH LLP

(57) ABSTRACT

A radio communication technology for enabling high reliability, a high transmission rate, and low power consumption is provided. A communication system includes a communication terminal and a base station. The base station includes a plurality of transmitter-receivers configured to perform radio communication with the communication terminal. The base station is configured to perform radio communication with the communication terminal by using a part or all of the plurality of transmitter-receivers. The communication terminal receives a downlink synchronization signal from at least one first transmitter-receiver to be newly connected, and establishes downlink synchronization with the at least one first transmitter-receiver by using the downlink synchronization signal. The communication terminal establishes
(Continued)

uplink synchronization with the at least one first transmitter-receiver through random access processing.

7 Claims, 53 Drawing Sheets

(51) Int. Cl.
    *H04W 74/00*         (2009.01)
    *H04W 76/34*         (2018.01)
(58) Field of Classification Search
    CPC ..... H04W 76/14; H04W 76/15; H04W 76/19;
              H04W 36/0069; H04W 88/06; H04W
                                88/085; Y02D 30/70
    See application file for complete search history.

(56) References Cited

U.S. PATENT DOCUMENTS

| | | | |
|---|---|---|---|
| 2013/0258862 A1 | 10/2013 | Dinan | |
| 2013/0258959 A1 | 10/2013 | Dinan | |
| 2014/0198655 A1 | 7/2014 | Ishii et al. | |
| 2015/0124787 A1 | 5/2015 | Dinan | |
| 2015/0133122 A1* | 5/2015 | Chen | H04W 76/15 |
| | | | 455/436 |
| 2016/0057800 A1 | 2/2016 | Ingale et al. | |
| 2017/0331577 A1* | 11/2017 | Parkvall | H04J 11/0079 |
| 2017/0359840 A1 | 12/2017 | Ly et al. | |
| 2018/0034515 A1 | 2/2018 | Guo et al. | |
| 2018/0367288 A1* | 12/2018 | Vrzic | H04W 36/22 |
| 2019/0045564 A1* | 2/2019 | Hayashi | H04L 5/001 |
| 2019/0045568 A1* | 2/2019 | Palat | H04W 76/27 |
| 2019/0159274 A1* | 5/2019 | Hong | H04W 28/082 |
| 2019/0289510 A1* | 9/2019 | Rugeland | H04W 36/302 |
| 2019/0356536 A1* | 11/2019 | Lee | H04L 41/0654 |
| 2020/0413470 A1* | 12/2020 | Yang | H04W 36/0055 |
| 2021/0127447 A1* | 4/2021 | Zhang | H04W 80/02 |

FOREIGN PATENT DOCUMENTS

| | | |
|---|---|---|
| JP | 2016-532391 A | 10/2016 |
| JP | 2018-29333 A | 2/2018 |
| WO | WO 2012/166975 A1 | 12/2012 |
| WO | WO 2015/030483 A1 | 3/2015 |

OTHER PUBLICATIONS

International Search Report issued on Oct. 21, 2019 in PCT/JP2019/030445 filed on Aug. 2, 2019, citing documents 1-4 and 13-18 therein, 2 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.2.0, Jun. 2018, 357 total pages.
"LS on HNB/HeNB Open Access Mode," 3GPP TSG-SA1 #42, S1-083461, Oct. 2008, 2 total pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.2.0, Mar. 2017, 105 total pages.
"3rd Generation Partnership Project; Technical Specification Group Radio Access Network; Feasibility study for Further Advancements for E-UTRA (LTE-Advanced) (Release 15)," 3GPP TR 36.912 V15.0.0, Jun. 2018, 252 total pages.
"Scenarios, requirements and KPIs for 5G mobile and wireless system," METIS, ICT-317669-METIS/D1.1, Apr. 2013, 84 total pages.
"3rd Generation Partnership Project; Technical Specification Group Services and System Aspects; Study on Architecture for Next Generation System (Release 14)," 3GPP TR 23.799 V14.0.0, Dec. 2016, 522 total pages.
"3rd Generation Partnership Project; Technical Specification Group Radio Access Network; Study on new radio access technology: Radio access architecture and interfaces (Release 14)," 3GPP TR 38.801 V14.0.0, Mar. 2017, 91 total pages.
"3rd Generation Partnership Project; Technical Specification Group Radio Access Network; Study on New Radio Access Technology Physical Layer Aspects (Release 14)," 3GPP TR 38.802 V14.2.0, Sep. 2017, 144 total pages.
"3rd Generation Partnership Project; Technical Specification Group Radio Access Network; Study on New Radio Access Technology; Radio Interface Protocol Aspects (Release 14)," 3GPP TR 38.804 V14.0.0, Mar. 2017, 57 total pages.
"3rd Generation Partnership Project; Technical Specification Group Radio Access Network; Study on New Radio (NR) access technology (Release 14)," 3GPP TR 38.912 V14.1.0, Jun. 2017, 74 total pages.
"Revised WID on New Radio Access Technology," NTT DOCOMO, Inc., 3GPP TSG RAN Meeting #77, RP-172115, Sep. 2017, 47 total pages.
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.2.0, Jun. 2018, 55 total pages.
"3rd Generation Partnership Project; Technical Specification Group Radio Access Network; NR; Physical channels and modulation (Release 15)," 3GPP TS 38.211 V15.2.0, Jun. 2018, 93 total pages.
"3rd Generation Partnership Project; Technical Specification Group Radio Access Network; NR; Physical layer procedures for control (Release 15)." 3GPP TS 38.213 V15.2.0, Jun. 2018, 98 total pages.
"3rd Generation Partnership Project; Technical Specification Group Radio Access Network; NR; Physical layer procedures for data (Release 15)," 3GPP TS 38.214 V15.2.0, Jun. 2018, 95 total pages.
"3rd Generation Partnership Project; Technical Specification Group Radio Access Network; NR; NR and NG-RAN Overall Description; Stage 2 (Release 15)," 3GPP TS 38.300 V15.2.0, Jun. 2018, 87 total pages.
"3rd Generation Partnership Project; Technical Specification Group Radio Access Network; NR; Medium Access Control (MAC) protocol specification (Release 15)," 3GPP TS 38.321 V15.2.0, Jun. 2018, 73 total pages.
"3rd Generation Partnership Project; Technical Specification Group Radio Access Network; NR; Multiplexing and channel coding (Release 15)," 3GPP TS 38.212 V15.2.0, Jun. 2018, 94 total pages.
"5G architecture options—full set," Deutsche Telekom AG, 3GPP RP-161266, Jun. 2016, 11 total pages.
"WI Proposal on NR MIMO Enhancements," Samsung, 3GPP TSG RAN Meeting #80, RP-181453, Jun. 2018, 9 total pages.
"Support of SRBs for NE-DC and NGEN-DC," Ericsson, 3GPP TSG-RAN WG2 #102, R2-1807081, May 2018, 2 total pages.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.2.2, Jun. 2018, 791 total pages.
"DC based NR scheme for 0ms interruption handover," Huawei, HiSilicon, 3GPP TSG-RAN WG2 #101, R2-1802473, 2018, 7 total pages.
"3rd Generation Partnership Project; Technical Specification Group Radio Access Network; Study on LTE-based V2X Services; (Release 14)," 3GPP TR 36.885 V14.0.0, Jun. 2016, 216 total pages.
"Discussion on Replicated Transmissions over multiple carriers," CATT, 3GPP TSG-RAN WG2 Meeting #99, R2-1708062, Aug. 2017, 4 total pages.
"3rd Generation Partnership Project; Technical Specification Group Radio Access Network; NR; Radio Resource Control (RRC) protocol specification (Release 15)," 3GPP TS 38.331 V15.2.1, Jun. 2018, 303 total pages.
"Remaining details on multi-TRP transmission," Nokia, Nokia Shanghai Bell, 3GPP TSG RAN WG1#90, R1-1714239, Aug. 2017, 4 total pages.
Extended European Search Report issued Mar. 25, 2022 in European Patent Application No. 19847032.0, citing references 5-8 and 50 therein, 9 pages.

(56) References Cited

OTHER PUBLICATIONS

ETSI MCC, "Report of 3GPP TSG RAN WG2 meeting #75bis", 3GPP Draft; R2-116527_Report_RAN2_75BIS_ZHUHAI, $3^{rd}$ Generation Partnership Project (3GPP), 3GPP TSG-RAN Working Group 2 meeting #76, Mobile Compenence Centre; 650, Route Des Lucioles; F06921 Sophia-Antipolis Cedex; France, vol. TSG RAN, No. San Francisco, USA; Nov. 14, 2011-Nov. 18, 2011, Nov. 22, 2011 (Nov. 11, 2011), XP50564721, pp. 1-142.

Office Action issued in corresponding Indian Patent Application No. 202047054940 mailed Oct. 12, 2022 (with English translation).

Combine Chinese Office Action and Search Report issued on Jul. 11, 2023 in Chinese Patent Application No. 201980051617.7 (with English translation), 15 pages.

Japanese Office Action issued on Aug. 8, 2023 in Japanese Patent Application No. 2020-535727 (with English translation), citing document 25 therein, 6 pages.

Samsung, Message and procedure for providing RLC failure/ RLF information[online], 3GPP TSG-RAN WG2 NRAH 1807 R2-1810768, Internet <URL: http ://www.3gpp.org/ftp/tsg_ran/WG2_RL2/TSGR2_AHs/2018_07_NR/Docs/ R2-1810768.zip>, Jul. 8, 2018, 10 pages.

European Patent Office, Extended European Search Report, Application No. EP23183638, dated Oct. 25, 2023, in 12 pages.

Ericsson et al: "New WID on MR-DC enhancements (NR_MRDC_Enh)", 3GPP Draft; RP-181344 New Wid on MR-DC Enhancements, 3rd Generation Partnership Project (3GPP), Mobile Competence Centre ; 650, Route Des Lucioles; F-06921 Sophia-Antipolis Cedex; France, vol. TSG RAN, No. La Jolla, Ca, USA; Jun. 11, 2018-Jun. 14, 2018 Jun. 14, 2018 (Jun. 14, 2018), XP051511971, Retrieved from the Internet: URL: http://www.3gpp.org/ftp/tsg%5Fran/TSG%5FRAN/TSGR%5F80/Docs/RP%2DI81344%2Exip [retrieved on Jun. 14, 2018].

Ericsson: "RLM and RLF in case of LTE-NR tight interworking", 3GPP Draft; R2-1702711—RLM and RLF in LTE-NR Tight Interworking, 3rd Generation Partnership Project (3GPP), Mobile Competence Centre; 650, Route Des Lucioles; F-06921 Sophia-Antipolis Cedex; France, vol. RAN WG2, No. Spokane, USA; Feb. 3, 2017-Feb. 7, 2017, Apr. 3, 2017 (Apr. 3, 2017), XP051244704, Retrieved from the Internet: URL: http://www.3gpp.org/ftp/Meetings_3GPP_SYNC/RAN2/Docs [retrieved on Apr. 3, 2017].

Intel Corporation: "MCG SCG reconfiguration coordination and failure handling", 3GPP Draft; R2-1703429-JNT_S_FAIL-V2, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Mar. 27, 2017 (Mar. 27, 2017), XP051254667, Retrieved from the Internet: URL: http://www.3gpp.org/ftp/tsg_ran/WG2_RL2/TSGR2_97bis/Docs/ [retrieved on Mar. 27, 2017].

Japanese Patent Office, Office Action, Application No. JP2020-535727, dated Dec. 26, 2023, in 8 pages.

Intellectual Property Office of India, Hearing Notice in Indian Application No. 202047054940, dated Feb. 13, 2024, in 2 pages.

\* cited by examiner

F I G. 1
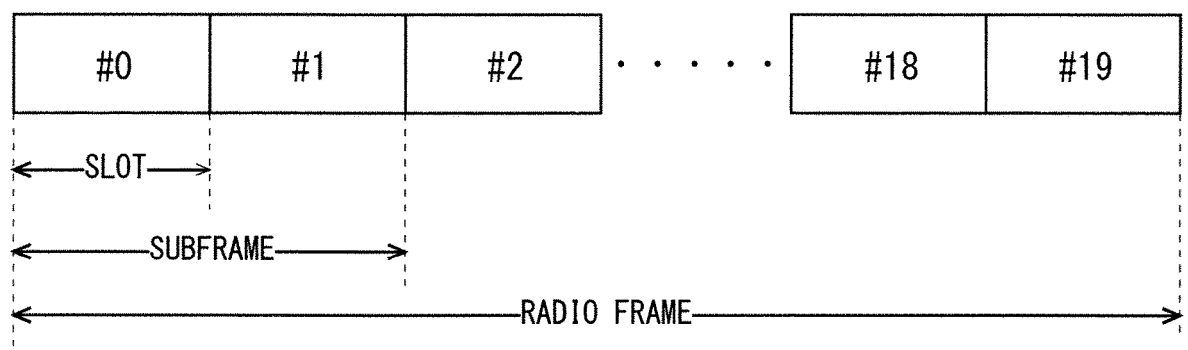

F I G. 5
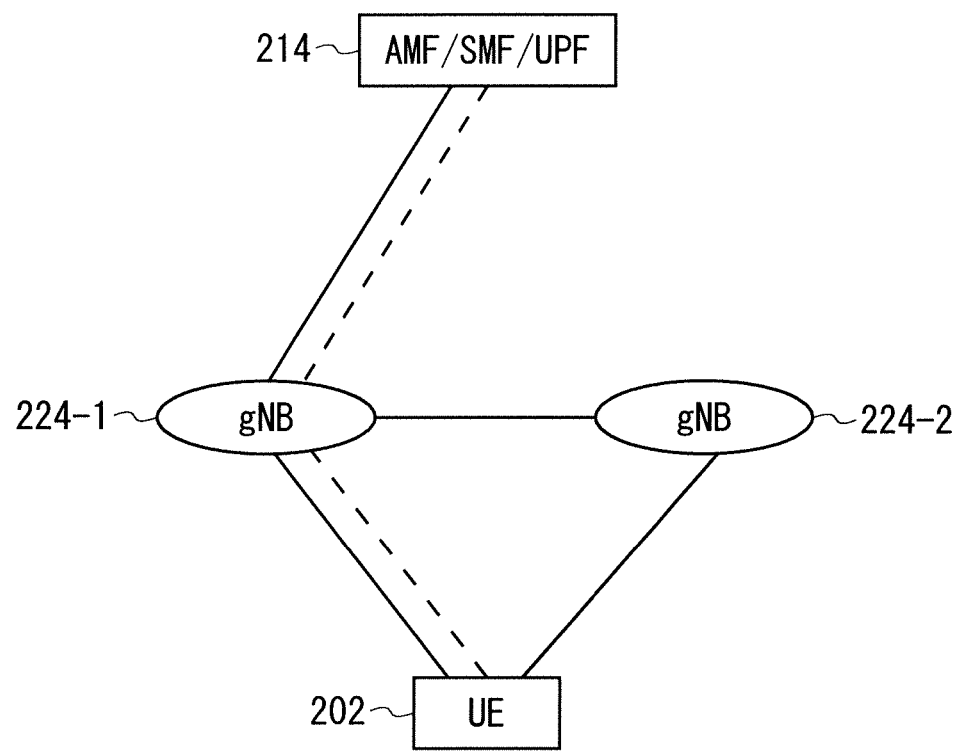

F I G. 7
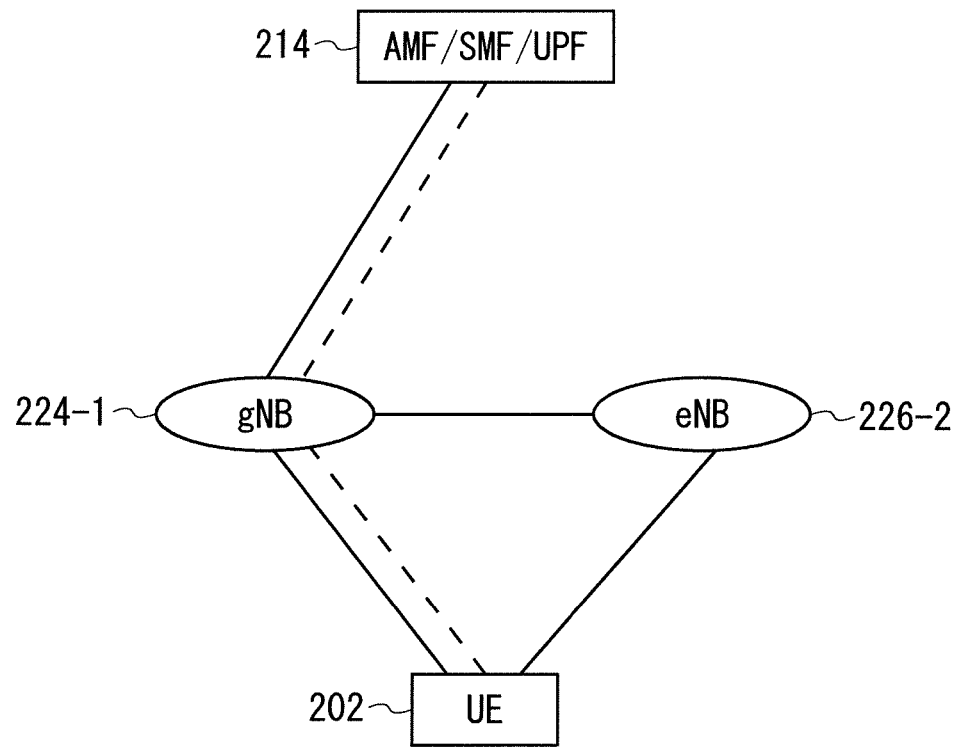

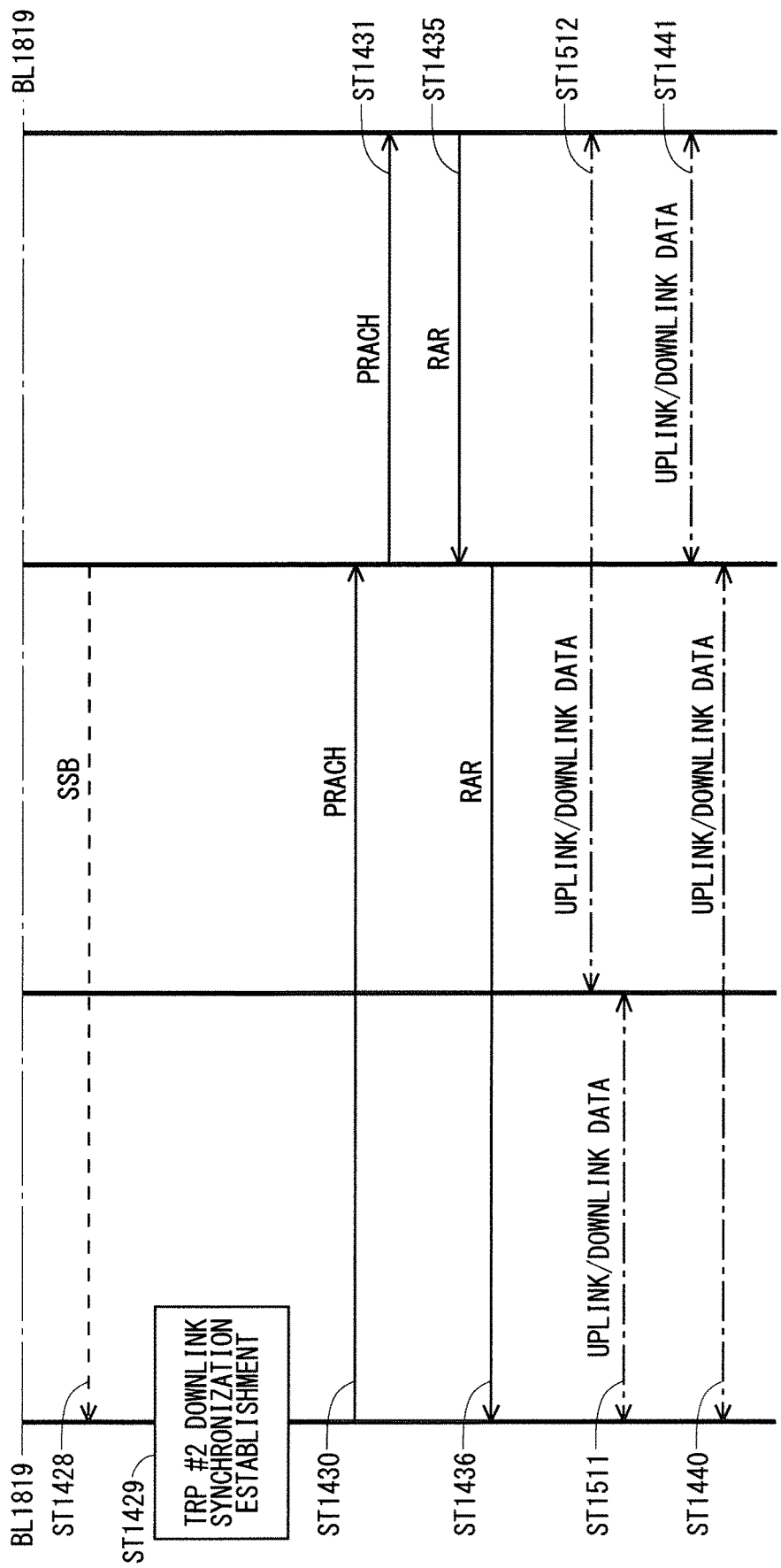
F I G. 19

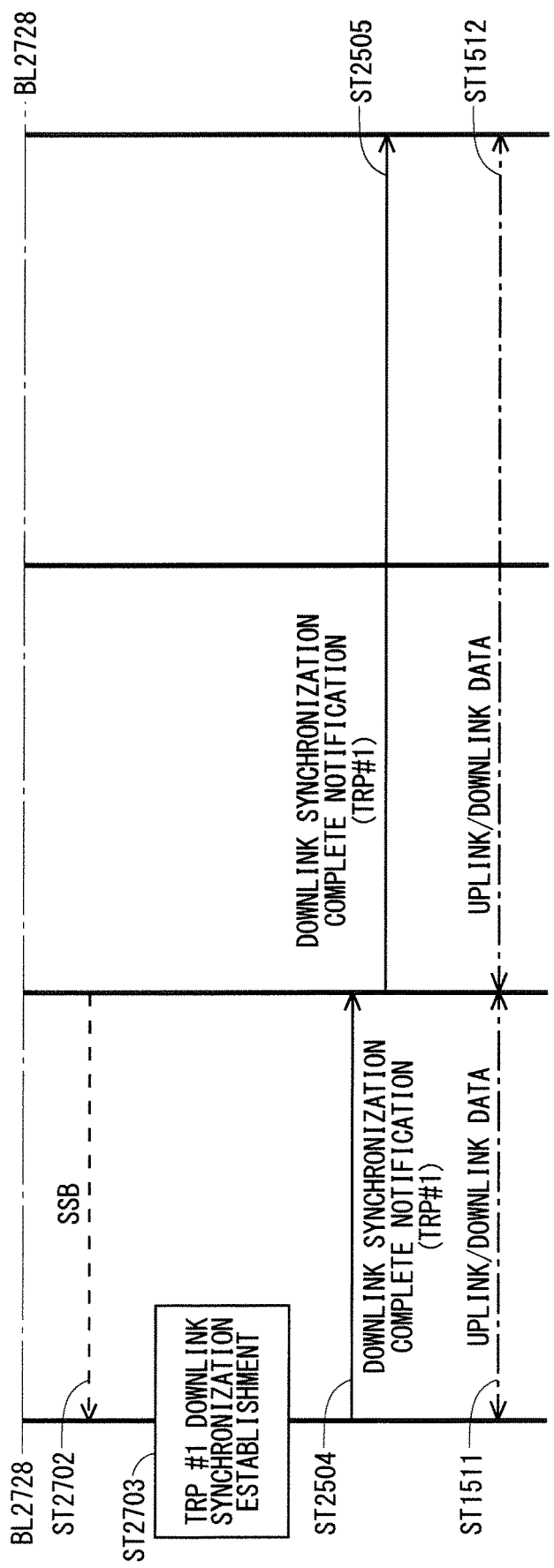
F I G. 28

F I G. 3 7
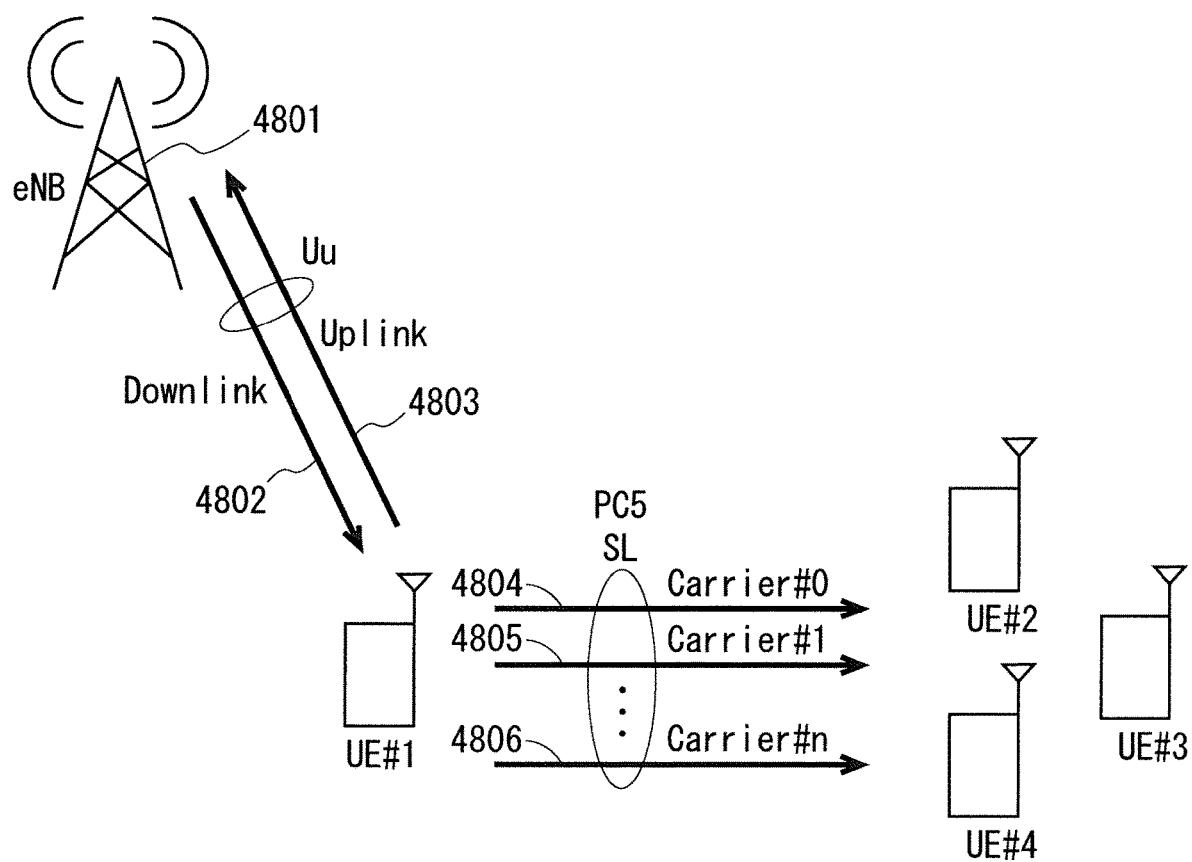

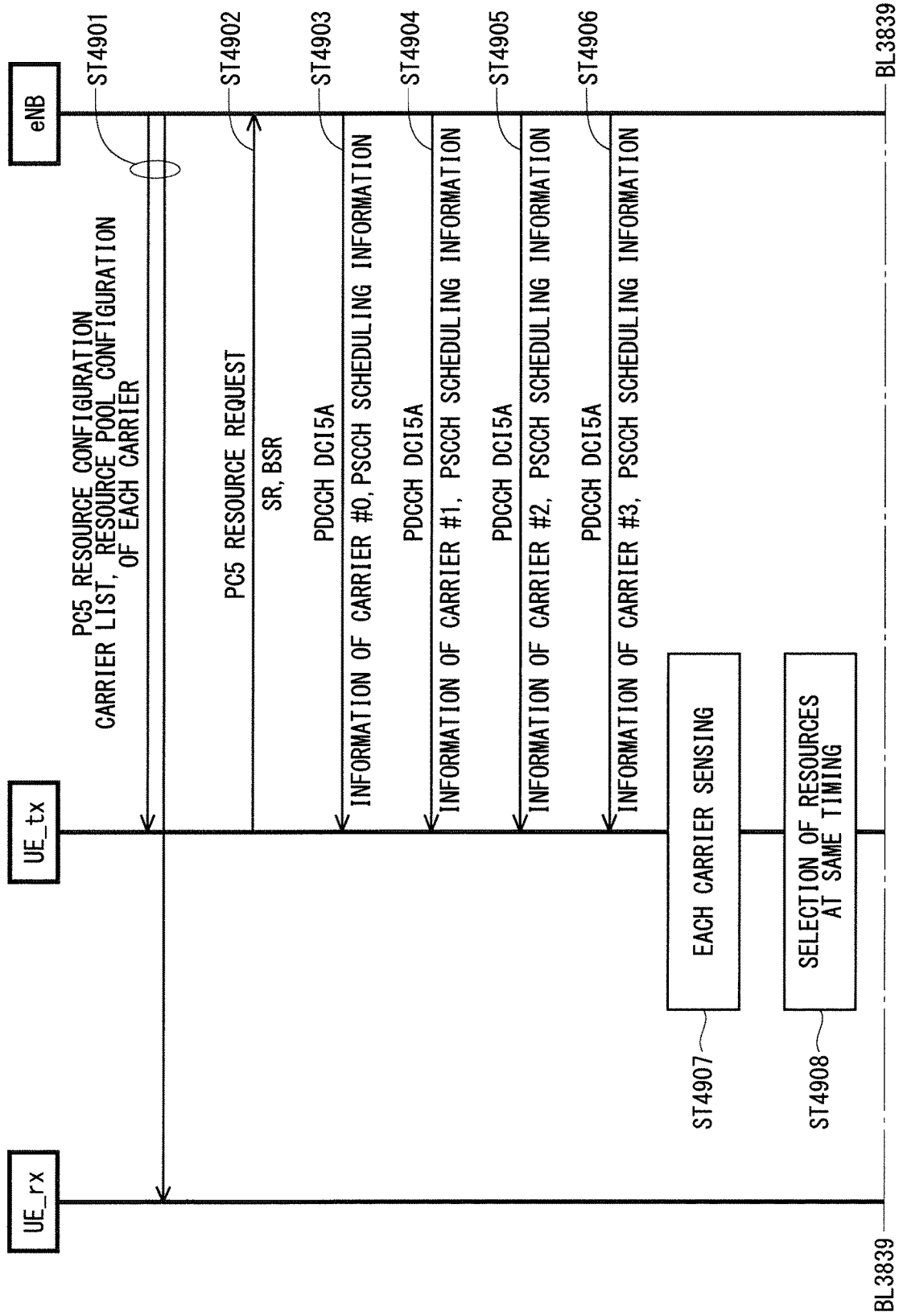
F I G. 3 8

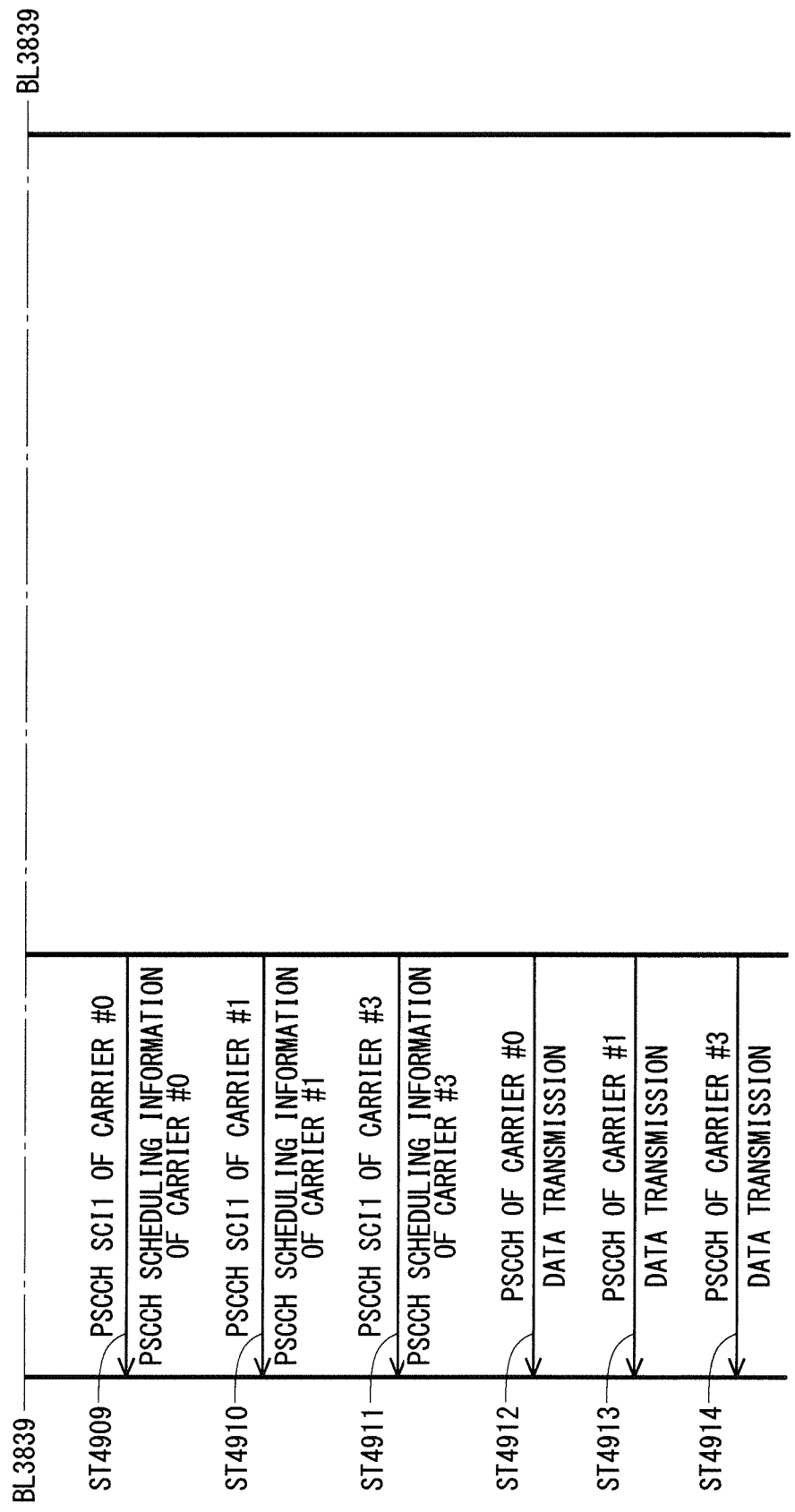

F I G. 4 1
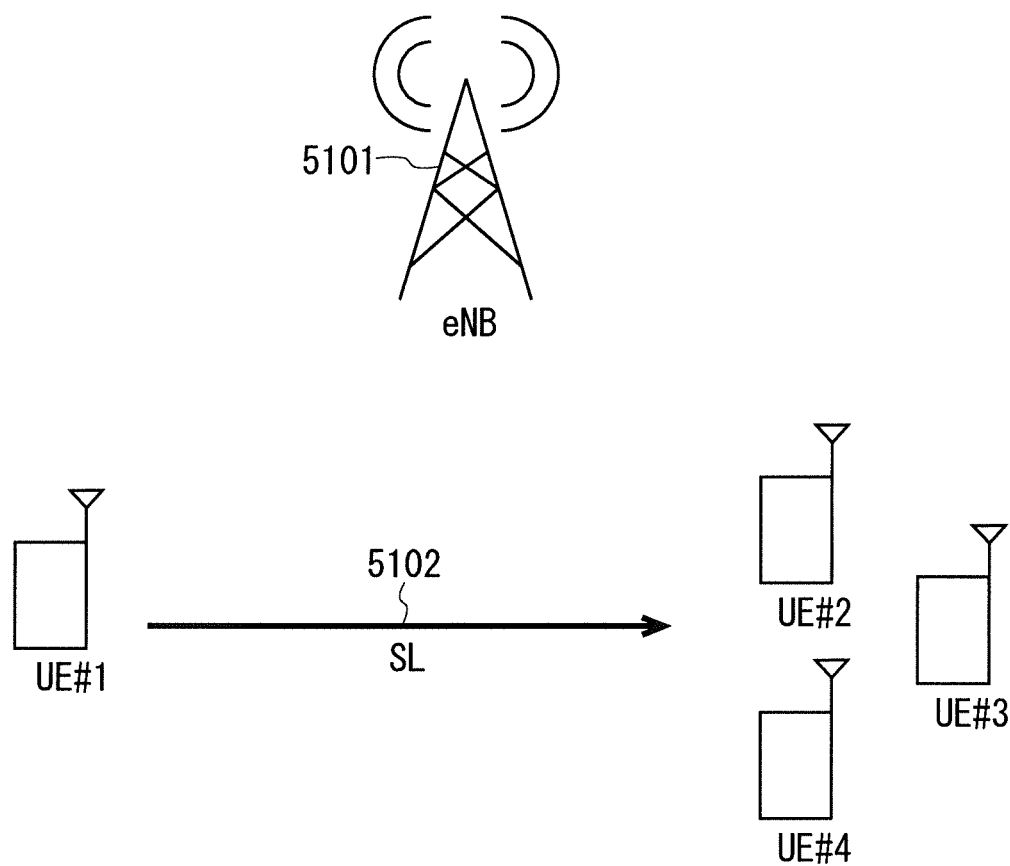

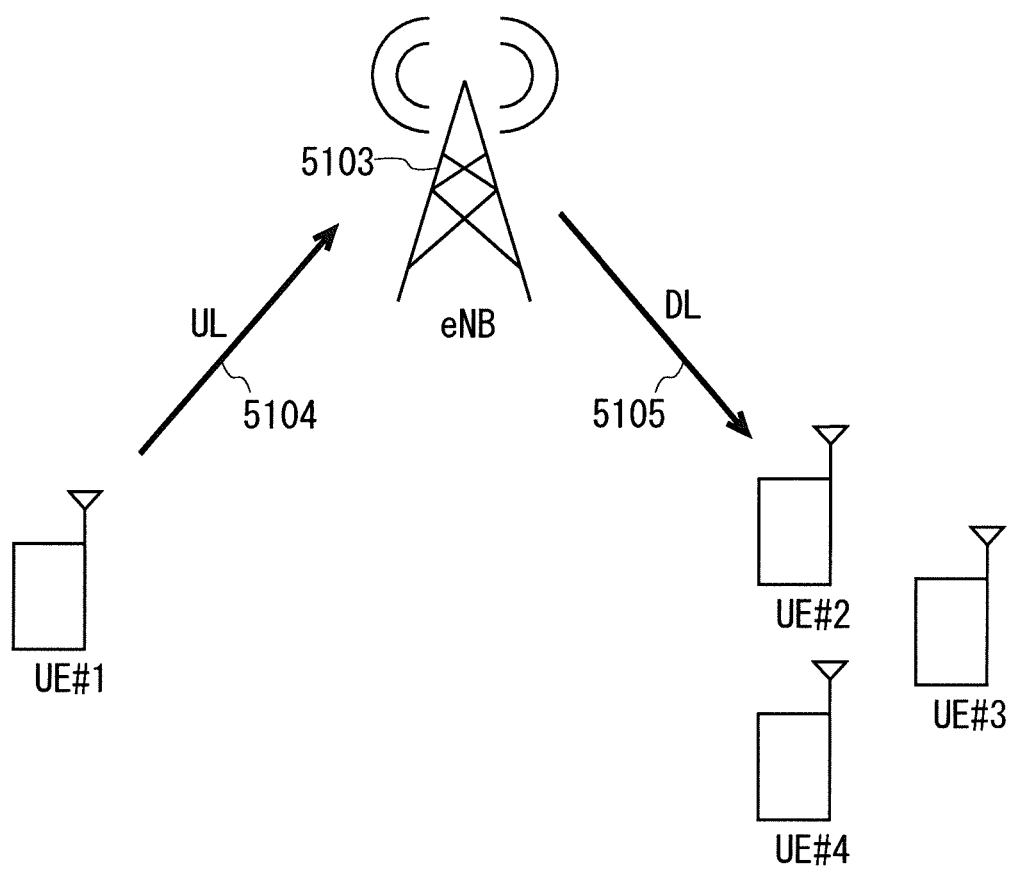
F I G. 4 2

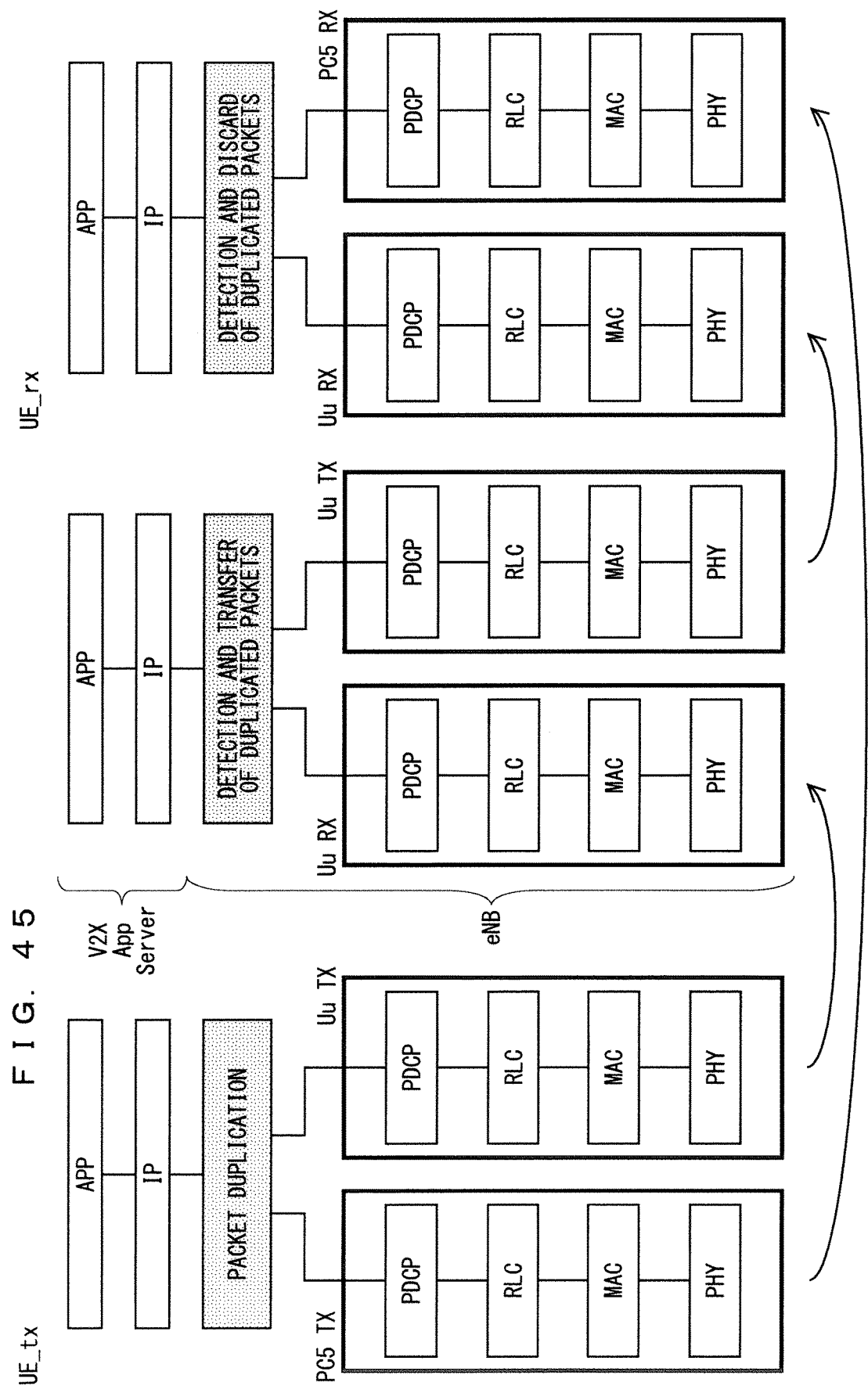
F I G. 4 5

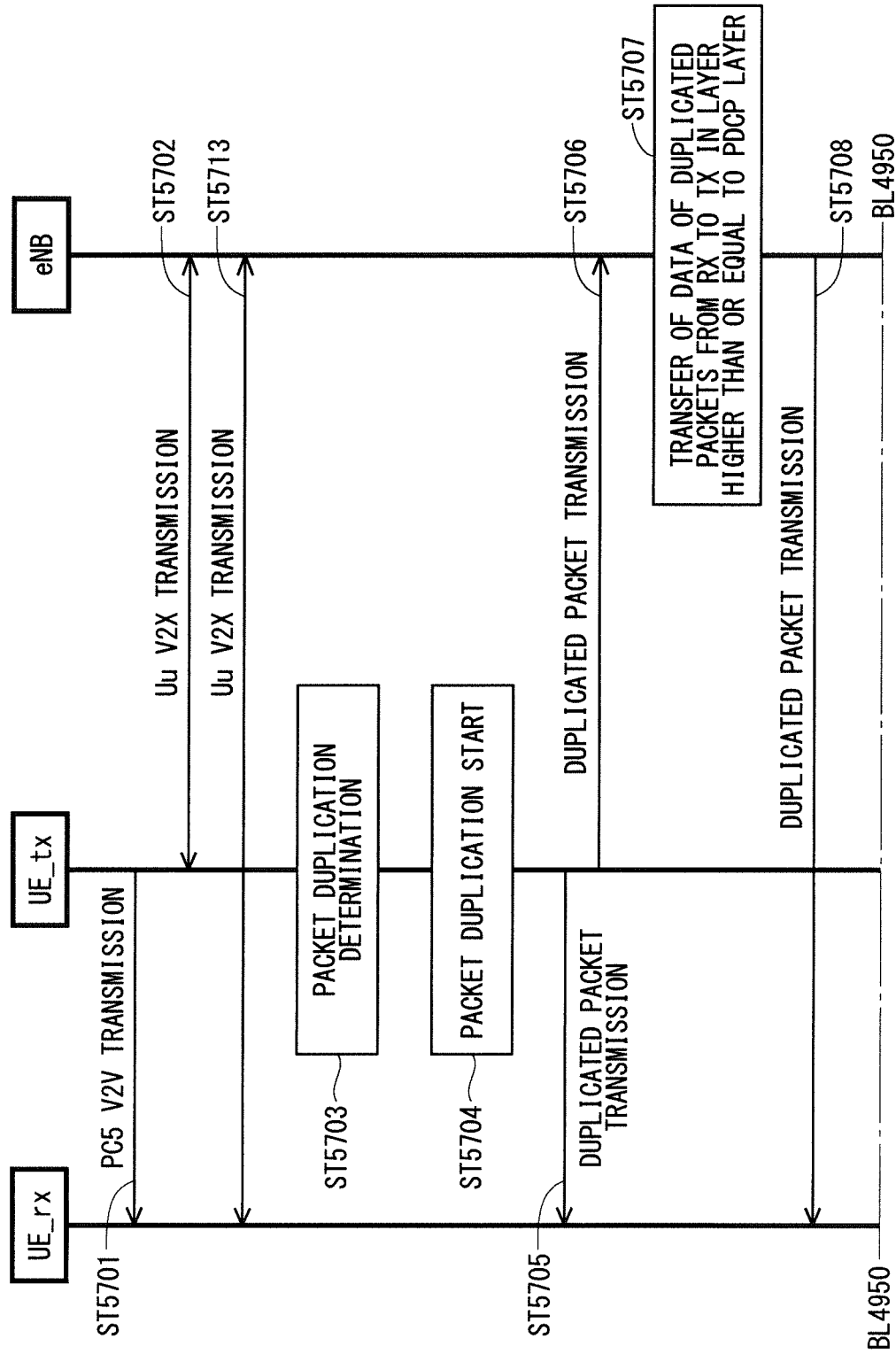

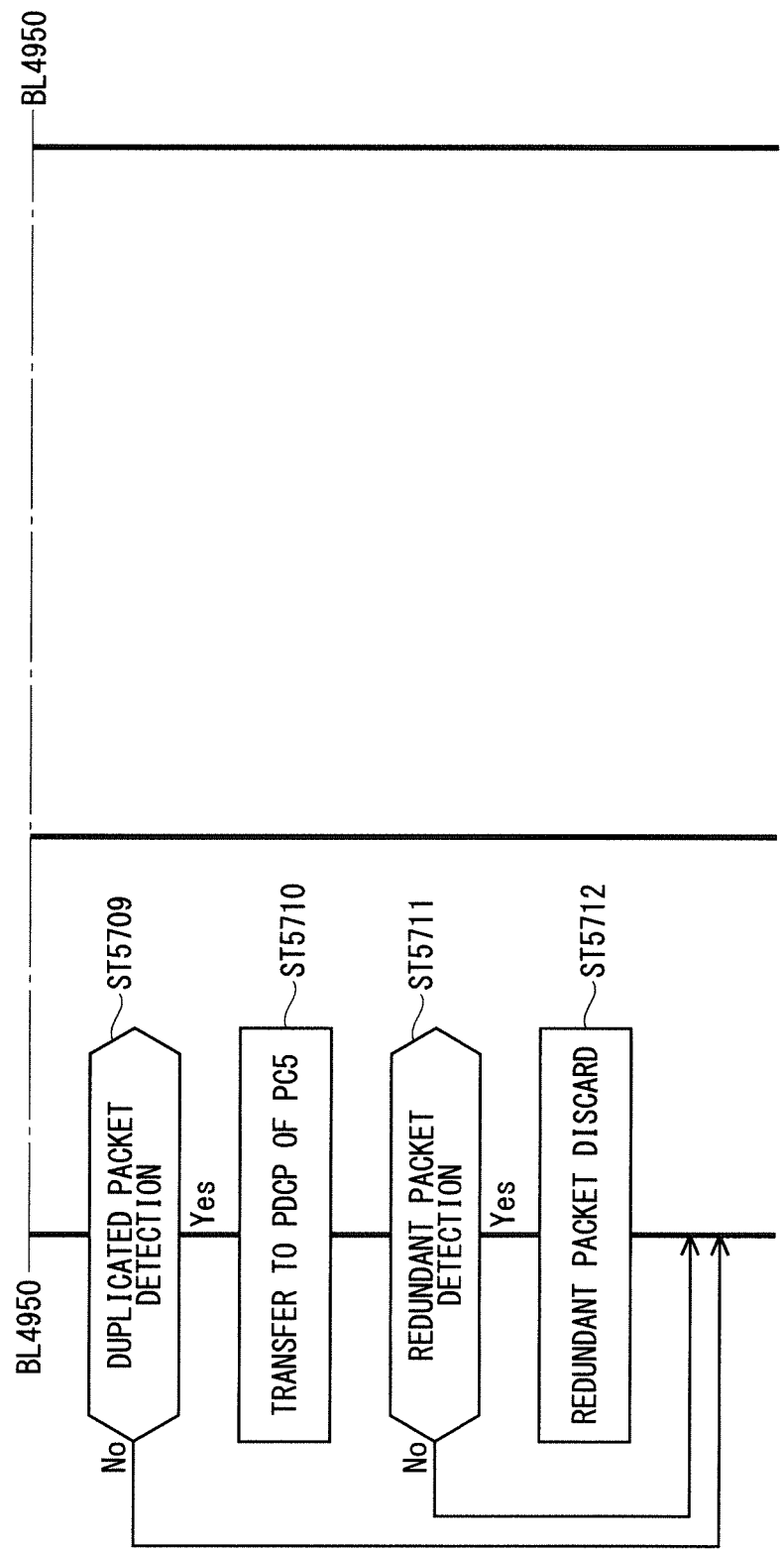
F I G. 5 0

USER APPARATUS, BASE STATION AND COMMUNICATION SYSTEM

CROSS-REFERENCE TO RELATED APPLICATIONS

This application is a continuation of and claims benefit under 35 U.S.C. § 120 to U.S. application Ser. No. 17/259,782 filed Jan. 12, 2021, which is a U.S. National Stage application of PCT/JP2019/030445, filed on Aug. 2, 2019, and claims the benefit of priority under 35 U.S.C. § 119 from JP 2018-148621, filed on Aug. 7, 2018, the entire contents of each of which are incorporated herein by reference.

TECHNICAL FIELD

The present invention relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 v15.0.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 19).

Further, in 3GPP, several new technologies are studied. For example, communication reliability enhancement by support of a plurality of transmission reception points (TRPs) in the base station (see Non-Patent Document 20), prompt recovery from master cell group (MCG) failure in DC (see Non-Patent Document 21), a configuration method for a plurality of carriers in a sidelink (see Non-Patent Document 22), and the like are studied.

PRIOR ART DOCUMENTS

Non-Patent Documents

Non-Patent Document 1: 3GPP TS 36.300 V15.2.0
Non-Patent Document 2: 3GPP S1-083461
Non-Patent Document 3: 3GPP TR 36.814 V9.2.0
Non-Patent Document 4: 3GPP TR 36.912 V15.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.2.0
Non-Patent Document 9: 3GPP TR 38.804 V14.0.0
Non-Patent Document 10: 3GPP TR 38.912 V14.1.0
Non-Patent Document 11: 3GPP RP-172115
Non-Patent Document 12: 3GPP TS 37.340 V15.2.0
Non-Patent Document 13: 3GPP TS 38.211 V15.2.0
Non-Patent Document 14: 3GPP TS 38.213 V15.2.0
Non-Patent Document 15: 3GPP TS 38.214 V15.2.0
Non-Patent Document 16: 3GPP TS 38.300 V15.2.0
Non-Patent Document 17: 3GPP TS 38.321 V15.2.0
Non-Patent Document 18: 3GPP TS 38.212 V15.2.0
Non-Patent Document 19: 3GPP RP-161266
Non-Patent Document 20: 3GPP RP-181453
Non-Patent Document 21: 3GPP R2-1807081
Non-Patent Document 22: 3GPP TS36.331 V15.2.2

Non-Patent Document 23: 3GPP R2-1802473
Non-Patent Document 24: 3GPP TR36.885 V14.0.0
Non-Patent Document 25: 3GPP R2-1708062
Non-Patent Document 26: 3GPP TS 38.331 V15.2.1
Non-Patent Document 27: 3GPP R1-1714239

SUMMARY

Problem to be Solved by the Invention

When the base station performs communication with the UE by using a plurality of TRPs, a backhaul delay from the base station itself to each TRP and a propagation delay from each TRP to the UE are different for each TRP. However, how the UE establishes synchronization with each TRP is not disclosed. Thus, the UE cannot perform switch between TRPs under the base station and/or simultaneous communication with a plurality of TRPs. As a result, reliability and throughput are deteriorated.

Further, multi-carrier operation is supported in a sidelink (SL) that is supported for Device to Device (D2D) communication and Vehicle to Vehicle (V2V) communication. However, when configurations of timings of a physical sidelink control channel (PSCCH) and a physical sidelink shared channel (PSSCH) are different for each carrier, a receiver UE in the SL needs to receive the PSCCH and the PSSCH at timings configured for each carrier. Thus, power consumption is increased.

The present invention is made in the light of the problems described above, and has an object to provide a radio communication technology for enabling high reliability, a high transmission rate, and low power consumption in at least one of NR and sidelink communications.

Means to Solve the Problem

According to the present invention, provided is a communication system including: a communication terminal; and a base station including a plurality of transmitter-receivers configured to perform radio communication with the communication terminal, the base station being configured to perform radio communication with the communication terminal by using a part or all of the plurality of transmitter-receivers, wherein the communication terminal receives a downlink synchronization signal from at least one first transmitter-receiver to be newly connected, and establishes downlink synchronization with the at least one first transmitter-receiver by using the downlink synchronization signal, and the communication terminal establishes uplink synchronization with the at least one first transmitter-receiver through random access processing.

Further, according to the present invention, provided is a communication terminal being configured to perform radio communication with a base station including a plurality of transmitter-receivers via a part or all of the plurality of transmitter-receivers, wherein the communication terminal receives a downlink synchronization signal from at least one first transmitter-receiver to be newly connected, and establishes downlink synchronization with the at least one first transmitter-receiver by using the downlink synchronization signal, and the communication terminal establishes uplink synchronization with the at least one first transmitter-receiver through random access processing.

Further, according to the present invention, provided is a base station being configured to perform radio communication with a communication terminal, wherein the base station includes a plurality of transmitter-receivers, and is configured to perform radio communication with the communication terminal by using a part or all of the plurality of transmitter-receivers, and when the communication terminal starts random access processing, the base station performs the random access processing with the communication terminal via at least one first transmitter-receiver to be newly connected to the communication terminal.

Effects of the Invention

According to the present invention, high reliability, a high transmission rate, and low power consumption can be implemented.

The objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 5 illustrates a structure of the DC to be performed by gNBs that are connected to the NG core.

FIG. 7 illustrates a structure of the DC to be performed by the eNB and the gNB that are connected to the NG core.

FIG. 19 is a diagram illustrating operation of adding a connected TRP in the UE according to the first embodiment.

FIG. 28 is a diagram illustrating another example of operation of switch of the TRP for downlink communication in the UE according to the first modification of the first embodiment.

FIG. 37 is a diagram illustrating multi-carrier operation in an SL according to the fifth embodiment.

FIG. 38 is an example of a sequence for configuring the PSCCH and the PSSCH at the same timing in a plurality of carriers according to the fifth embodiment.

FIG. 39 is an example of a sequence for configuring the PSCCH and the PSSCH at the same timing in a plurality of carriers according to the fifth embodiment.

FIG. 41 is a conceptual diagram for illustrating PC5-based V2V according to the sixth embodiment.

FIG. 42 is a conceptual diagram for illustrating Uu-based V2V according to the sixth embodiment.

FIG. 45 is a diagram illustrating an example of packet duplication using PC5-based V2V communication and Uu-based V2V communication according to the sixth embodiment.

FIG. 49 is a diagram illustrating an example of a sequence for bearer configuration for packet duplication according to the first modification of the sixth embodiment.

FIG. 50 is a diagram illustrating an example of a sequence for bearer configuration for packet duplication according to the first modification of the sixth embodiment.

DESCRIPTION OF EMBODIMENTS

The First Embodiment

Figure 2:
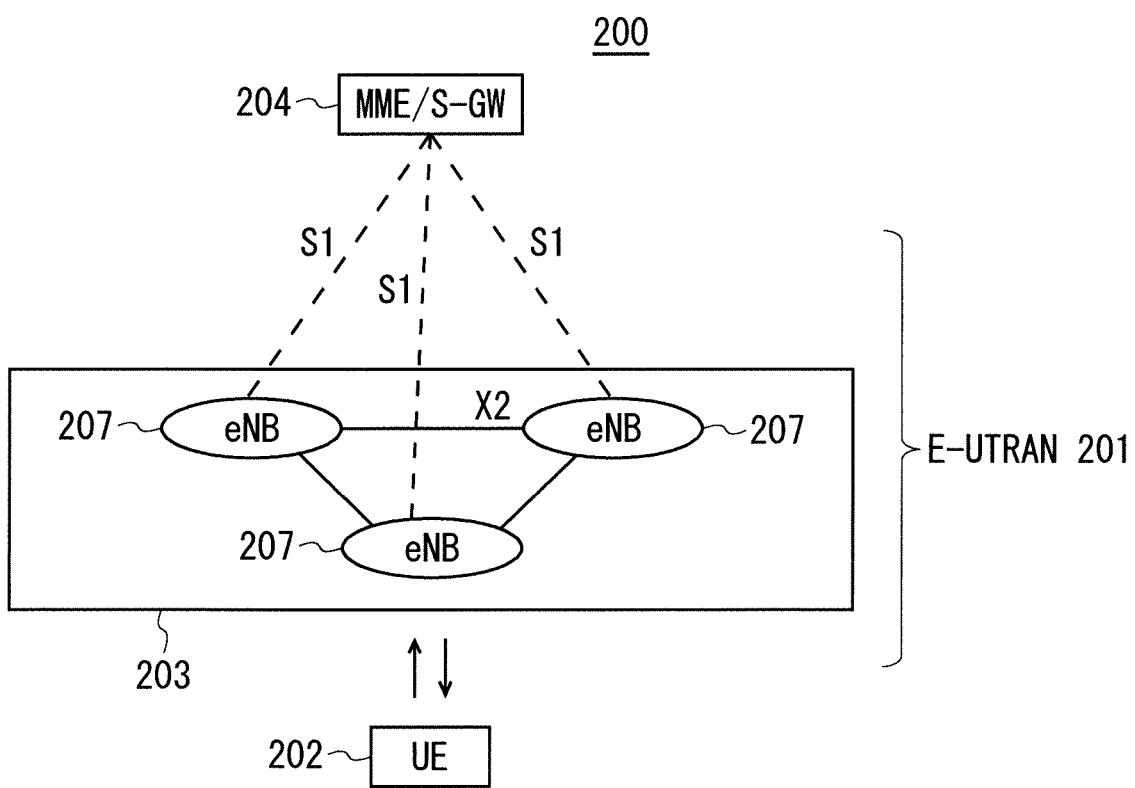
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbour cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

Figure 3:
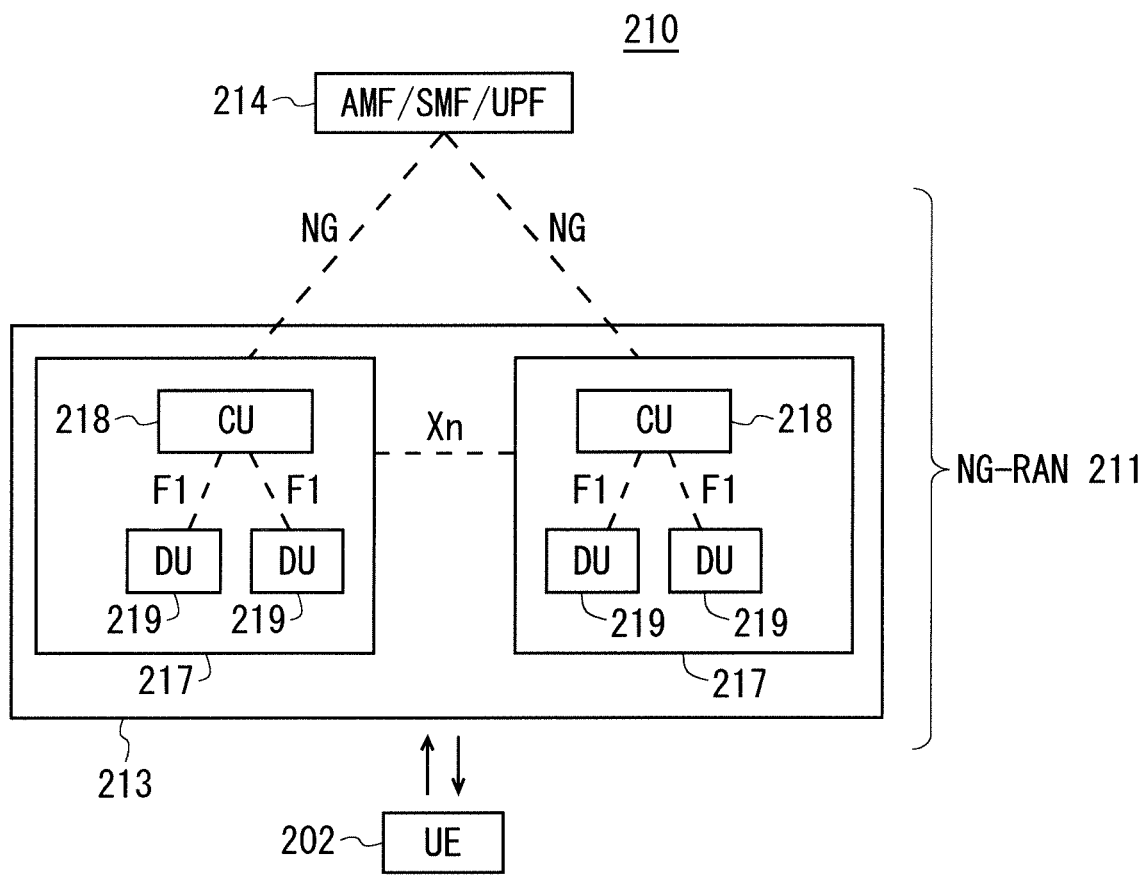
FIG. 3 is a block diagram illustrating an overall configuration of a NR communication system 210 that has been discussed in 3GPP.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 212, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

Figure 4:
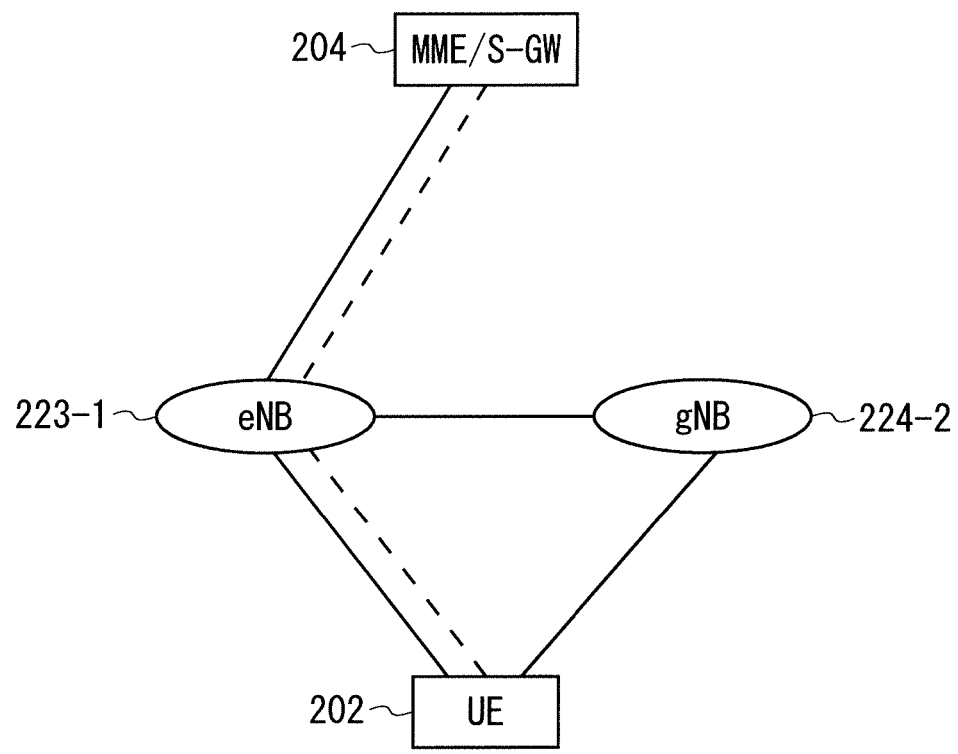
FIG. 4 illustrates a structure of the DC to be performed by an eNB and a gNB that are connected to the EPC.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

Figure 6:
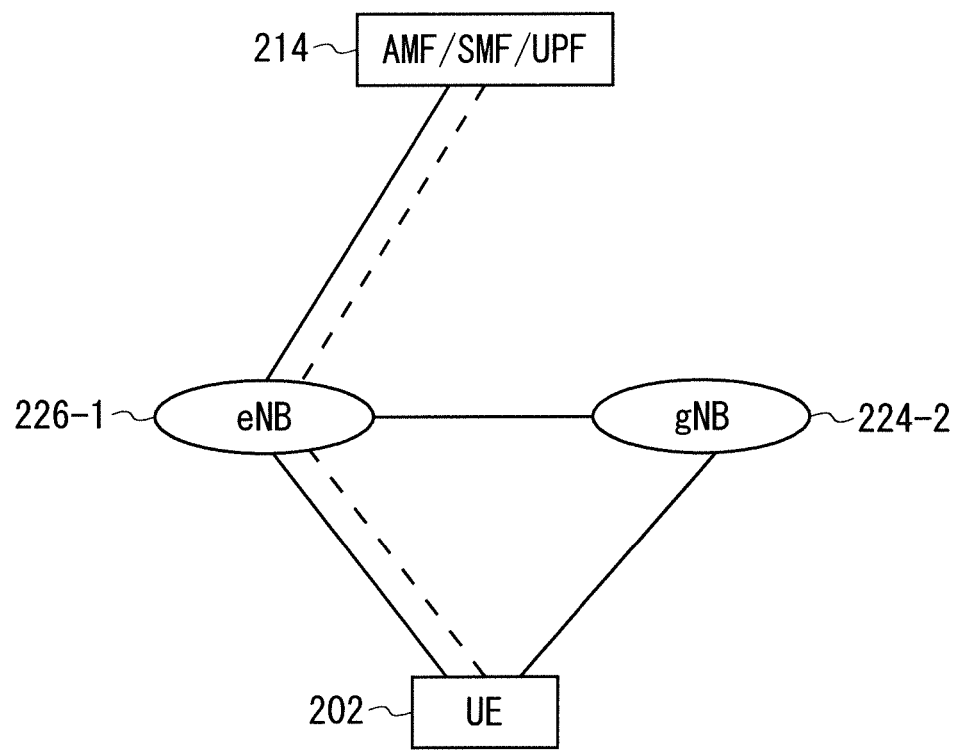
FIG. 6 illustrates a structure of the DC to be performed by the eNB and the gNB that are connected to the NG core.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and a gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
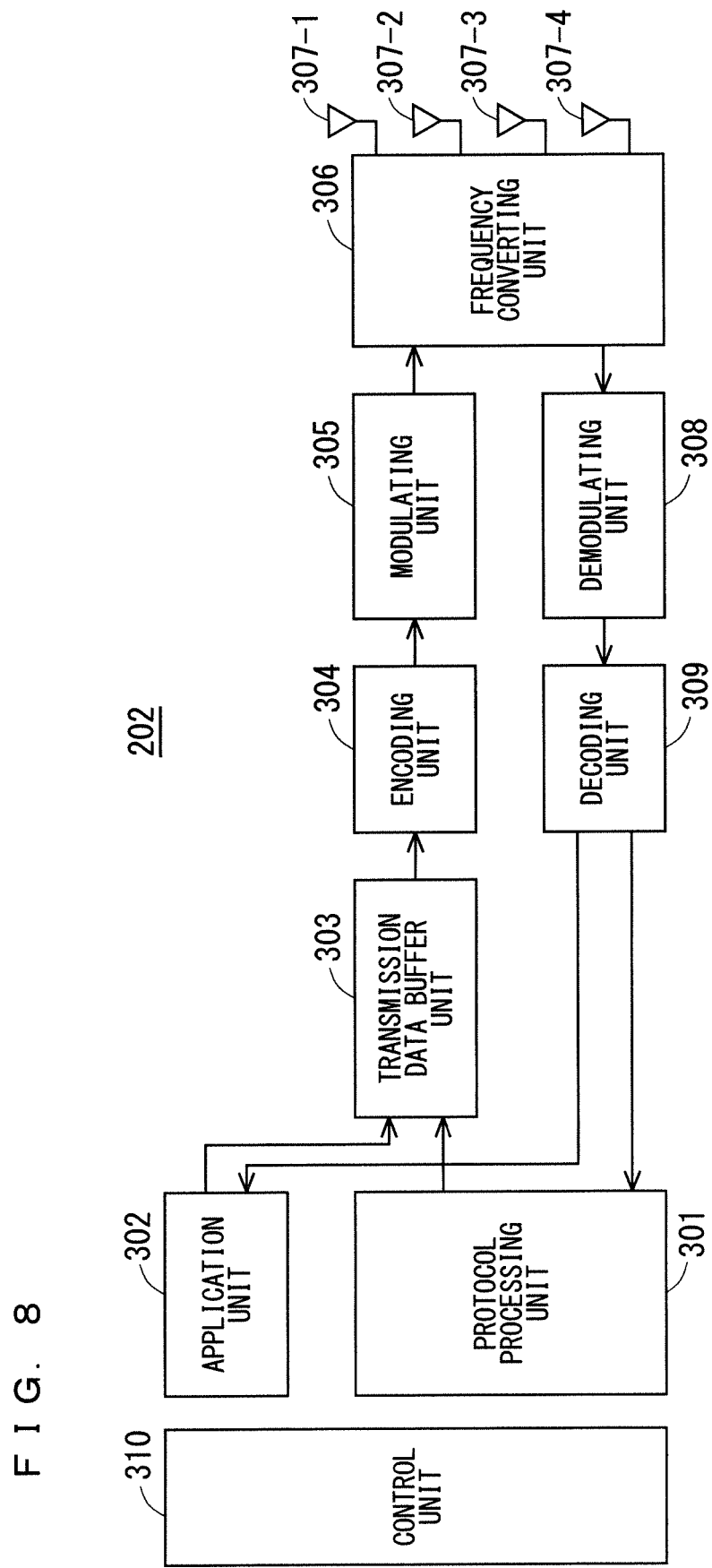
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
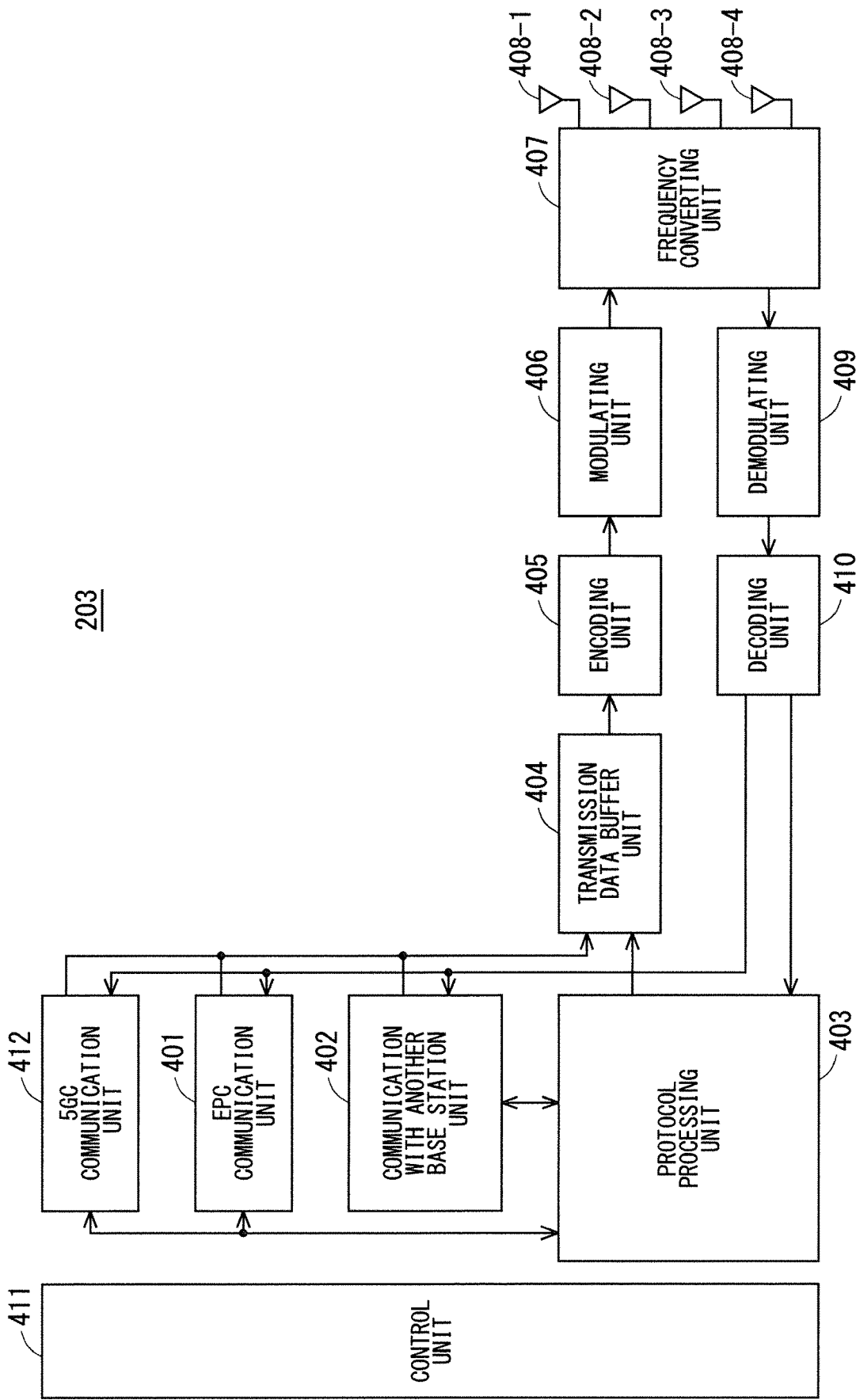
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204) and the like. A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the 5GC communication unit 412, the EPC communication unit 401, or the communication with another base station unit 402, and the user data is passed to the 5GC communication unit 412, the EPC communication unit 401 and the communication with another base station unit 402. A series of processes by the base station 203 is controlled by a control unit 411. This means that, though not shown in FIG. 4, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
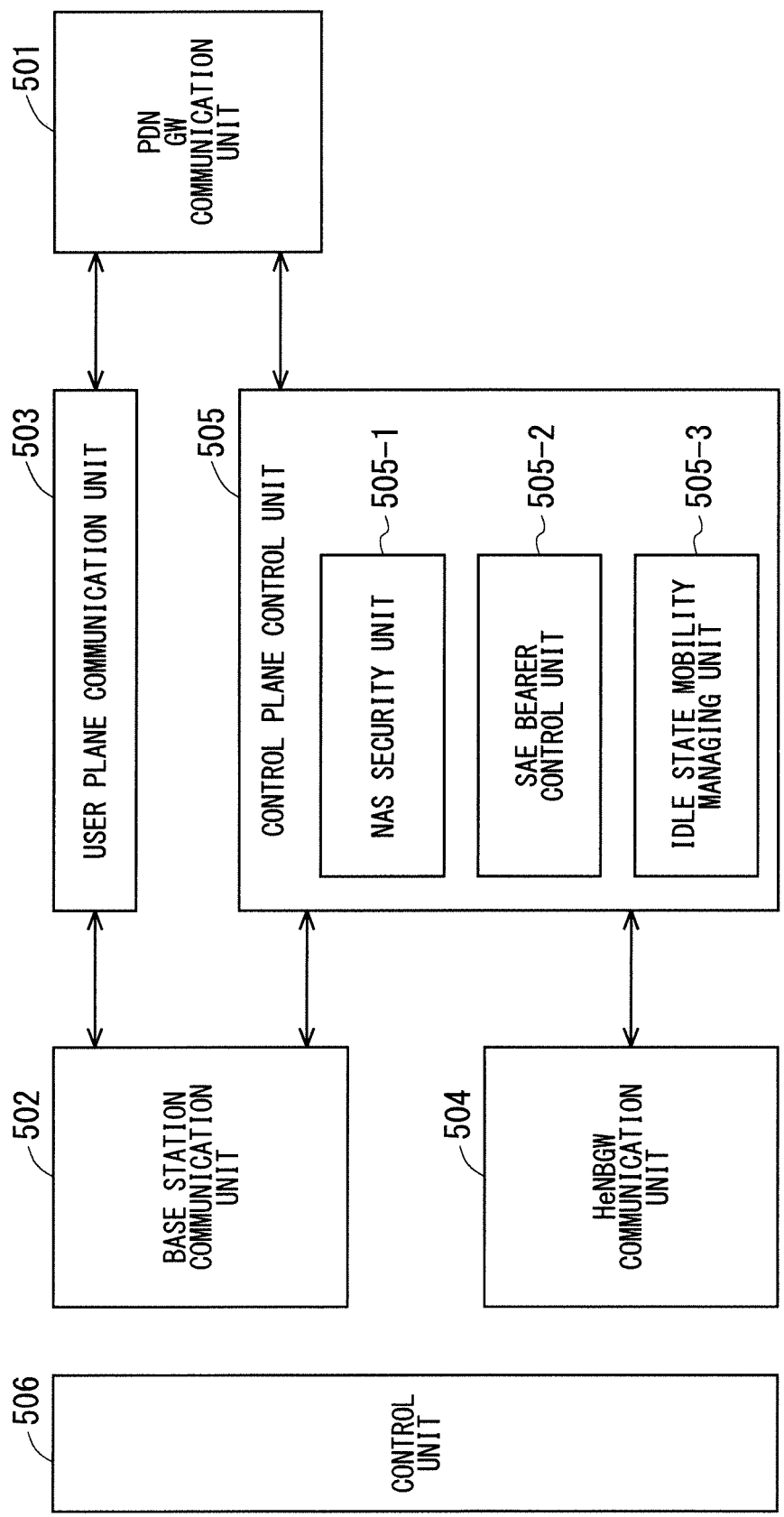
FIG. 10 is a block diagram showing the configuration of an MME.

FIG. 10 is a block diagram showing the configuration of the MME. FIG. 10 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the eNBs 207 to be connected to the MME 204a, CSG IDs, and a whitelist.

Figure 11:
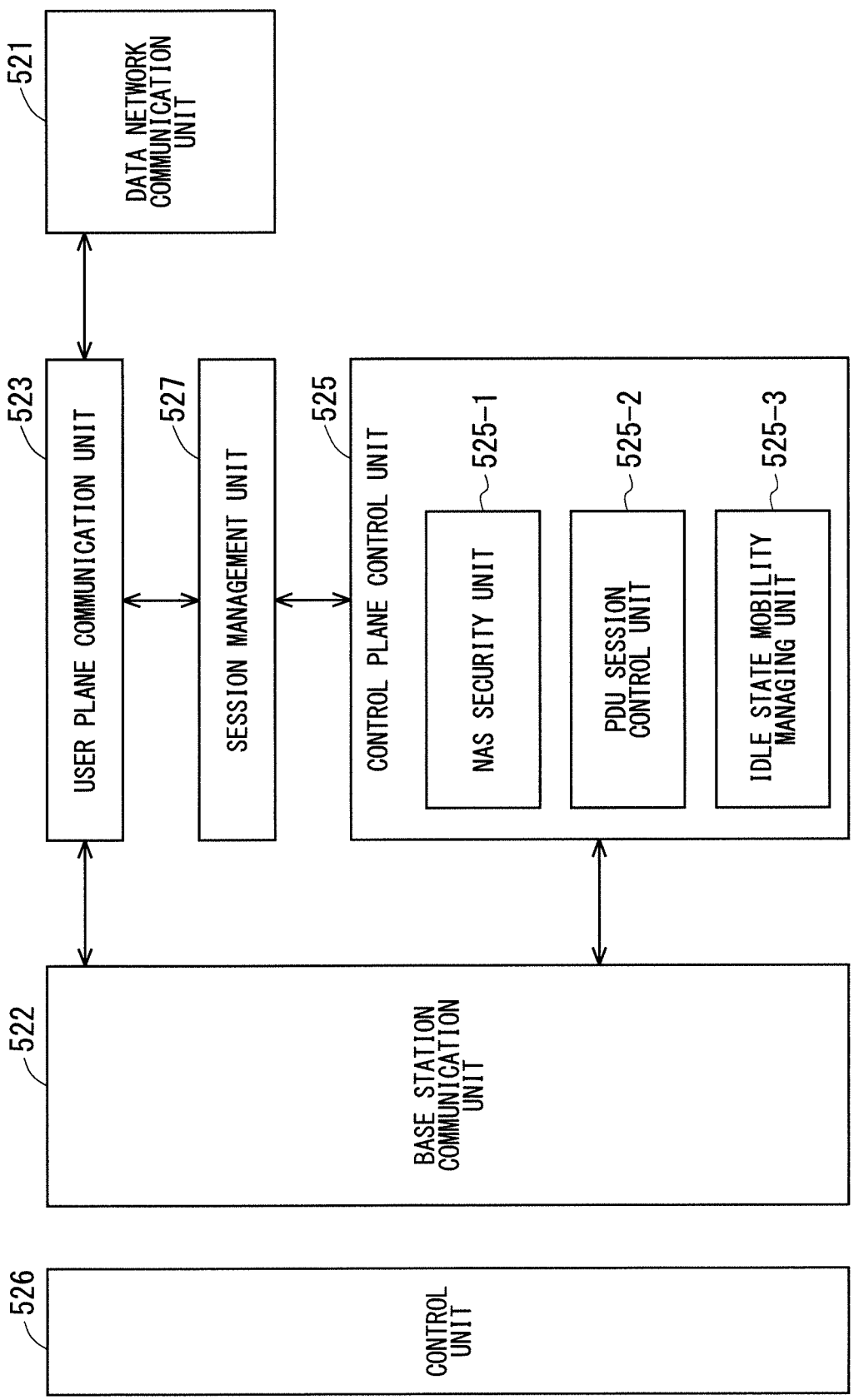
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527 via the user plane communication unit 523. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility managing unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility managing unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
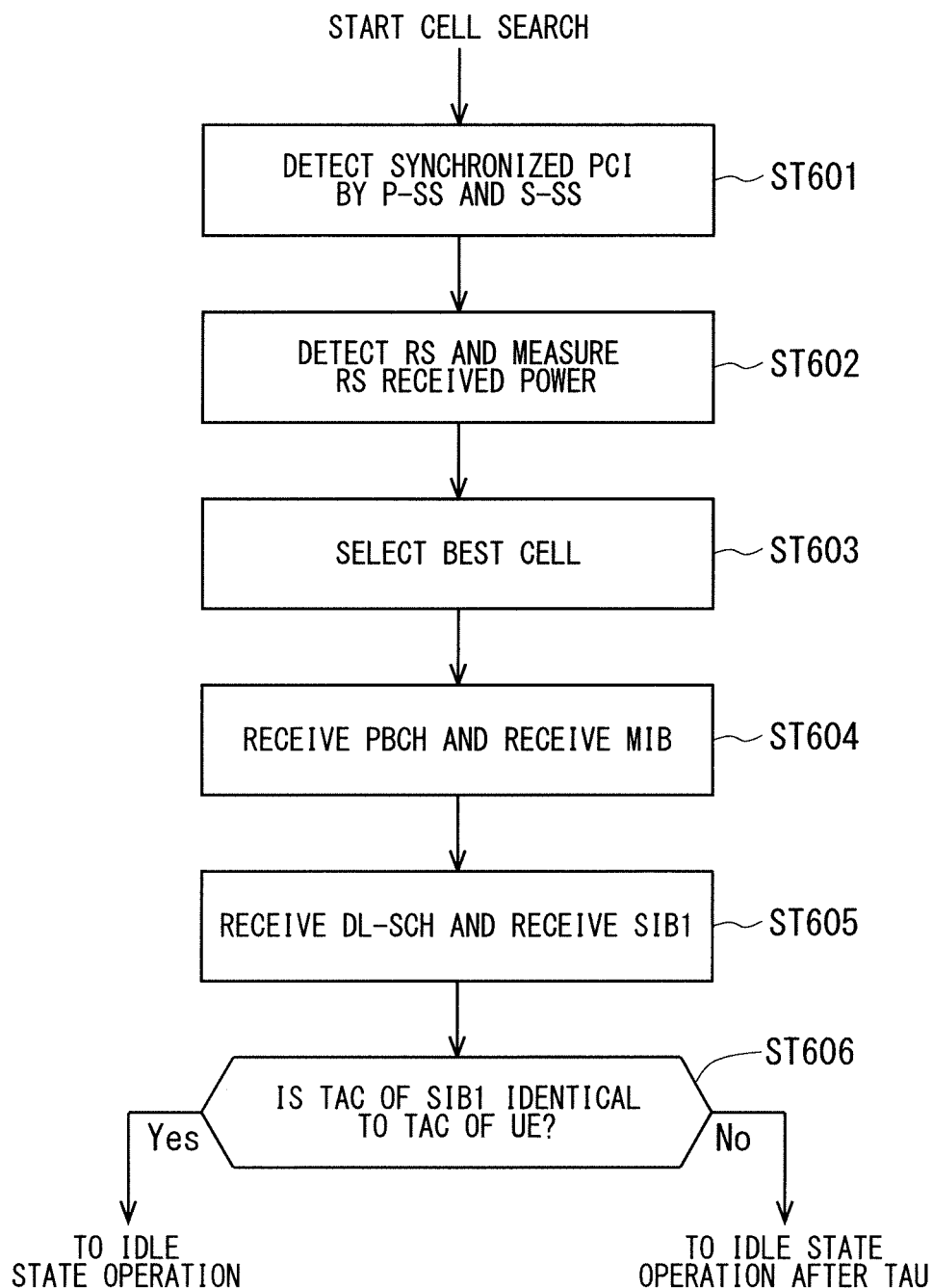
FIG. 12 is a flowchart showing an outline from a cell search to an idle state operation performed by a communication terminal (UE) in LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 13:
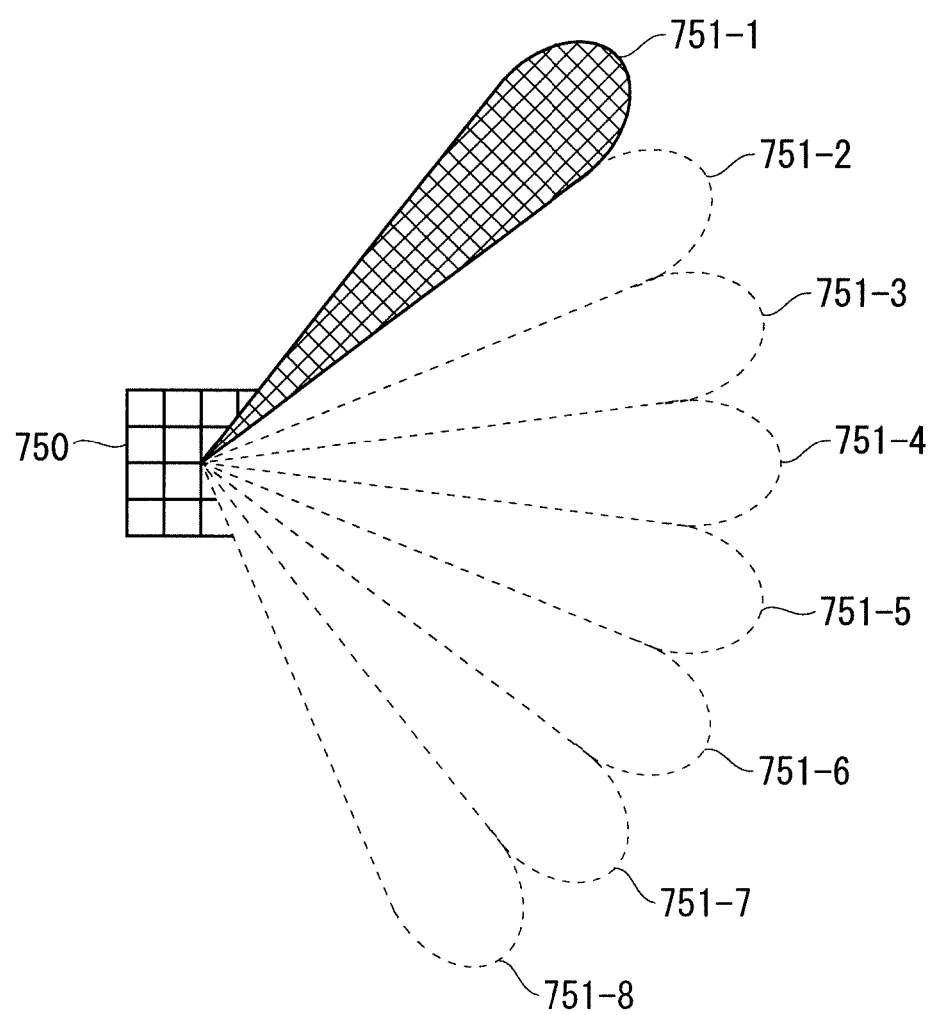
FIG. 13 illustrates an example structure of a cell in an NR system.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

In connection of the UE and the NR base station (which may be hereinafter referred to as a gNB), a plurality of transmission reception points (TRPs) under the gNB may be used. For example, the base station 750 in FIG. 13 may be one of the TRPs under the gNB. Note that the TRP may be referred to as a transmitter-receiver. The plurality of TRPs described above may be asynchronous with each other. Specifically, the subframe boundary of a signal transmitted and received by each TRP may be different from each other. The asynchronization described above may be due to, for example, difference of backhaul delays from each other. The gNB may simultaneously perform transmission and reception using the plurality of TRPs for the UE under the gNB, or may perform the transmission and reception at different timings for each TRP. The UE may simultaneously perform transmission and reception between the plurality of TRPs for the gNB, or may perform the transmission and reception at different timings.

As another example, the UE may switch a transmission and reception destination TRP under the gNB. For example, using the fact that communication quality with another TRP under the same gNB has become better than a currently connected TRP, the UE may switch a connection destination TRP to the above-described TRP that has achieved the communication quality.

In the description above, a problem described below is caused. Specifically, a method for establishing synchronization with a TRP to be newly connected has not yet been disclosed. With this, the UE cannot establish synchronization with the TRP to be newly connected. As a result, the UE cannot start communication with the TRP to be newly connected, which poses a problem.

A solution to the problem described above will be disclosed below.

When the UE and the TRP are connected, for example, the gNB commands the start of random access processing to the UE in switch of the TRP to be connected by the UE. The command may be notified by using L1/L2 signaling, for example, the PDCCH. Specifically, the random access processing may be PDCCH-order Random Access (PDCCH order RA). With this, for example, the base station becomes capable of prompt random access commanding to the UE.

As another example, the command may be notified by using MAC signaling. With this, for example, the base station becomes capable of carrying a large amount of information on the command. As another example, the command may be notified by using RRC signaling. With this, for example, the base station becomes capable of carrying a larger amount of information on the command.

The gNB may perform the commanding by using a switch target TRP (for example, a TRP before switch), or may be performed by using a TRP different from the switch target. The commanding using the TRP different from the switch target described above may be used when, for example, the gNB communicates with the UE by using a plurality of TRPs. With this, for example, by using a TRP having better communication quality than the switch target TRP, reliability enhancement in the TRP switch command from the gNB to the UE can be achieved.

The command may be used for switch of the TRP of the SCell. The gNB may transmit the switch command from a cell different from the SCell, for example, the PCell, the PSCell, or the SCell capable of PDCCH transmission. The command may include information (for example, an identifier of a cell) related to the cell in which the TRP switch is performed. With this, for example, the gNB becomes capable of the TRP switch command for a different cell.

The command may be used for switch of the TRP between cells. The gNB may transmit the switch command from a cell before and after switch, or may transmit from a cell different from the cell. The command may include information (for example, an identifier of a cell before switch and/or after switch) related to the cell in which the TRP switch between cells is performed. With this, for example, the gNB becomes capable of the TRP switch command between cells.

The gNB may judge the TRP after switch by using measurement result notification from the UE. The gNB may judge a beam to be used for communication with the UE in the TRP. With this, for example, reliability in communication after the TRP switch between the UE and the gNB can be secured. The measurement results in the UE may be measurement results of the CSI-RS, or may be measurement results of the SS block. The gNB may judge the TRP after switch by using signal strength of the above-described signal received by the UE, for example, the RSRP. The gNB may judge the TRP after switch by using the above-described signal received quality, for example, the RSRQ. The gNB may judge the TRP after switch by using the signal-to-noise ratio.

The gNB may perform the above-described measurement command of a signal for the UE. The measurement command may be performed by using RRC signaling. As an example of the RRC signaling, MeasConfig described in Non-Patent Document 26 (3GPP TS 38.331 V15.2.1) may be used, or other signaling may be used. As another example, the measurement command may be performed by using MAC signaling, or may be performed by using L1/L2 signaling. A CSI report command may be used, or other signaling may be used. With this, for example, the gNB becomes capable of promptly notifying the UE of the measurement command.

The gNB may include information related to a TRP as a measurement target, for example, an identifier of the TRP, in the measurement command to the UE. The gNB may include information related to a beam as a measurement target, for example, an identifier of the beam, in the measurement command. The gNB may include information related to the number of measurement results to be reported from the UE to the gNB in the measurement command. As another example, the gNB may include a list of the TRPs and/or the beams as a measurement target in the measurement command. The information related to a beam as a measurement target may be, for example, an identifier of the CSI-RS transmitted by using the beam, or may be an identifier of the SS block transmitted by using the beam.

The identifier of the TRP may be uniquely given in the gNB, may be uniquely given in the cell, or may be given for each UE, for example, for each virtual cell identifier (virtual cell ID). The identifier of the TRP may include a cell identifier, may include an identifier of the UE, or may include a virtual cell identifier. Regarding the identifier of the beam as well, the same may hold true as the identifier of the TRP, or the identifier may be uniquely given in the TRP. The identifier of the beam may include the identifier of the TRP.

The UE may report the measurement results to the gNB. The report may include information related to the measured TRP. The report may include information related to the beam in the TRP, for example, a CSI-RS identifier and/or an SS block identifier in the beam. The report may include the received signal strength, the received quality, and/or the signal-to-noise ratio of the beam. The report may include the measurement results of the currently connected TRP and/or beam. The currently connected TRP and/or beam described above may be a TRP and/or a beam not included as the measurement target in the measurement command from the gNB to the UE. The UE may perform the measurement of the currently connected TRP and/or beam even if the currently connected TRP and/or beam is not included in the measurement target of the measurement command. With this, for example, the gNB becomes capable of selecting an optimal connection destination TRP and/or beam including the TRP and/or the beam currently connected by the UE. As a result, reliability of communication can be enhanced.

For the report of the measurement results described above, for example, RRC signaling may be used. As an example in which the RRC signaling is used, MeasurementReport described in Non-Patent Document 26 (3GPP TS 38.331 V15.2.1) may be used, or other signaling may be used. As another example, MAC signaling may be used, or L1/L2 signaling may be used. As an example in which the L1/L2 signaling is used, the CSI report (CSI reporting) may be used. The CSI report described above may be included in the PUCCH, or may be included in the PUSCH. The CSI report described above may be a periodic CSI report, may be a semi-persistent CSI report, or may be an aperiodic CSI report. As another example, the RACH may be used, or the SRS may be used. As an example in which the RACH is used, information of the measurement results may be included in a sequence of a preamble of the RACH. As an example in which the SRS is used, the information related to the TRP and/or the beam as the measurement target may be included as a time and/or frequency resource of the SRS, the information of the measurement results may be included as a time and/or frequency resource of the SRS, may be included as a sequence of the SRS, or may be a combination of the above.

The identifier of the beam may be unique in the gNB. The gNB may perform broadcast or individual notification of information related to association of the TRP and the beam to the UEs under the gNB. The UE may include the identifier of the beam in the report of the measurement results. With this, for example, a signaling amount in the report can be reduced. For the notification, for example, RRC dedicated signaling may be used, MAC signaling may be used, or L1/L2 signaling may be used.

As another example, the identifier of the beam may be unique in the TRP. The UE may include the identifier of the TRP in the report of the measurement results and thereby notify the gNB of the identifier of the TRP. With this, for example, the number of beams that can be supported in a single TRP can be increased. As a result, flexibility in the communication system can be enhanced. The gNB may perform broadcast or individual notification of information related to the identifier of the TRP to the UEs. For the broadcast, for example, the PBCH may be used, the remaining system information (RMSI) may be used, or other system information may be used. For the notification, for example, RRC dedicated signaling may be used, MAC signaling may be used, or L1/L2 signaling may be used.

As another example of judgement of the TRP after switch, the UE may notify the gNB of candidates of the TRP after switch. The gNB may determine the TRP after switch from candidates. The gNB may notify the UE of the determined TRP. The notification may be performed with a method similar to a method in which the gNB judges the TRP after switch by using the measurement result notification from the UE, for example. With this, for example, the gNB becomes capable of selecting the TRP after switch by using a load state of the TRP. As a result, the communication system can be efficiently operated.

The UE may perform measurement of neighboring TRPs including the connection destination TRP. The measurement may be performed by using a measurement command from the gNB, or may be performed without the measurement command. For example, the measurement may be periodically performed, or may be performed when a predetermined condition is satisfied. The condition may be, for example, a condition related to the communication quality with the currently connected TRP. In the condition, a threshold related to a reception error rate (for example, the BER may be used or the BLER may be used) in communication with the currently connected TRP may be used, a threshold related to the RSRP of the RS transmitted from the TRP may be used, a threshold related to the RSRQ may be used, or a threshold related to the SINR may be used. The RS may be, for example, the DMRS, may be the CSI-RS, or may be the PTRS. Instead of the RS, the SS block may be used. The condition may be as follows; for example, the UE starts the measurement when the communication quality in the UE reaches equal to or less than or falls below the above-described threshold. With this, for example, the communication quality between the UE and the gNB can be secured, and at the same time, the signaling amount between the UE and the gNB can be reduced.

The threshold described above may be defined in a specification in advance, or may be broadcast or notified from the gNB to the UEs. For the notification, for example, RRC signaling may be used, MAC signaling may be used, or L1/L2 signaling may be used.

As a selection method of the candidates in the UE, the RSRP of the signal received from neighboring TRPs may be used, the RSRQ may be used, the SINR may be used, or a combination of the above may be used. For example, a predetermined number of TRPs and/or beams having the highest RSRP in descending order may be used as the candidates, or TRPs and/or beams having the RSRP equal to or more than or exceeding a predetermined threshold may be used as the candidates. Alternatively, for example, among the TRPs and/or the beams having the RSRP equal to or more than or exceeding the predetermined threshold described above, up to a predetermined number of TRPs and/or beams having the highest RSRP, RSRQ, or SINR in descending order may be used as the candidates. With this, for example, increase in the signaling amount between the UE and the gNB can be prevented. In the description above, the following may be adopted: regardless of whether a value reaches equal to or more than or exceeds the predetermined threshold, at least one TRP and/or beam is used as the candidate.

The threshold used for selection of the candidates described above may be the same as or different from the threshold used for the measurement start of the UE. How to determine the threshold used for selection of the candidates may also be determined in a manner similar to that for the threshold used for the measurement start of the UE, or may be broadcast or notified to the UEs in a similar method. With this, for example, complexity in design of the communication system can be avoided.

The predetermined number described above may be defined in a specification, or may be broadcast or notified from the gNB to the UEs. For the notification, for example, RRC signaling may be used, MAC signaling may be used, or L1/L2 signaling may be used.

As another example in judgement of the TRP after switch, the UE may judge the TRP after switch. The UE may, for example, perform measurement of neighboring TRPs including the connection destination TRP. The measurement may be performed by using the measurement command from the gNB, may be performed without the measurement command, for example periodically, or may be performed by using the TRP switch command from the gNB to the UE. In the TRP switch command from the gNB to the UE, information related to the switch destination TRP may be absent. The UE may notify the gNB of information related to the judged TRP. The command may include information related to the beam in the TRP. The information related to the beam may, for example, be a CSI-RS identifier and/or an SS block identifier of the beam. For the notification, for example, RRC signaling may be used, MAC signaling may be used, L1/L2 signaling may be used, or a combination of the above may be used. For example, with the MAC signaling and/or the L1/L2 signaling being used, the UE can promptly notify the gNB of the information related to the judged TRP for the base station.

The UE may judge the TRP after switch by using the above-described signal strength of the signal received by the UE, for example, the RSRP. The UE may judge the TRP after switch by using the above-described signal received quality, for example, the RSRQ. The UE may judge the TRP after switch by using the signal-to-noise ratio. With this, for example, reliability of communication between the UE and the gNB after the TRP switch can be enhanced.

As an example of information included in the random access start command from the gNB to the UE, the following (1) to (14) are disclosed:
 (1) Information related to the TRP to be newly connected
 (2) Information indicating that connection with the currently connected TRP will be cut off
 (3) Information related to the TRP from which connection is to be cut off
 (4) Information related to the TRP with which connection is to be maintained
 (5) Information related to the candidates of the TRP to be newly connected
 (6) Information related to PRACH transmission timing to the connection destination TRP
 (7) Information related to a preamble used for the PRACH to the connection destination TRP (8) Information related to synchronization and asynchronization between the TRP before switch and the TRP after switch (9) Information related to frame timing of the TRP after switch

(10) Information related to a backhaul delay of the TRP after switch

(11) Information related to a primary TRP (see Non-Patent Document 27) after the TRP switch

(12) Information related to a primary and/or secondary PDCCH (see Non-Patent Document 27) after the TRP switch

(13) Scheduling information for the UE

(14) Combination of (1) to (13) described above

The information (1) described above may be, for example, an identifier of the connection destination TRP, or may be information related to a beam used by the TRP. As the information of the beam, for example, information related to the SS block may be used, information related to the CSI-RS may be used, or both of the above may be used. With the information of the beam being included in the information (1) described above, for example, the UE becomes capable of promptly acquiring the beam of the connection destination. The information related to the SS block described above may be, for example, an identifier of the SS block. The information related to the CSI-RS described above may be, for example, an identifier of a CSI-RS resource.

A single piece of the information (1) described above may be present, or a plurality of pieces of the information (1) may be present. For example, when a plurality of TRPs are added as the connection destinations of the UE, a plurality of pieces of the information (1) described above may be used. The same may apply also when a plurality of beams are added. When a plurality of beams are added as described above, a single connection destination TRP may be present, or a plurality of the connection destination TRPs may be present. With this, for example, the signaling amount from the base station to the UE when a plurality of TRPs and/or beams are added as the connection destinations of the UE can be reduced.

The information (1) described above may include information related to the number of connection destination TRPs and/or beams. With this, for example, the UE becomes capable of promptly acquiring the number of connection destination TRPs and/or beams. As a result, the UE becomes capable of promptly executing connection processing of the TRPs and/or the beams.

The information (1) described above may only be information of the number of connection destination TRPs and/or beams. For example, the UE may determine the above-described number of TRPs and/or beams out of the TRPs and/or beams that can be transmitted and received as new connection destinations. In determination of the new connection destination TRP and/or beam, the UE may use strength of the signal received from the TRP and/or the beam, may use the PRACH transmission timing for the TRP and/or the beam, or may use another indicator (for example, the signal-to-noise ratio of the received signal). With this, for example, the UE becomes capable of communicating with the base station by using the TRP and/or the beam having high communication quality. As a result, the communication quality between the UE and the base station can be enhanced. Further, for example, the UE becomes capable of using the TRP and/or the beam with early PRACH transmission timing. As a result, prompt TRP and/or beam switch and/or addition in the UE can be achieved.

Regarding (2) described above, using the information, the UE may judge whether the UE switches or adds a TRP to be connected. For example, when the information (2) described above indicates that connection will not be cut off, the UE may add the TRP to be connected by using such indication. With this, for example, the UE becomes capable of promptly judging addition and switch of the connection destination TRP.

The information (3) described above may be, for example, similar to the information (1) described above. For example, the information may be information related to TRP and/or the beam before switch, for example, the TRP and/or the beam from which connection with the UE is to be cut off, or may include information related to the number of the TRPs and/or the beams. With this, for example, effects similar to those of (1) described above can be obtained.

The information (3) described above may be notified from the gNB to the UE by using signaling different from the random access start command. For example, the information may be signaled from the gNB to the UE as a TRP release command. With this, for example, when only release of the connected TRP is performed, the random access start command need not be transmitted from the gNB to the UE. As a result, the signaling amount between the gNB and the UE can be reduced.

The TRP release command may be, for example, L1/L2 signaling. With this, for example, prompt notification can be performed from the gNB to the UE. As another example, the signaling may be MAC signaling, or may be RRC signaling. With this, for example, a large amount of information can be notified.

The information (4) described above may also be similar to the information (1) described above, for example. For example, the information may be information related to the TRP and/or the beam with which connection with the UE is to be maintained, or may include information related to the number of the TRPs and/or the beams. With this, for example, effects similar to those of (1) described above can be obtained.

The information (4) described above may also be notified from the gNB to the UE by using signaling different from the random access start command, in a similarly to (3) described above. For example, the information (4) described above may be included in the TRP release command described above.

The information (5) described above may be, for example, similar to the information (1) described above. For example, the information may be information related to the TRP and/or the beam to be candidates of connection with the UE. The UE may select the TRP and/or the beam to be newly connected out of the connection destination TRPs and/or beams included in (5) described above. The UE may select as many TRPs and/or beams as the number included in (1) described above. The UE may use the method disclosed regarding the information (1) described above in determination of the new connection destination TRP and/or beam. With this, for example, the UE becomes capable of selecting the TRP and/or the beam having high communication quality and/or with early PRACH transmission timing. As a result, the communication quality between the UE and the base station can be enhanced. Further, for example, prompt switch and/or addition of the TRP and/or the beam in the UE can be achieved.

The information (6) described above may be, for example, information related to timing at which the UE is required to transmit the PRACH to the TRP and/or the beam after switch. Using the information, the UE may transmit the PRACH to the connection destination TRP and/or beam. With this, the UE becomes capable of promptly executing the random access processing for the connection destination TRP and/or beam.

As another example, the information (6) described above may be information indicating correspondence between the SS block and the PRACH transmittable timing (for example, a PRACH occasion) in the TRP after switch. The SS block in the information may be, for example, an SS block index (SSB index). The UE may not acquire the system information in the TRP after switch by acquisition of the information. With this, for example, the UE becomes capable of promptly executing the TRP switch.

As another example, the UE may acquire the information (6) described above from the broadcast information of the gNB. The broadcast information may be, for example, transmitted from the connection destination TRP. With this, for example, the signaling amount of the random access command from the gNB to the UE can be reduced.

The preamble included in the information (7) described above may be a preamble individually given to the UE. The UE may start the random access processing with the TRP and/or the beam to be newly connected by using information of the notified RA preamble. With this, the random access processing between the UE and the gNB can be promptly executed.

The preamble included in the information (7) described above may be uniquely given in the TRP, or may be uniquely given in each beam used by the TRP. With this, for example, depletion of the RA preambles can be prevented. As a result, the number of UEs that can be accommodated can be increased.

As another example, the preamble included in the information (7) described above may be uniquely given in the gNB. The TRP and/or the beam to be connected by the UE may be uniquely determined based on the information of the preamble included in (7) described above. With this, for example, the signaling amount in the random access command from the base station to the UE can be reduced.

As another example, the information (7) described above may be information indicating correspondence between the SS block and the preamble in the TRP after switch. The SS block in the information may be, for example, an SS block index (SSB index). The UE may not acquire the system information in the TRP after switch by acquisition of the information. With this, for example, the UE becomes capable of promptly executing the TRP switch.

As another example related to the RA preamble used by the UE for connection with the gNB, the RA preamble may be uniquely determined based on the information related to (1) described above. With this, for example, the signaling amount in the random access command from the base station to the UE can be reduced.

The information (8) described above may be, for example, measured by the gNB, or may be measured by the UE and reported to the gNB. Using the information (8) described above, the UE may not perform the random access processing for the TRP after switch when the TRP before switch and the TRP after switch are synchronous, for example. With this, for example, the TRP switch in the UE can be promptly executed.

The information (9) described above may be, for example, information related to a difference of frame timing between the TRP before switch and the TRP after switch. The information may be, for example, measured by the gNB, or may be measured by the UE and reported to the gNB. Using the information, the UE may transmit the PRACH at PRACH reception timing of the TRP after switch. With this, for example, the UE no longer needs to wait for the SS burst from the TRP after switch. As a result, the UE becomes capable of promptly executing RACH transmission to the TRP after switch.

The information (10) described above may be, for example, information related to a difference of a backhaul delay in the TRP before switch and a backhaul delay in the TRP after switch. The information may be, for example, measured by the gNB, or may be measured by the UE and reported to the gNB. Using the information, the UE may perform PRACH transmission to the TRP after switch. With this, for example, a value of timing advance (TA) in an RA response can be reduced. As a result, the processing amount of the UE after RA response reception can be reduced.

The information (11) described above may be, for example, an identifier of the primary TRP. As another example, the information (11) described above may be an identifier indicating presence or absence of switch of the primary TRP, or may be an identifier primary indicating whether the TRP after switch is the primary TRP. The gNB and the UE may judge TRPs other than the TRP as secondary TRPs. Using the information related to (11) described above, the UE may perform switch of the primary TRP. With this, for example, when the primary TRP is configured for the UE, the UE becomes capable of promptly executing switch of the primary TRP.

The information (12) described above may be, for example, an identifier of the TRP that transmits the primary PDCCH and/or the secondary PDCCH. A single identifier of the TRP described above may be present, or a plurality of the identifiers may be present. The identifier of the TRP that transmits the secondary PDCCH may not be provided. When the identifier of the TRP that transmits the secondary PDCCH is not provided, the secondary PDCCH may not be transmitted. The identifier of the primary TRP may not be included in the information (12) described above. The primary PDCCH may be transmitted from at least the primary TRP. Using the information (12) described above, the UE may perform reception operation of the primary PDCCH and/or the secondary PDCCH. The UE may stop the reception operation for the TRP not included in the information (12) described above. With this, for example, power consumption in the UE can be reduced.

The information (13) described above may be, for example, scheduling information of transmission and reception performed between the UE and the TRP after switch. Using the information (13) described above, the UE may perform transmission and reception of the signal and/or the data with the TRP after switch. With this, for example, the UE becomes capable of promptly executing data transmission and reception after synchronization establishment with the TRP after switch.

As another example related to the information (13) described above, the information may be included in the RA response. With this, for example, the UE becomes capable of promptly executing data transmission and reception after synchronization establishment with the TRP after switch, and also becomes capable of reflecting a communication environment at the time of the TRP switch of the UE in scheduling. Thus, efficiency of the transmission and reception in the communication system can be enhanced.

As another example related to the information (13) described above, the information may be included in both of the random access command and the RA response. For example, information related to periodic and/or semi-persistent scheduling may be included in the random access command, and information related to dynamic scheduling may be included in the RA response. With this, for example, the UE becomes capable of promptly executing data transmission and reception after synchronization establishment with the TRP after switch, and also the signaling amount in the RA response can be reduced.

Regarding the information (13) described above, information of the PDSCH scheduled by the primary PDCCH may be included, information of the PUCCH may be included, information of the PUSCH may be included, or information of the SRS may be included. The information of the PDSCH, the PUCCH, the PUSCH, and/or the SRS described above may include information of the TRP in which transmission and reception of the channel and/or the signal is performed, for example, an identifier of the TRP. A plurality of such TRPs included in the information of the PDSCH, the PUCCH, the PUSCH, and/or the SRS described above may be present. Using the information (13) described above, the UE may perform transmission and reception of the channel and/or the signal. With this, for example, flexible scheduling in communication using a plurality of TRPs can be achieved.

The UE performs random access with the connection destination TRP by using the random access command from the gNB. The UE may start the random access processing by using frame timing of the TRP after switch. The UE may establish downlink synchronization with the TRP after switch by using the random access command. The UE may perform the downlink synchronization establishment by using reception of the SS block transmitted from the connection destination TRP. With this, for example, interference in the TRP after switch can be prevented. The UE may establish downlink synchronization with the connection destination TRP in advance. For example, the UE may maintain downlink synchronization established at the time of measurement of the connection destination TRP. The measurement described above may be, for example, measurement of the CSI-RS, or may be measurement of the SS block. With this, for example, the UE becomes capable of promptly transmitting the PRACH to the gNB.

As another example, the UE may start the random access processing by using frame timing of the TRP before switch. Using the information related to (9) described above, the UE may derive frame timing of the TRP after switch. The UE may transmit the PRACH at the PRACH reception timing of the TRP after switch by using the derived frame timing. With this, for example, the UE no longer needs to wait for the SS burst from the TRP after switch. As a result, the UE becomes capable of promptly executing RACH transmission to the TRP after switch.

The UE may acquire the system information from the gNB in random access processing. The UE may acquire the PRACH transmission timing (for example, a PRACH occasion) by using the system information. With this, for example, the gNB no longer needs to individually notify the UE of the information (6) described above. As a result, the signaling amount between the gNB and the UE can be reduced.

As another example, the UE need not acquire the system information from the gNB in the random access processing. The gNB may notify the UE of the information (6) described above. Using the information (6) described above, the UE may acquire the PRACH transmission timing (for example, a PRACH occasion). With this, for example, the UE no longer needs to acquire the system information. As a result, the UE becomes capable of promptly executing the random access.

The gNB may notify the UE of the information (7) described above in advance. The UE may perform the random access processing by using the preamble included in the information (7) described above. With this, for example, contention with another UE in the random access can be prevented. As a result, the UE becomes capable of promptly executing the random access.

The correspondence between the SS block and the PRACH transmittable timing may be uniquely given in the TRP. For example, the correspondence may be different between TRPs. With this, for example, assignment of PRACH transmittable timings in the gNB can be flexibly executed.

As another example, the correspondence between the SS block and the PRACH transmittable timing may be uniquely given in the cell. Specifically, the correspondence may be unique between TRPs. With this, for example, complexity in the communication system can be avoided.

The system information transmitted from the gNB may be different for each TRP of a transmission source. For example, the system information may only be system information related to the TRP. The system information related to the TRP may, for example, include correspondence between the SS block and the PRACH transmittable timing described above in the TRP. With this, for example, the amount of the system information transmitted by the gNB can be reduced.

As another example, the system information transmitted from the gNB may include system information related to all of or a part of the TRPs under the gNB. The system information related to the TRP may, for example, include correspondence between the SS block and the PRACH transmittable timing described above in the TRP. This allows the UE to have already acquired the system information used in the switch destination TRP at the time of the TRP switch, for example, and thus the UE becomes capable of promptly executing the TRP switch.

The UE may stop the transmission and reception of the signal and/or the data via the TRP before switch by using the random access command from the gNB. The UE may restart the transmission and reception of the signal and/or the data via the TRP after switch by using the RA response received from the gNB via the TRP after switch. The same may hold true for the gNB. With this, for example, interference to the TRP before switch and/or after switch during the TRP switch can be prevented.

The UE may transmit, to the TRP before switch, a HARQ response to the random access command from the gNB. The transmission of the HARQ response may be performed when, for example, the random access command is performed by using RRC signaling or MAC signaling. With this, for example, even when a HARQ decoded result of the signaling in the UE indicates NG, the UE becomes capable of notifying the gNB of a HARQ-Nack, and also the gNB becomes capable of retransmitting the random access command to the UE.

The UE may transmit, to the TRP before switch, a HARQ response to downlink data from the gNB. The transmission of the HARQ response to the TRP before switch may be, for example, performed before transmission of the HARQ response to the random access command described above. With this, for example, even when a HARQ decoded result of the downlink data in the UE indicates NG, the UE becomes capable of notifying the gNB of a HARQ-Nack, and also the gNB becomes capable of retransmitting the downlink data to the UE.

The UE may transmit, to the TRP after switch, a HARQ response to downlink data from the gNB. The transmission of the HARQ response to the TRP after switch may be, for example, performed after transmission of the HARQ response to the random access command described above. The UE may defer the HARQ response until the PRACH transmission timing to the TRP after switch. With this, for example, effects similar to the above can be obtained.

The UE may receive, from the TRP before switch, a HARQ response to uplink data to the gNB. The reception of the HARQ response from the TRP before switch may be, for example, performed before transmission of the HARQ response to the random access command described above. With this, for example, even when a HARQ decoded result of the uplink data in the gNB indicates NG, the UE becomes capable of receiving a HARQ-Nack from the gNB, and also the UE becomes capable of retransmitting the uplink data to the gNB.

The UE may receive, from the TRP after switch, a HARQ response to uplink data to the gNB. The reception of the HARQ response from the TRP after switch may be, for example, performed before transmission of the HARQ response to the random access command described above. The UE may defer reception of the HARQ response until the RA response reception timing from the TRP after switch or later. With this, for example, effects similar to the above can be obtained.

As another example, the UE need not assume downlink data reception at or after the random access command or after the command. The UE may not receive downlink data at or after the random access command or after the command. The downlink data transmission to the UE may be restarted after the RA response from the TRP after switch. With this, for example, complexity of design in the communication system can be avoided.

As another example, the UE may not perform uplink data transmission at or after the random access command or after the command. The uplink data transmission from the UE may be restarted after the RA response from the TRP after switch. With this, for example, complexity of design in the communication system can be avoided.

The UE may re-select or re-determine the connection destination TRP. The operation described above may be, for example, performed when the UE fails in switch processing to the TRP after switch. The failure in the switch processing may be, for example, failure in the random access processing, or may be failure in acquisition of the SS block. The UE may include information indicating failure in the TRP switch processing and thereby notify the gNB of the information in the re-selection or re-determination of the connection destination TRP. With this, for example, a communication unable state between the gNB and the UE in a case of failure in the TRP switch processing can be avoided. As a result, robustness in the communication system can be enhanced.

Figure 14:
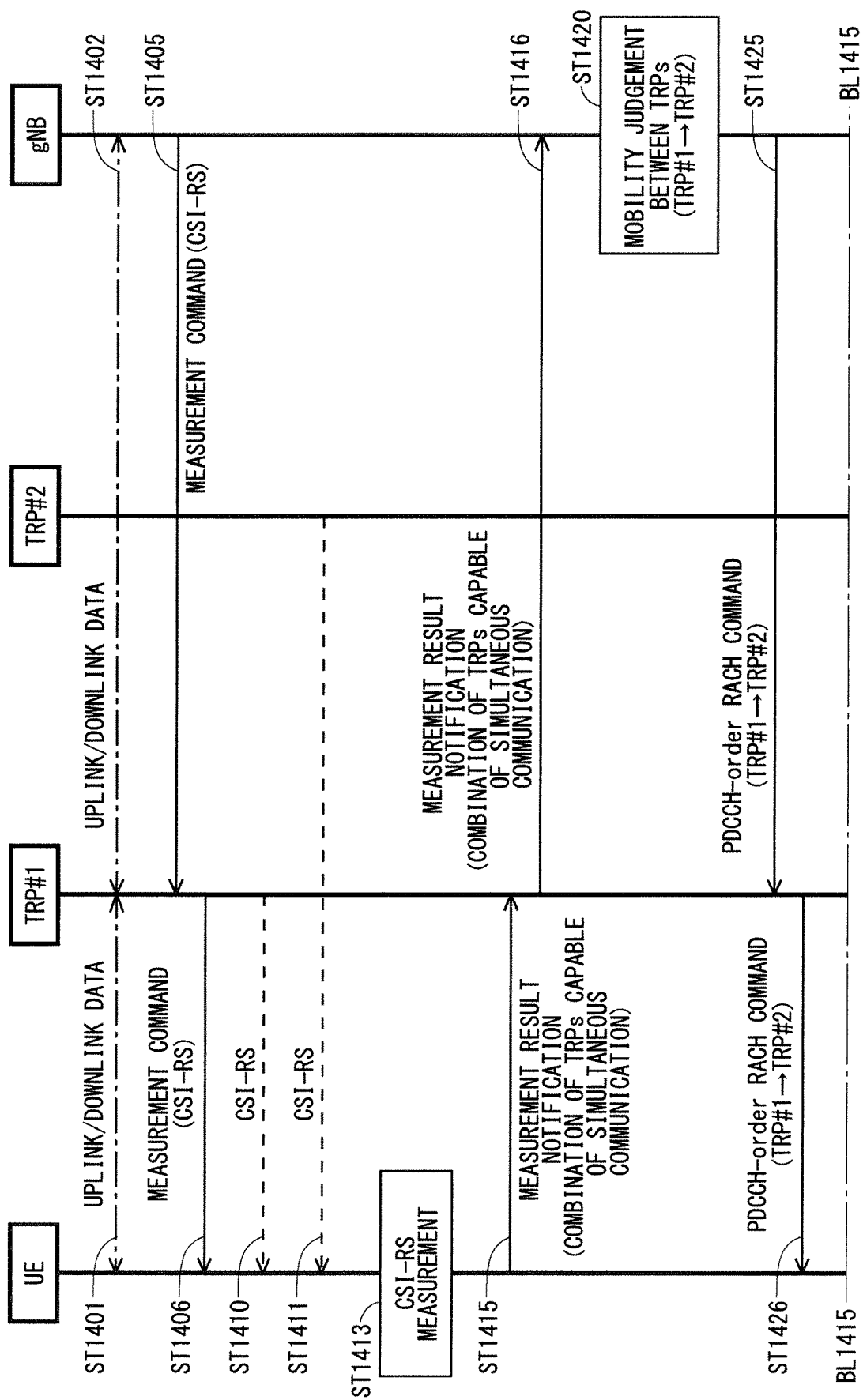
FIG. 14 is a diagram illustrating operation of switching connected TRPs of the UE according to the first embodiment.
Figure 15:
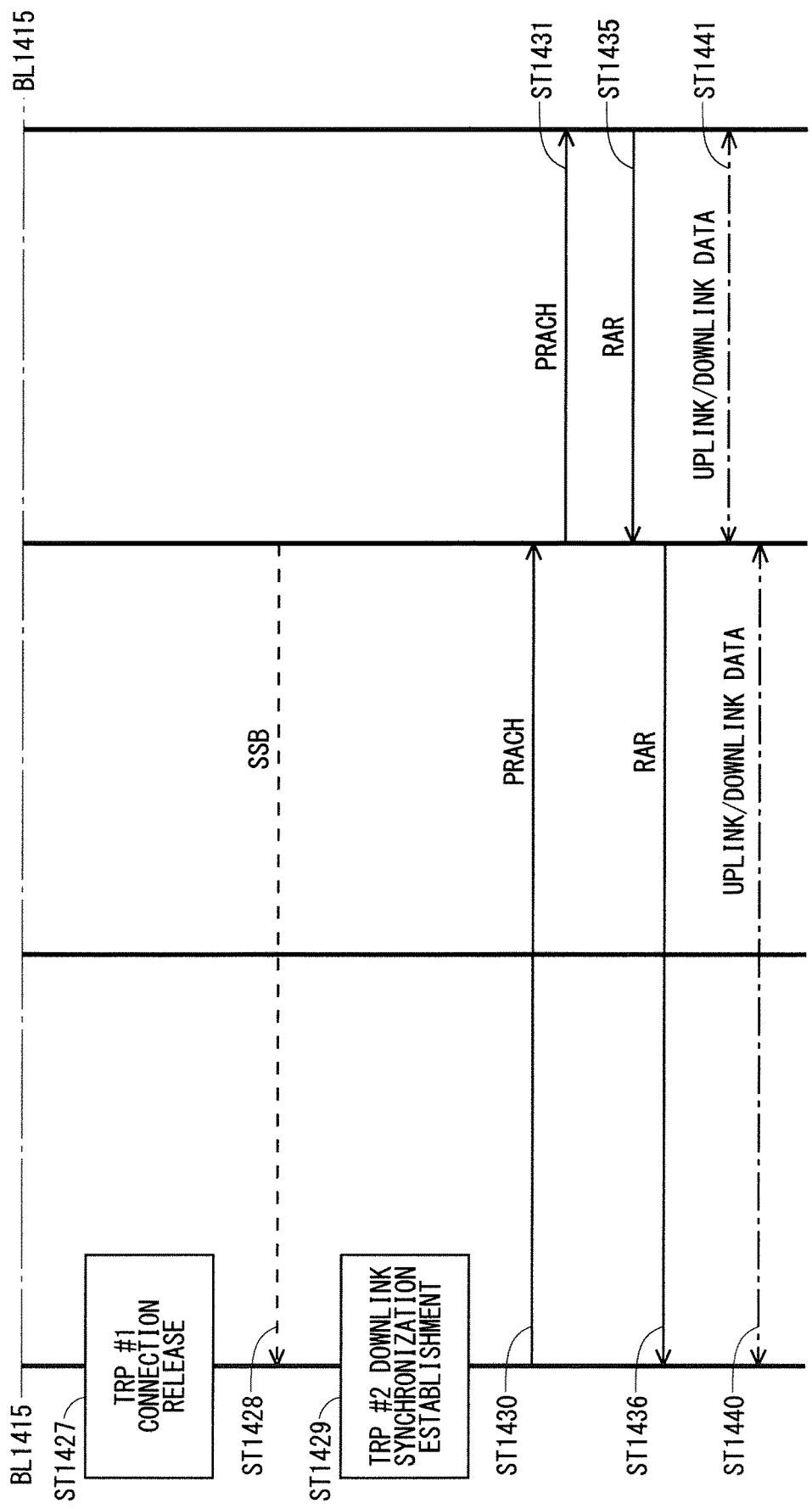
FIG. 15 is a diagram illustrating operation of switching connected TRPs of the UE according to the first embodiment.

FIG. 14 and FIG. 15 are each a diagram illustrating operation of switching connected TRPs of the UE. FIG. 14 and FIG. 15 are connected at the position of the boundary line BL1415. In the example illustrated in FIG. 14 and FIG. 15, it is assumed that the TRP connected by the UE is switched from TRP #1 to TRP #2. Further, FIG. 14 and FIG. 15 illustrate an operation example of a case in which the UE measures the CSI-RS, and the gNB determines the connection destination TRP by using the measurement results.

In Steps ST1401 and ST1402 illustrated in FIG. 14, transmission and reception of uplink/downlink data via TRP #1 is performed between the UE and the gNB. Step ST1401 illustrates data transmission and reception between the UE and TRP #1, and further, Step ST1402 illustrates data transmission and reception between TRP #1 and the gNB.

In Steps ST1405 and ST1406 illustrated in FIG. 14, the gNB commands measurement of the CSI-RS to the UE via TRP #1. Step ST1405 illustrates the measurement command from the gNB to TRP #1, and further, Step ST1406 illustrates the measurement command from TRP #1 to the UE. The measurement commands illustrated in Steps ST1405 and ST1406 may be performed by using RRC signaling, may be performed by using MAC signaling, or may be performed by using L1/L2 signaling.

In Steps ST1410 and ST1411 illustrated in FIG. 14, TRP #1 and TRP #2 transmit the CSI-RS to the UE. Step ST1410 illustrates CSI-RS transmission from TRP #1, and further, Step ST1411 illustrates CSI-RS transmission from TRP #2. In Step ST1413, the UE receives the CSI-RSs illustrated in Steps ST1410 and ST1411, and performs measurement of the signals.

In Steps ST1415 and ST1416 illustrated in FIG. 14, the UE notifies the gNB of measurement results of the CSI-RSs via TRP #1. Step ST1415 illustrates measurement result notification from the UE to TRP #1, and further, Step ST1416 illustrates measurement result notification from TRP #1 to the gNB. The measurement result notifications illustrated in Steps ST1415 and ST1416 may be performed by using RRC signaling, may be performed by using MAC signaling, or may be performed by using L1/L2 signaling.

In Step ST1420 illustrated in FIG. 14, the gNB judges that the connection destination TRP of the UE is to be switched from TRP #1 to TRP #2, by using the measurement results of Step ST1416.

In Steps ST1425 and ST1426 illustrated in FIG. 14, the gNB commands the start of the RACH to the UE via TRP #1. Step ST1425 illustrates the command from the gNB to TRP #1, and further, Step ST1426 illustrates the command from TRP #1 to the UE. The command may be transmitted by using the PDCCH. The command includes information indicating switch from TRP #1 to TRP #2. The command may include information related to the RA preamble. Using Step ST1426, the UE releases connection with TRP #1 in Step ST1427 illustrated in FIG. 15. Further, in Step ST1428 illustrated in FIG. 15, the SS block is transmitted from TRP #2 to the UE, and in Step ST1429 illustrated in FIG. 15, the UE establishes downlink synchronization with TRP #2 by using the SS block of Step ST1428. After transmitting the command in Step ST1425, the gNB stops downlink data transmission via TRP #1. After receiving the command in Step ST1426, the UE stops uplink data transmission via TRP #1.

In Steps ST1430 and ST1431 illustrated in FIG. 15, the UE transmits the PRACH to the gNB via TRP #2. Step ST1430 illustrates PRACH transmission from the UE to TRP #2, and further, Step ST1431 illustrates PRACH transmission from TRP #2 to the gNB. The RA preamble in the PRACH transmission may be, or may be different from, the RA preamble included in Step ST1426.

In Steps ST1435 and ST1436 illustrated in FIG. 15, the gNB notifies the UE of a random access response via TRP #2. Step ST1435 illustrates random access response notification from the gNB to TRP #2, and further, Step ST1436 illustrates random access response notification from TRP #2 to the UE. The UE establishes uplink synchronization with TRP #2 by using the response. After transmitting the command in Step ST1435, the gNB starts downlink data transmission via TRP #2. After receiving the command in Step ST1436, the UE starts uplink data transmission via TRP #2.

In Steps ST1440 and ST1441 illustrated in FIG. 15, transmission and reception of uplink/downlink data via TRP #2 is performed between the UE and the gNB. Step ST1440 illustrates data transmission and reception between the UE and TRP #2, and further, Step ST1441 illustrates data transmission and reception between TRP #2 and the gNB.

FIG. 14 and FIG. 15 illustrate an example in which measurement of the CSI-RS is performed. However, measurement of the SS block may be performed. The gNB may command measurement of the SS block to the UE in Steps ST1405 and ST1406. The UE may notify the gNB of measurement results of the SS block in Steps ST1415 and ST1416. With this, for example, the UE can directly use the signal used for synchronization of a measurement target TRP as a measurement target, and thus the UE becomes capable of prompt measurement.

FIG. 14 and FIG. 15 illustrate an example in which the TRP #1 connection release in the UE illustrated in Step ST1427 is performed before the PRACH transmission of Step ST1430. However, the TRP #1 connection release may be performed after the random access response of Step ST1436. With this, for example, the UE becomes capable of continuing connection with TRP #1 even when the UE fails in connection with TRP #2. As a result, reliability of the communication system can be enhanced.

FIG. 14 and FIG. 15 illustrate an example in which the UE establishes uplink synchronization after the random access response of Step ST1436. However, the UE may transmit message 3 of random access to the gNB. The gNB may transmit message 4 of random access to the UE. The transmission and reception of message 3 and message 4 of random access described above may be, for example, applied when the UE uses the RA preamble that is different from the RA preamble notified from the gNB in Step ST1431. With this, for example, contention-based random access is enabled in TRP switch between the UE and the gNB. As a result, the number of accommodation UEs in the gNB can be increased.

Another solution will be disclosed. In switch of the TRP to be connected by the UE, the UE autonomously starts random access processing. Specifically, the UE may start the random access processing without the random access command described above transmitted from the gNB. The random access command described above may be, for example, a TRP switch command.

The gNB may not perform reject response to the autonomous random access processing by the UE. Operation in which the base station gives the TRP switch command and/or the TRP release command to the UE subsequently to the random access processing may be performed as reject operation to the autonomous random access processing in the gNB. With this, for example, flexibility in the communication system can be enhanced.

As another example, the gNB may perform the reject response to the autonomous random access processing by the UE. The response may be, for example, operation in which the RA response is not performed in a predetermined period. With this, for example, complexity of design in the communication system can be avoided.

The random access processing described above may be contention-free random access. Specifically, the UE may use the RA preamble assigned in advance by the gNB. With this, for example, the random access processing can be promptly completed. As another example, the random access processing described above may be contention-based random access. With this, for example, depletion of resources of the RA preamble in the gNB can be prevented. As a result, the number of accommodation UEs in the gNB can be increased.

The method disclosed in the first embodiment may be applied to switch of the TRP when the UE performs transmission and reception with a plurality of TRPs. In the description above, a single TRP to be switched may be present, or a plurality of TRPs to be switched may be present. When a plurality of TRPs are switched, the TRP may be switched one by one, or switch of a plurality of TRPs may be performed at a time. For example, when the switch of a plurality of TRPs is performed at a time, the TRP switch can be promptly executed.

The UE may notify the gNB of information related to a combination of TRPs to which the UE can simultaneously communicate. The information may be information related to a combination of beams to which the UE can simultaneously communicate. The UE may include the information in signaling of the measurement result report described above for notification, or may use different signaling for notification. The gNB may use the information for judgement of the switch destination TRP in the UE. With this, for example, the gNB becomes capable of easily judging the TRP to which the UE can simultaneously communicate. As a result, a communication rate between the UE and the gNB can be enhanced, and also reliability between the UE and the gNB can be enhanced.

In notification of the TRP switch command from the gNB to the UE, for example, the TRP used in communication of the PCell may be used, the TRP used in communication of the PSCell may be used, or the TRP used in communication of the SCell capable of PDCCH transmission may be used.

Figure 16:
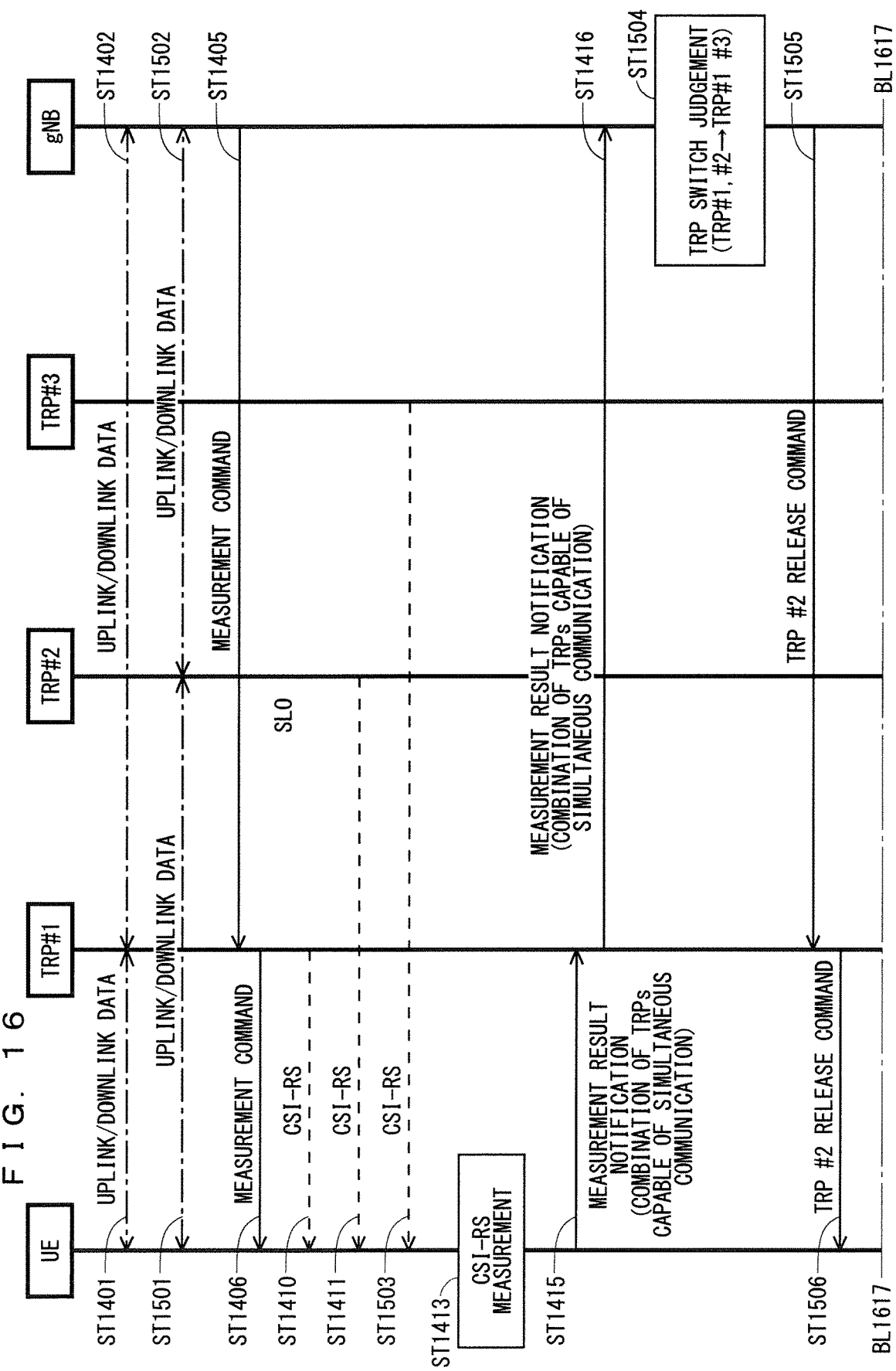
FIG. 16 is a diagram illustrating operation in which the UE connected to a plurality of TRPs switches connected TRPs according to the first embodiment.
Figure 17:
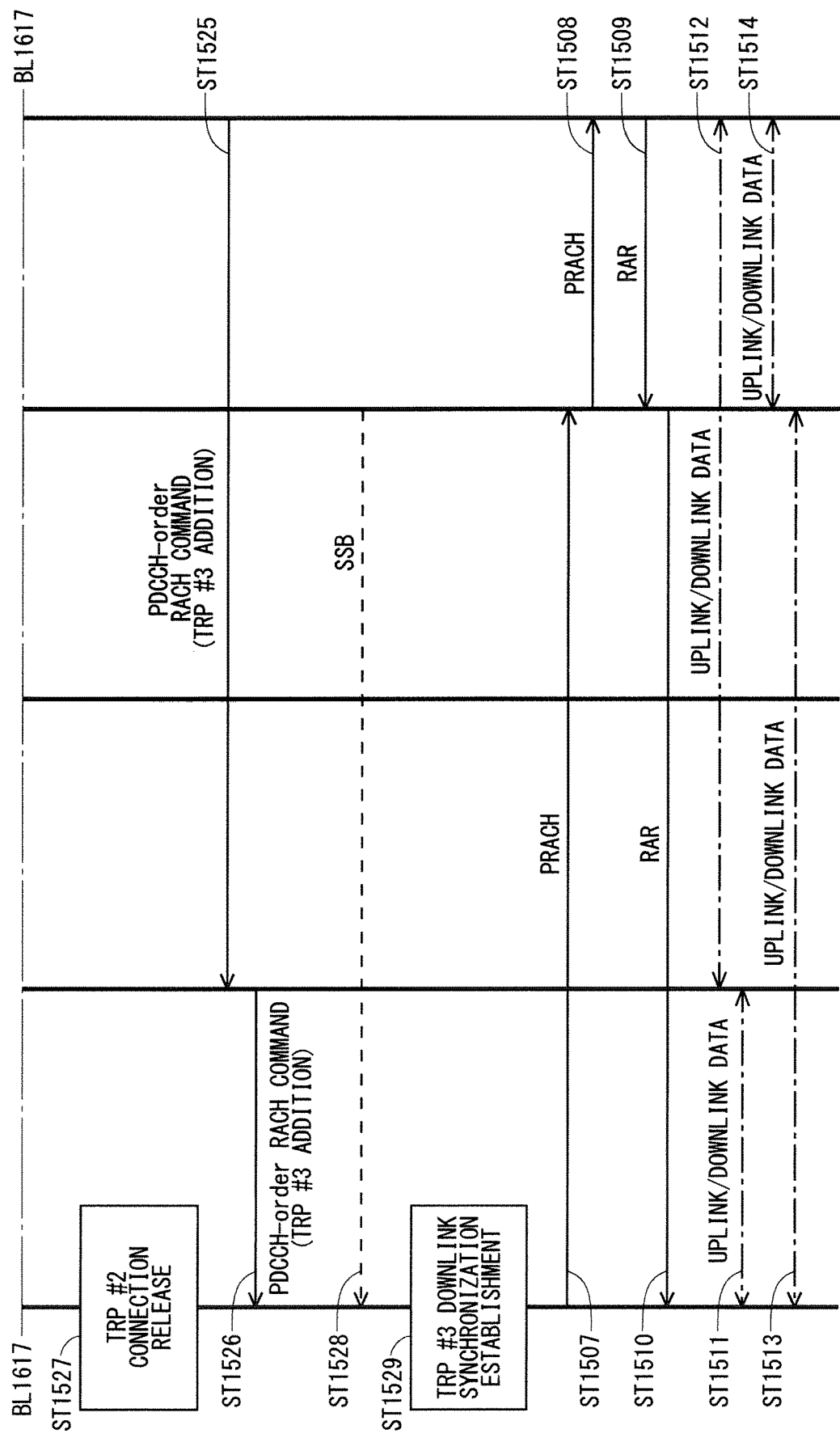
FIG. 17 is a diagram illustrating operation in which the UE connected to a plurality of TRPs switches connected TRPs according to the first embodiment.

FIG. 16 and FIG. 17 are each a diagram illustrating operation in which the UE connected to a plurality of TRPs switches the connected TRP. FIG. 16 and FIG. 17 are connected at the position of the boundary line BL1617. In the example illustrated in FIG. 16 and FIG. 17, it is assumed that the TRP connected by the UE is switched from TRPs #1 and #2 to TRPs #1 and #3. Further, FIG. 16 and FIG. 17 illustrate an operation example of a case in which the UE measures the CSI-RS, and the gNB determines the connection destination TRP by using the measurement results. In FIG. 16 and FIG. 17, the parts common to those of FIG. 14 and FIG. 15 are denoted by the same numbers, and common description will be omitted.

Steps ST1401 and ST1402 in FIG. 16 are similar to those of FIG. 14.

In Steps ST1501 and ST1502 illustrated in FIG. 16, transmission and reception of uplink/downlink data via TRP #2 is performed between the UE and the gNB. Step ST1501 illustrates data transmission and reception between the UE and TRP #2, and further, Step ST1502 illustrates data transmission and reception between TRP #2 and the gNB.

Steps ST1405 to ST1411 in FIG. 16 are similar to those of FIG. 14.

In Step ST1503 illustrated in FIG. 16, TRP #3 transmits the CSI-RS to the UE. In Step ST1413, the UE receives the CSI-RSs illustrated in Steps ST1410, ST1411, and ST1503, and performs measurement of the signals.

Steps ST1415 and ST1416 in FIG. 16 are similar to those of FIG. 14.

In Step ST1504 illustrated in FIG. 16, the gNB judges that the connection destination TRP of the UE is to be switched from TRPs #1 and #2 to TRPs #1 and #3, by using the measurement results of Step ST1416.

In Steps ST1505 and ST1506 illustrated in FIG. 16, the gNB notifies the UE of a command to release TRP #2 via TRP #1. Step ST1505 illustrates the command from the gNB to TRP #1, and further, Step ST1506 illustrates the command from TRP #1 to the UE. The command may be transmitted by using the PDCCH. Using Step ST1506, the UE releases connection with TRP #2 in Step ST1527 illustrated in FIG. 17.

In Steps ST1525 and ST1526 illustrated in FIG. 17, the gNB starts a command of the RACH to the UE via TRP #1. Step ST1525 illustrates the command from the gNB to TRP #1, and further, Step ST1526 illustrates the command from TRP #1 to the UE. The command may be transmitted by using the PDCCH. The command includes information indicating addition of TRP #3. The command may include information related to the RA preamble. Using Step ST1526, the UE starts reception operation of the SS block transmitted from TRP #3 to the UE in Step ST1528 illustrated in FIG. 17. In Step ST1529 illustrated in FIG. 17, the UE establishes downlink synchronization with TRP #3 by using the SS block of Step ST1528.

In Steps ST1507 and ST1508 illustrated in FIG. 17, the UE transmits the PRACH to the gNB via TRP #3. Step ST1507 illustrates PRACH transmission from the UE to TRP #3, and further, Step ST1508 illustrates PRACH transmission from TRP #3 to the gNB. The RA preamble in the PRACH transmission may be, or may be different from, the RA preamble included in Step ST1526.

In Steps ST1509 and ST1510 illustrated in FIG. 17, the gNB notifies the UE of a random access response via TRP #3. Step ST1509 illustrates random access response notification from the gNB to TRP #3, and further, Step ST1510 illustrates random access response notification from TRP #3 to the UE. The UE establishes uplink synchronization with TRP #3 by using the response. After transmitting the response in Step ST1509, the gNB starts downlink data transmission via TRP #3. After receiving the response in Step ST1510, the UE starts uplink data transmission via TRP #3.

In Steps ST1511 and ST1512 illustrated in FIG. 17, transmission and reception of uplink/downlink data via TRP #1 is performed between the UE and the gNB. Step ST1511 illustrates data transmission and reception between the UE and TRP #1, and further, Step ST1512 illustrates data transmission and reception between TRP #1 and the gNB.

In Steps ST1513 and ST1514 illustrated in FIG. 17, uplink/downlink data transmission and reception via TRP #3 is performed between the UE and the gNB. Step ST1513 illustrates data transmission and reception between the UE and TRP #3, and further, Step ST1514 illustrates data transmission and reception between TRP #3 and the gNB.

FIG. 16 and FIG. 17 illustrate an example in which measurement of the CSI-RS is performed. However, measurement of the SS block may be performed. The gNB may command measurement of the SS block to the UE in Steps ST1405 and ST1406. The UE may notify the gNB of measurement results of the SS block in Steps ST1415 and ST1416. With this, for example, the UE can directly use the signal used for synchronization of a measurement target TRP as a measurement target, and thus the UE becomes capable of prompt measurement.

FIG. 16 and FIG. 17 illustrate an example in which the command to release TRP #2 from the gNB to the UE illustrated in Steps ST1505 and ST1506 and the TRP #2 connection release in the UE illustrated in Step ST1527 are performed before the RACH transmission command of Steps ST1525 and ST1526. However, the command to release TRP #2 from the gNB to the UE and the TRP #2 connection release in the UE may be performed after the random access response of Steps ST1509 and ST1510. With this, for example, even when the UE fails in connection with TRP #3, the UE becomes capable of continuing connection with TRP #2. As a result, reliability of the communication system can be enhanced.

FIG. 16 and FIG. 17 illustrate an example in which the UE establishes uplink synchronization after the random access response of Step ST1510. However, the UE may transmit message 3 of random access to the gNB. The gNB may transmit message 4 of random access to the UE. The transmission and reception of message 3 and message 4 of random access described above may be, for example, applied when the UE uses the RA preamble that is different from the RA preamble notified from the gNB in Step ST1508. With this, for example, contention-based random access is enabled in TRP switch between the UE and the gNB. As a result, the number of accommodation UEs in the gNB can be increased.

FIG. 16 and FIG. 17 illustrate an example in which the release of TRP #2 illustrated as Steps ST1505 and ST1506 is performed via TRP #1. However, the release may be performed via TRP #2. With this, for example, the gNB and the UE become capable of transmission and reception of data to and from each other by using resources of TRP #1. As a result, efficiency in the communication system can be enhanced.

In switch of the TRP in the UE connected to a plurality of TRPs, the autonomous random access processing by the UE may be performed. In the description above, the switch of the TRP may be performed one by one. Further, the TRP before switch may be, for example, the TRP used in communication of the PCell, may be the TRP used in communication of the PSCell, or may be the SCell capable of PDCCH transmission. As another example, the PRACH may include information of the TRP before switch. For example, the RA preamble may be determined by using an identifier of the TRP before switch.

The gNB may not perform reject response to the autonomous random access processing by the UE. Operation in which the base station gives the TRP switch command and/or the TRP release command to the UE subsequently to the random access processing may be performed as reject operation to the autonomous random access processing in the gNB. With this, for example, flexibility in the communication system can be enhanced.

As another example, the gNB may perform the reject response to the autonomous random access processing by the UE. The response may be, for example, operation in which the RA response is not performed in a predetermined period. With this, for example, complexity of design in the communication system can be avoided.

The method disclosed in the first embodiment may be applied to addition of the connected TRP in the UE. In the description above, a single TRP to be added may be present, or a plurality of TRPs to be added may be present. When a plurality of TRPs are switched, the TRP may be switched one by one, or a plurality of TRPs may be switched at a time. For example, when a plurality of TRPs are switched at a time, the TRP switch can be promptly executed.

The UE may notify the gNB of information related to a combination of TRPs to which the UE can simultaneously communicate. Details included in the information and/or a notification method may be similar to those used in the switch of the TRP when the UE performs transmission and reception with a plurality of TRPs. With this, for example, effects similar to the above can be obtained.

Figure 18:
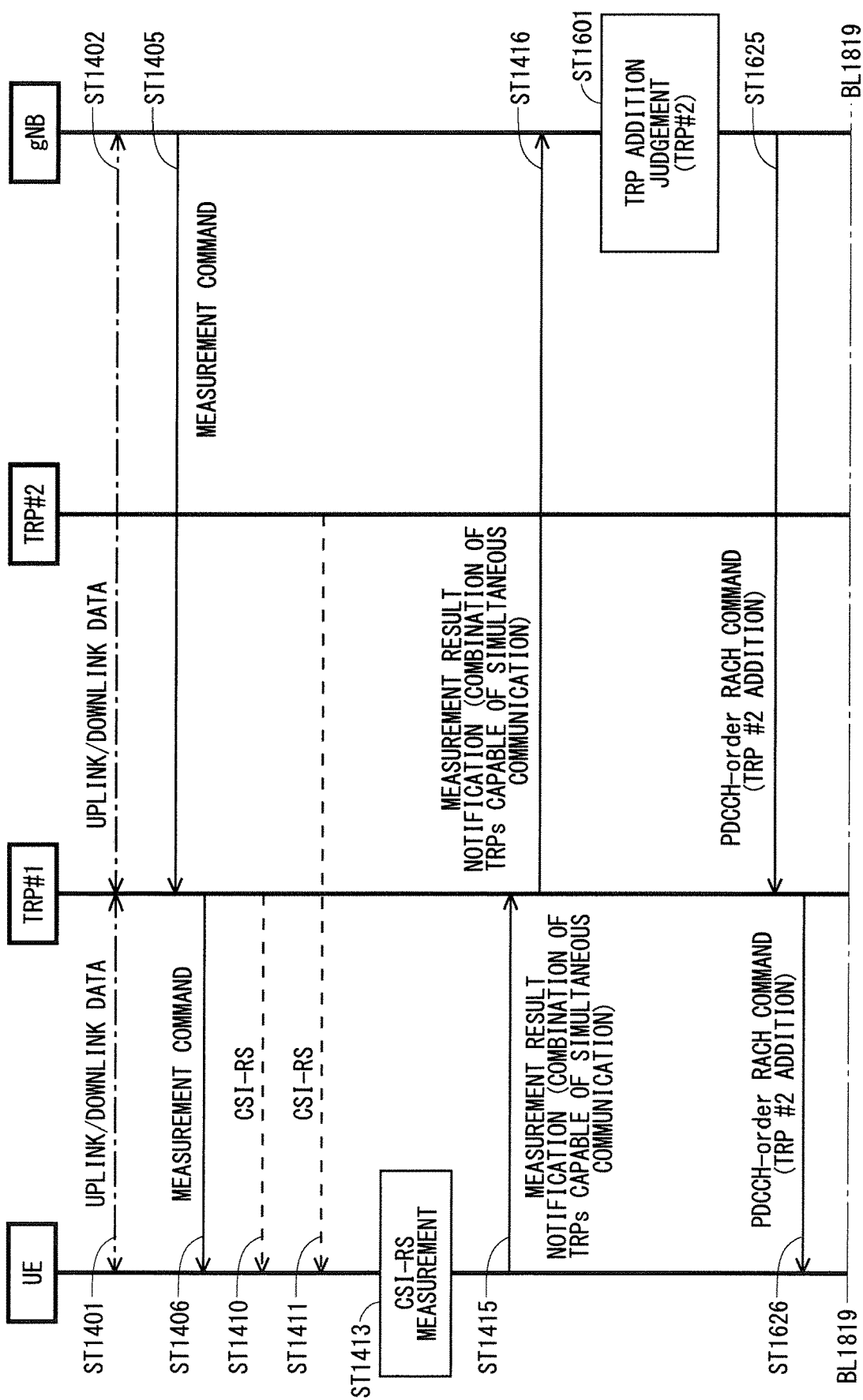
FIG. 18 is a diagram illustrating operation of adding a connected TRP in the UE according to the first embodiment.

FIG. 18 and FIG. 19 are each a diagram illustrating operation of addition of the connected TRP in the UE. FIG. 18 and FIG. 19 are connected at the position of the boundary line BL1819. The example illustrated in FIG. 18 and FIG. 19 illustrates a case in which TRP #2 is added as the connection destination regarding the UE connected to TRP #1. Further, FIG. 18 and FIG. 19 illustrate an operation example in which the UE measures the CSI-RS, and the gNB determines addition of the connection destination TRP by using the measurement results. In FIG. 18 and FIG. 19, the parts common to those of FIG. 14 and FIG. 15 and FIG. 16 and FIG. 17 are denoted by the same numbers, and common description will be omitted.

Steps ST1401 to ST1416 in FIG. 18 are similar to those of FIG. 14.

In Step ST1601 illustrated in FIG. 18, the gNB judges that TRP #2 is to be added to the connection destination TRP of the UE, by using the measurement results of Step ST1416.

In Steps ST1625 and ST1626 in FIG. 18, the gNB starts a command of the RACH to the UE via TRP #1. Step ST1625 illustrates the command from the gNB to TRP #1, and further, Step ST1626 illustrates the command from TRP #1 to the UE. The command may be transmitted by using the PDCCH. The command includes information indicating addition of TRP #2. The command may include information related to the RA preamble. Using Step ST1626, the UE starts reception operation of the SS block transmitted from TRP #2 to the UE in Step ST1428 illustrated in FIG. 19. In Step ST1429 illustrated in FIG. 19, the UE establishes downlink synchronization with TRP #2 by using the SS block of Step ST1428.

Steps ST1430, ST1431, ST1435, and ST1436 in FIG. 19 are similar to those of FIG. 15.

Steps ST1511 and ST1512 illustrated in FIG. 19 are similar to those of FIG. 17. Steps ST1440 and ST1441 illustrated in FIG. 19 are similar to those of FIG. 15.

FIG. 18 and FIG. 19 illustrate an example in which measurement of the CSI-RS is performed. However, measurement of the SS block may be performed. The gNB may command measurement of the SS block to the UE in Steps ST1405 and ST1406. The UE may notify the gNB of measurement results of the SS block in Steps ST1415 and ST1416. With this, for example, the UE can directly use the signal used for synchronization of a measurement target TRP as a measurement target, and thus the UE becomes capable of prompt measurement.

FIG. 18 and FIG. 19 illustrate an example in which the UE establishes uplink synchronization after the random access response of Step ST1435. However, the UE may transmit message 3 of random access to the gNB. The gNB may transmit message 4 of random access to the UE. The transmission and reception of message 3 and message 4 of random access described above may be, for example, applied when the UE uses the RA preamble that is different from the RA preamble notified from the gNB in Step ST1431. With this, for example, contention-based random access is enabled in TRP switch between the UE and the gNB. As a result, the number of accommodation UEs in the gNB can be increased.

In the addition of the TRP, the autonomous random access processing by the UE may be performed. In the description above, the addition of the TRP may be performed one by one. The operation performed through the autonomous random access processing by the UE (for example, the switch of the TRP and the addition of the TRP) may be statically determined in a specification, or may be broadcast or notified from the gNB to the UE. As another example, information related to the operation may be included in the PRACH. For example, the RA preamble may be determined by using an identifier of the TRP before switch. With this, for example, the processing of TRP addition can be promptly executed.

The gNB may not perform reject response to the autonomous random access processing by the UE. Operation in which the base station gives the TRP switch command and/or the TRP release command to the UE subsequently to the random access processing may be performed as reject operation to the autonomous random access processing in the gNB. With this, for example, flexibility in the communication system can be enhanced.

As another example, the gNB may perform the reject response to the autonomous random access processing by the UE. The response may be, for example, operation in which the RA response is not performed in a predetermined period. With this, for example, complexity of design in the communication system can be avoided.

Figure 20:
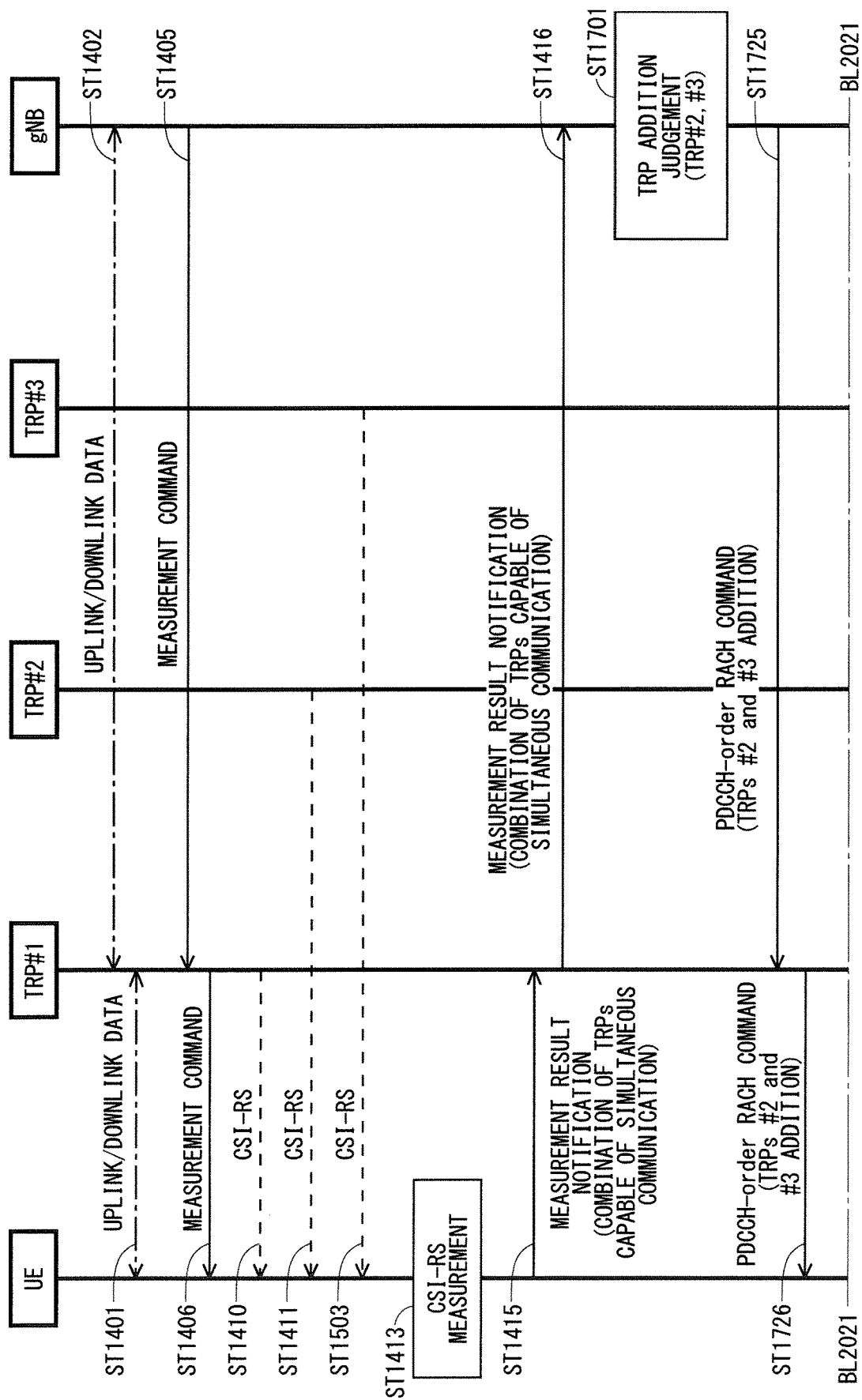
FIG. 20 is a diagram illustrating operation in which a plurality of TRPs connected to the UE are collectively added according to the first embodiment.
Figure 21:
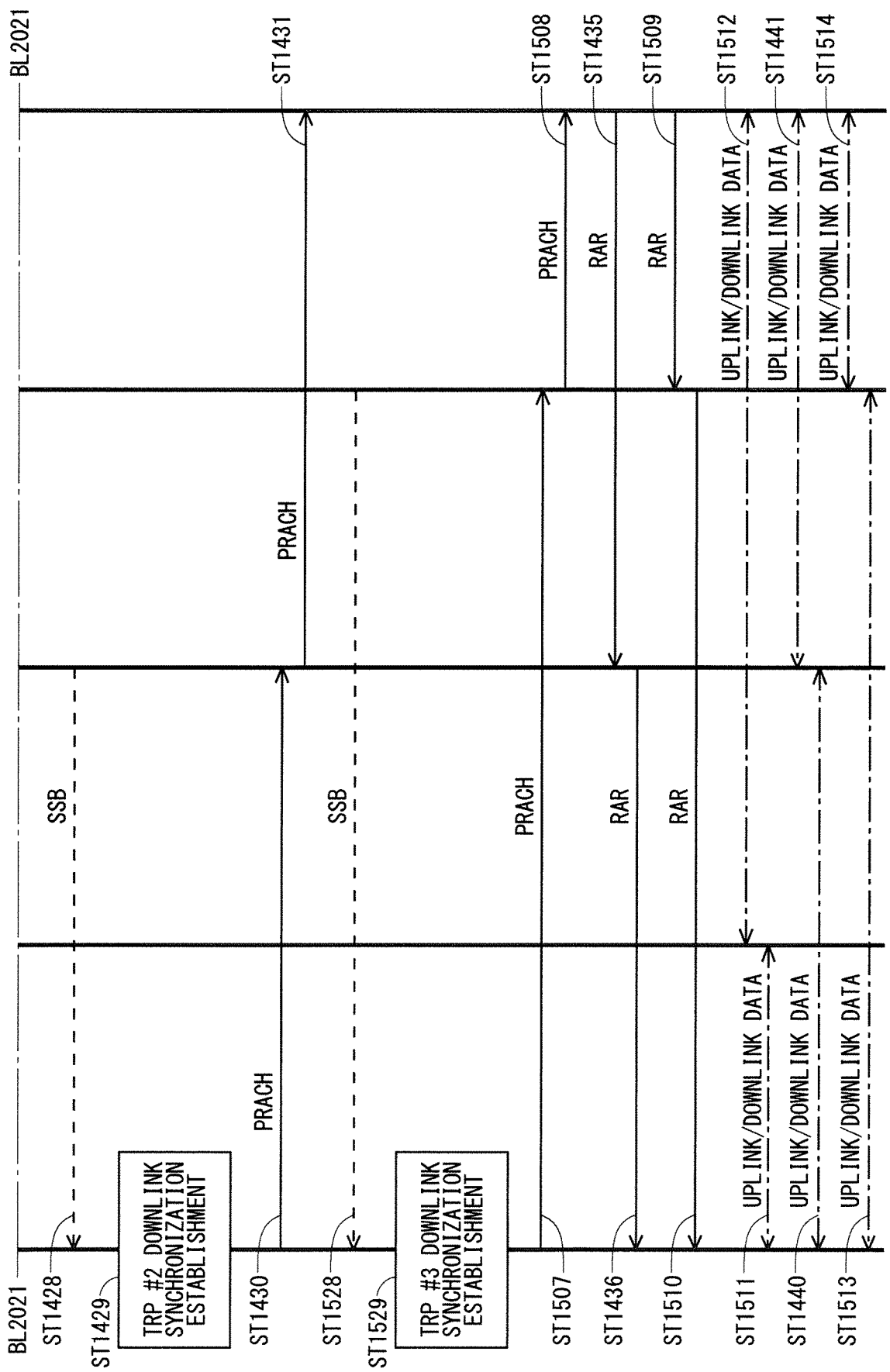
FIG. 21 is a diagram illustrating operation in which a plurality of TRPs connected to the UE are collectively added according to the first embodiment.

FIG. 20 and FIG. 21 are each a diagram illustrating operation in which a plurality of TRPs connected to the UE are collectively added. FIG. 20 and FIG. 21 are connected at the position of the boundary line BL2021. The example illustrated in FIG. 20 and FIG. 21 illustrates a case in which TRPs #2 and #3 are added as the connection destinations regarding the UE connected to TRP #1. Further, FIG. 20 and FIG. 21 illustrate an operation example of a case in which the UE measures the CSI-RS, and the gNB determines addition of the connection destination TRP by using the measurement results. In FIG. 20 and FIG. 21, the parts common to those of FIG. 14 and FIG. 15 and FIG. 16 and FIG. 17 are denoted by the same numbers, and common description will be omitted.

Steps ST1401 to ST1411 in FIG. 20 are similar to those of FIG. 14. Step ST1503 in FIG. 20 is similar to that of FIG. 16. Steps ST1413 to ST1416 in FIG. 20 are similar to those of FIG. 14.

In Step ST1701 illustrated in FIG. 20, the gNB judges that TRP #2 and TRP #3 are to be added as the connection destination TRPs of the UE, by using the measurement results of Step ST1416.

In Steps ST1725 and ST1726 illustrated in FIG. 20, the gNB starts a command of the RACH to the UE via TRP #1. Step ST1725 illustrates the command from the gNB to TRP #1, and further, Step ST1726 illustrates the command from TRP #1 to the UE. The command may be transmitted by using the PDCCH. The command includes information indicating addition of TRP #2 and TRP #3. The command may include information related to the RA preamble. The information related to the RA preamble may be different from or the same as each other regarding TRP #2 and TRP #3. Using Step ST1726, the UE starts reception operation of the SS block transmitted from TRP #2 to the UE in Step ST1428 illustrated in FIG. 21. In Step ST1429 illustrated in FIG. 21, the UE establishes downlink synchronization with TRP #2 by using the SS block of Step ST1428.

In Steps ST1430 and ST1431 illustrated in FIG. 21, the UE transmits the PRACH to the gNB via TRP #2. The PRACH transmission is similar to that of FIG. 15.

Using Step ST1726, the UE starts reception operation of the SS block transmitted from TRP #3 to the UE in Step ST1528 without waiting for the RA responses of Steps ST1435 and ST1436 illustrated in FIG. 21. In Step ST1529 illustrated in FIG. 21, the UE establishes downlink synchronization with TRP #3 by using the SS block of Step ST1528.

In Steps ST1507 and ST1508, the UE transmits the PRACH to the gNB via TRP #3 without waiting for the RA responses of Steps ST1435 and ST1436 illustrated in FIG. 21. The PRACH transmission is similar to that of FIG. 17.

In Steps ST1435 and ST1436 illustrated in FIG. 21, the gNB notifies the UE of a random access response via TRP #2. The random access response is similar to that of FIG. 17.

In Steps ST1509 and ST1510 illustrated in FIG. 21, the gNB notifies the UE of a random access response via TRP #3. The random access response is similar to that of FIG. 17.

Steps ST1511 and ST1512 illustrated in FIG. 21 are similar to those of FIG. 17. Steps ST1440 and ST1441 illustrated in FIG. 21 are similar to those of FIG. 15. Steps ST1513 and ST1514 illustrated in FIG. 21 are similar to those of FIG. 17.

FIG. 20 and FIG. 21 illustrate an example in which measurement of the CSI-RS is performed. However, measurement of the SS block may be performed. The gNB may command measurement of the SS block to the UE in Steps ST1405 and ST1406. The UE may notify the gNB of measurement results of the SS block in Steps ST1415 and ST1416. With this, for example, the UE can directly use the signal used for synchronization of a measurement target TRP as a measurement target, and thus the UE becomes capable of prompt measurement.

FIG. 20 and FIG. 21 illustrate an example in which the UE establishes uplink synchronization after the random access response of Steps ST1436 and ST1510. However, the UE may transmit message 3 of random access to the gNB. The gNB may transmit message 4 of random access to the UE. The transmission and reception of message 3 and message 4 of random access described above may be, for example, applied when the UE uses the RA preamble that is different from the RA preamble notified from the gNB in Step ST1726. With this, for example, contention-based random access is enabled in TRP switch between the UE and the gNB. As a result, the number of accommodation UEs in the gNB can be increased.

FIG. 20 and FIG. 21 illustrate an example in which the SS block reception from TRP #3 illustrated in Step ST1428 and the TRP #3 downlink synchronization establishment illustrated in Step ST1529 are performed after the PRACH transmission via TRP #2 illustrated in Steps ST1430 and ST1431. However, the SS block reception from TRP #3 and the TRP #3 downlink synchronization establishment may be performed before the PRACH transmission via TRP #2. With this, for example, the UE becomes capable of promptly executing downlink synchronization establishment with TRP #3.

FIG. 20 and FIG. 21 illustrate an example in which the SS block reception from TRP #2, the downlink synchronization establishment with TRP #2, and the PRACH transmission via TRP #2 illustrated in Steps ST1428 to ST1431 are performed before the SS block reception from TRP #3, the downlink synchronization establishment with TRP #3, and the PRACH transmission via TRP #3 illustrated in Steps ST1528, ST1529, ST1507, and ST1508. However, the SS block reception from TRP #2, the downlink synchronization establishment with TRP #2, and the PRACH transmission via TRP #2 may be performed after the SS block reception from TRP #3, the downlink synchronization establishment with TRP #3, and the PRACH transmission via TRP #3. The operation performed afterwards described above may be, for example, performed when SS block transmission timing from TRP #3 precedes SS block transmission timing from TRP #2. With this, for example, prompt TRP addition processing in the UE can be achieved, according to the SS block transmission timings of TRPs #2 and #3.

The method disclosed in the first embodiment may be applied to release of the connected TRP in the UE. In the description above, a single TRP to be released may be present, or a plurality of TRPs to be released may be present. When a plurality of TRPs are released, the TRP may be released one by one, or a plurality of TRPs may be released at a time. For example, when a plurality of TRPs are released at a time, the TRP release can be promptly executed.

In release of the connected TRP, the TRP release command described above may be used. The gNB may notify the UE of the TRP release command. The UE may release the connection destination TRP by using the command.

The gNB may notify the UE of the TRP release command via a release target TRP. A single TRP as described above may be present, or a plurality of such TRPs may be present. The TRP(s) described above may be all of or a part of the release target TRPs. The UE may judge the TRP to which the command is transmitted as the release target TRP. With this, for example, an information amount included in the TRP release command to be transmitted from the gNB to the UE can be reduced. The UE may not perform transmission and reception with the TRP after reception of the command. With this, for example, malfunction in which data transmission and reception is performed by using the TRP after the TRP release can be prevented.

As another example, the gNB may notify the UE of the TRP release command via the TRP other than the release target. The TRP described above may be, for example, a TRP having the highest communication quality with the UE. The UE may release connection with the TRP indicated by the release command after the signal reception. With this, for example, reliability in notification of the release command can be secured.

The UE may stop the beam of the UE used for communication of the release target TRP, by using the release command. The UE may suspend the operation of uplink transmission and downlink reception to and from the release target TRP. For example, the UE may stop SRS transmission to the release target TRP, may stop PDCCH reception operation from the TRP, may stop reception operation of the SS block from the TRP, or may perform operation of a combination of two or more of the above. With this, for example, power consumption in the UE can be reduced.

Figure 22:
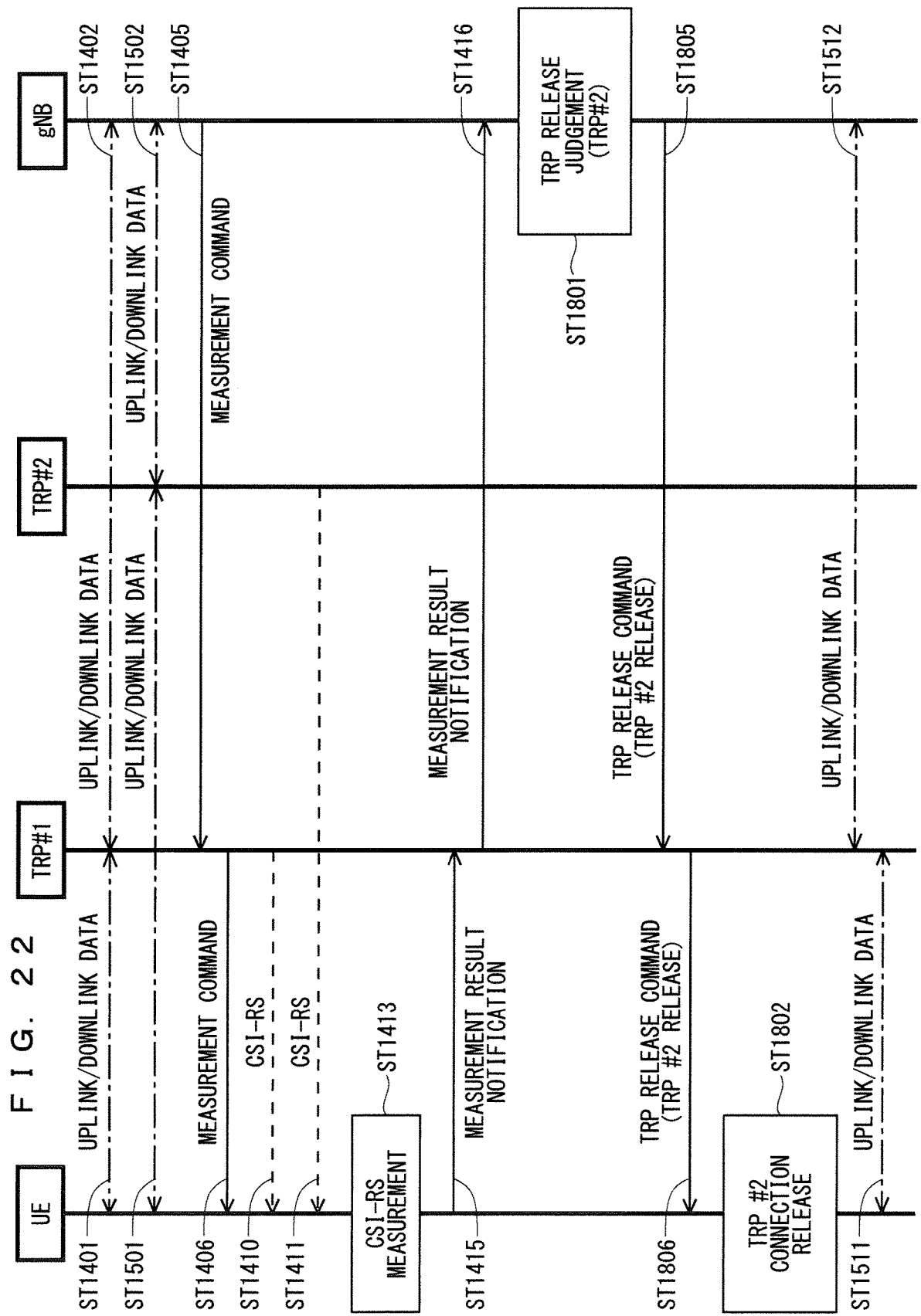
FIG. 22 is a diagram illustrating operation of release of a connected TRP in the UE according to the first embodiment.

FIG. 22 is a diagram illustrating operation of release of the connected TRP in the UE. The example illustrated in FIG. 22 illustrates a case in which connection with TRP #2 is released regarding the UE connected to TRPs #1 and #2. Further, FIG. 22 illustrates an operation example of a case in which the UE measures the CSI-RS, and the gNB determines release of the connection destination TRP by using the measurement results. Further, FIG. 22 illustrates a case in which the gNB notifies the UE of release of the connected TRP by using a TRP that is different from the release target. In FIG. 22, the parts common to those of FIG. 14 and FIG. 15 and FIG. 16 and FIG. 17 are denoted by the same numbers, and common description will be omitted.

Steps ST1401 and ST1402 in FIG. 22 are similar to those of FIG. 14. Steps ST1501 and ST1502 are similar to those of FIG. 16.

Steps ST1405 to ST1416 in FIG. 22 are similar to those of FIG. 14.

In Step ST1801 illustrated in FIG. 22, the gNB judges that TRP #2 out of the connection destination TRPs of the UE is to be released, by using the measurement results of Step ST1416.

In Steps ST1805 and ST1806 illustrated in FIG. 22, the gNB notifies the UE of the command to release TRP #2 via TRP #1. Step ST1805 illustrates the command from the gNB to TRP #1, and further, Step ST1806 illustrates the command from TRP #1 to the UE. The command may be transmitted by using the PDCCH. Using Step ST1806, the UE releases connection with TRP #2 in Step ST1802 illustrated in FIG. 22.

Steps ST1511 and ST1512 in FIG. 22 are similar to those of FIG. 17.

FIG. 22 illustrates an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

FIG. 22 illustrates an example in which the release of TRP #2 illustrated as Steps ST1805 and ST1806 is performed via TRP #1. However, the release may be performed via TRP #2. With this, for example, the gNB and the UE become capable of transmission and reception of data to and from each other by using resources of TRP #1. As a result, efficiency in the communication system can be enhanced.

The method disclosed in the first embodiment may be used in initial access of the UE. For example, the UE may perform connection with a plurality of TRPs in initial access to the gNB. With this, for example, reliability of a connection procedure between the UE and the gNB can be enhanced.

As another example, the method disclosed in the first embodiment may be used for cell re-selection. For example, the method may be applied to connection destination TRP switch when the UE is in an RRC_INACTIVE state. Paging from the gNB to the UE may be performed by using all of the TRPs under the gNB, or may be performed from a part of the TRPs. A single TRP used for paging from the gNB to the UE may be present, or a plurality of TRPs used for paging from the gNB to the UE may be present. With this, for example, even when the UE moves into coverage of another TRP under the same gNB in the RRC_INACTIVE state, the gNB becomes capable of executing paging for the UE.

As another example, the method disclosed in the first embodiment may be used for handover. For example, a handover command from the gNB to the UE may include information related to the connection destination TRP of a handover destination base station. Using the information, the UE may perform connection to the TRP. With this, for example, reliability of communication after handover can be enhanced.

As another example, the method disclosed in the first embodiment may be used for beam failure recovery. The gNB may notify the UE of information related to the TRP and/or the beam to be reconnected. The information may be, for example, included in beam failure recovery configuration (BeamFailureRecoveryConfig) from the gNB to the UE so as to be notified. With this, for example, the beam failure recovery in the UE can be promptly executed.

The primary TRPs and/or the secondary TRPs different for each cell may be used. With this, for example, the primary TRP and/or the secondary TRP can be flexibly configured according to use frequency of each cell or the like. As a result, reliability of communication in the communication system can be enhanced. The primary PDCCHs and/or the secondary PDCCHs different for each cell may be used.

As another example, the primary TRPs and/or the secondary TRPs different for each network slice may be used. The primary TRP and/or the secondary TRP may be determined by using a QCI. With this, for example, the primary and/or the secondary TRP can be flexibly configured according to communication requirements of each network slice. As a result, reliability of communication in the communication system can be enhanced. The primary PDCCHs and/or the secondary PDCCHs different for each network slice may be used.

Information related to the TRPs to which the UE can connect (for example, a list of identifiers of the TRPs) may be broadcast or notified in advance from the gNB to the UE. As another example, information related to a condition of the TRP switch in the UE (for example, parameters and thresholds used by the UE for judgement of the TRP switch) may be broadcast or notified in advance from the gNB to the UE. Using the information, the UE may perform the TRP switch. With this, for example, flexibility in the communication system can be enhanced.

According to the first embodiment, synchronization establishment in mobility between the TRPs can be promptly executed. Further, synchronization establishment of mobility between the TRPs asynchronous with each other, for example, between the TRPs in a network with a backhaul delay, can be promptly executed.

First Modification of First Embodiment

The first embodiment discloses the switch, addition, and deletion of the TRP for uplink and downlink communication. However, the TRPs may be switched only for downlink communication.

The gNB may notify the UE of a downlink synchronization command. The notification of the downlink synchronization command may be performed by using the TRP before switch. The downlink synchronization command may be performed by using, for example, L1/L2 signaling. With this, for example, the base station becomes capable of promptly notifying the UE of the downlink synchronization command. As another example, the downlink synchronization command may be performed by using MAC signaling, or may be performed by using RRC signaling. With this, for example, a large amount of information can be included in the downlink synchronization command so as to be notified to the UE.

Pieces of the information included in the downlink synchronization command from the gNB to the UE may be similar to (1) to (14) disclosed as examples of the information included in the random access start command according to the first embodiment.

The UE may establish downlink synchronization with the TRP included in the downlink synchronization command by using the downlink synchronization command. The UE may not transmit uplink signal and/or uplink data to the TRP. For uplink communication from the UE, the TRP that has been used before switch of the TRP for downlink communication may be continuously used. With this, for example, the UE becomes capable of communicating uplink communication and downlink communication by using TRPs different from each other. As a result, for example, when uplink and downlink radio wave environments are different, uplink communication and downlink communication can be communicated by using communication paths optimal for each other.

The UE may maintain downlink synchronization with the TRP used for uplink communication. With this, for example, the UE becomes capable of maintaining uplink synchronization with the TRP. As a result, reliability in uplink communication can be enhanced.

The UE may transmit the SR to the TRP before switch. Information necessary for the SR transmission to the TRP before switch, for example, information related to PUCCH resource configuration for the SR, may be information used before reception of the downlink synchronization command.

The gNB may transmit an uplink grant for the SR to the UE via the TRP for downlink communication after switch. Configuration necessary for the UE to receive the uplink grant, for example, configuration related to mapping of DCI transmitted from the TRP for downlink communication after switch (for example, configuration of a search space in the PDCCH) may be notified in advance from the gNB to the UE, or may be included in the downlink synchronization command. With this, for example, the UE becomes capable of reception earlier than the TRP for downlink communication after switch. As a result, for example, when a downlink communication environment with the TRP for downlink communication before switch is rapidly deteriorated, communication quality between the UE and the gNB can be secured.

The UE may perform notification of information indicating that downlink synchronization with the TRP has been established, by using the uplink grant. In communication of the information, the TRP for downlink communication after switch may be used. For example, this can prevent deterioration of communication efficiency due to transmission failure of downlink data, which is caused by an operation in which the gNB transmits the downlink data by using the TRP after switch before downlink synchronization establishment completion.

For notification of the information, for example, L1/L2 signaling may be used. With this, for example, the UE becomes capable of prompt notification that the downlink synchronization has been established. As another example, MAC signaling may be used, or RRC signaling may be used. With this, for example, the UE becomes capable of notification to the gNB, carrying a large amount of information about the information.

As another example, the PRACH may be used for notification that the downlink synchronization has been established. For example, the UE may transmit the PRACH to the TRP after switch. The gNB may not transmit, to the UE, a RA response to the PRACH. The UE may not receive the RA response to the PRACH transmission. The UE may acquire the PRACH transmission timing from broadcast information from the gNB, or may acquire the PRACH transmission timing from the downlink synchronization command described above. In the PRACH transmission timing acquisition from the downlink synchronization command, (6) disclosed as an example of the information included in the random access start command from the gNB to the UE may be used.

The information may include information related to the TRP with which the downlink synchronization has been established. Using the information, the gNB may start downlink data transmission using the TRP. For example, this can prevent deterioration of communication efficiency due to transmission failure of downlink data, which is caused by an operation in which the gNB transmits the downlink data by using the TRP after switch before downlink synchronization establishment completion. A plurality of such TRPs included in the information may be present. With this, for example, the signaling amount from the UE to the base station can be reduced.

As another example, the information may not include information related to the TRP with which the downlink synchronization has been established. With the information not including the information related to the TRP with which the downlink synchronization has been established, it may be indicated that downlink synchronization establishment with all of the TRPs after switch in the UE has been completed. With this, for example, the signaling amount from the UE to the base station can be reduced.

The UE may transmit the information to the gNB via the TRP before switch. The TRP before switch may be, for example, a TRP for uplink transmission. With this, for example, when uplink and downlink radio wave environments are different, uplink communication and downlink communication can be communicated by using communication paths optimal for each other. As a result, reliability in transmission of the information can be enhanced.

The timing of the HARQ response to the downlink data in the UE may be derived with a slot number of the TRP for uplink communication at a downlink data reception time point being used as a reference. A slot offset from downlink data reception to HARQ response transmission may be a slot offset with a slot length of the TRP for uplink communication being used as a unit. The slot offset may be, for example, semi-statically notified from the gNB to the UE, may be dynamically notified, or may be a combination of both of the above. The UE may transmit the HARQ response in the slot number that is obtained by adding the slot offset to the slot number of the TRP for uplink communication at the downlink data reception time point, for example. The gNB may derive the slot number of the TRP for uplink communication at the downlink data reception time point in the UE by using a difference of the backhaul delay from the TA in each TRP and/or each TRP. With this, for example, the UE becomes capable of transmission of the HARQ response also to the TRP asynchronous with the TRP for downlink communication.

For the timing of SRS transmission in the UE, a method similar to that for the timing of the HARQ response to the downlink data may also be used. With this, for example, effects similar to the above can be obtained.

The UE may not switch the TRP for downlink communication. For example, the UE may not switch the TRP for downlink communication when the UE fails in switch of the TRP for downlink communication from the gNB. In the description above, the UE may notify the gNB of information indicating that the UE has failed in switch of the TRP for downlink communication. In the description above, in the downlink communication between the gNB and the UE, the TRP before switch may be used. With this, for example, even in a case of failure in switch of the TRP for downlink communication, communication between the UE and the gNB can be continued.

Figure 23:
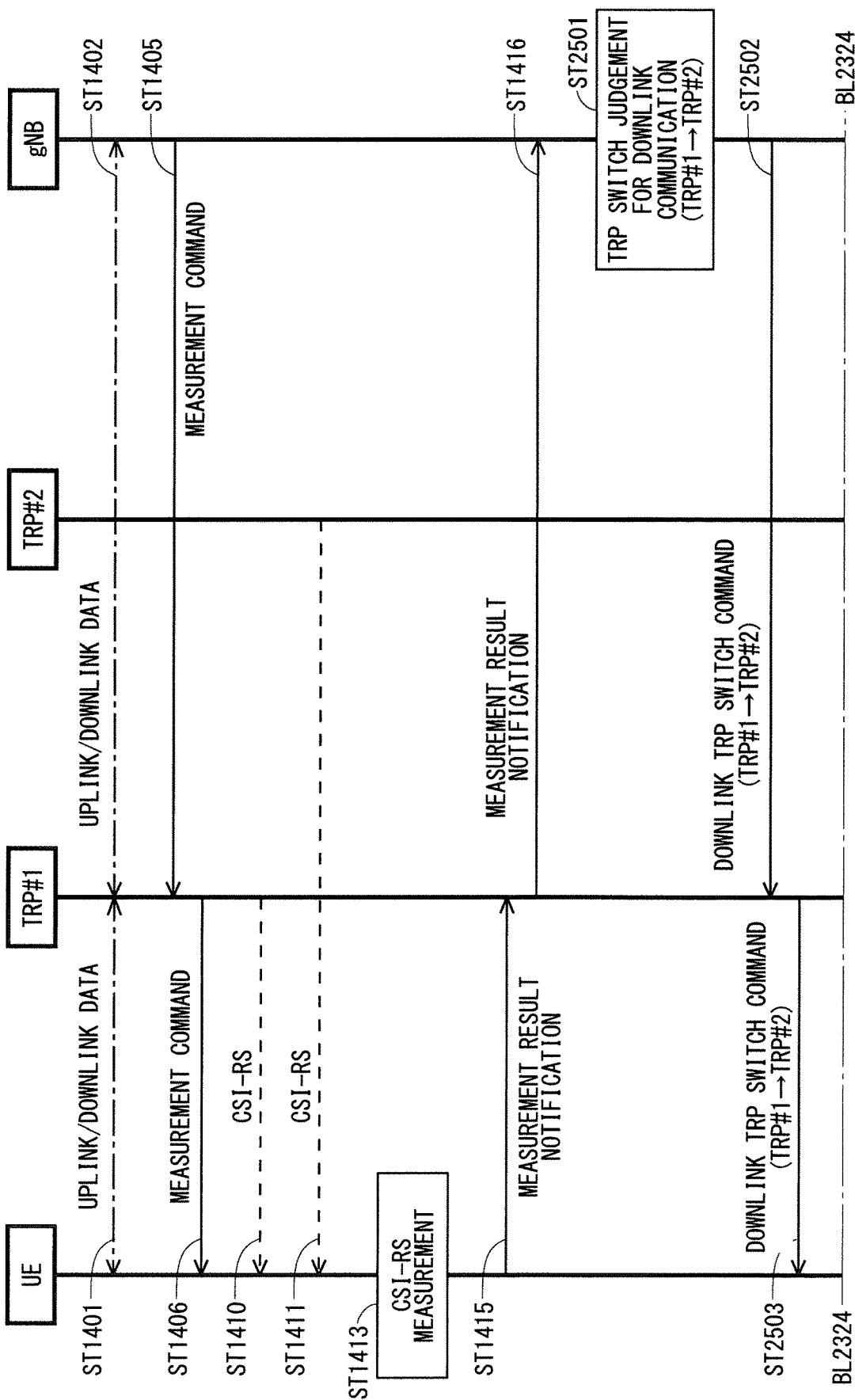
FIG. 23 is a diagram illustrating operation of switch of the TRP for downlink communication in the UE according to the first modification of the first embodiment.
Figure 24:
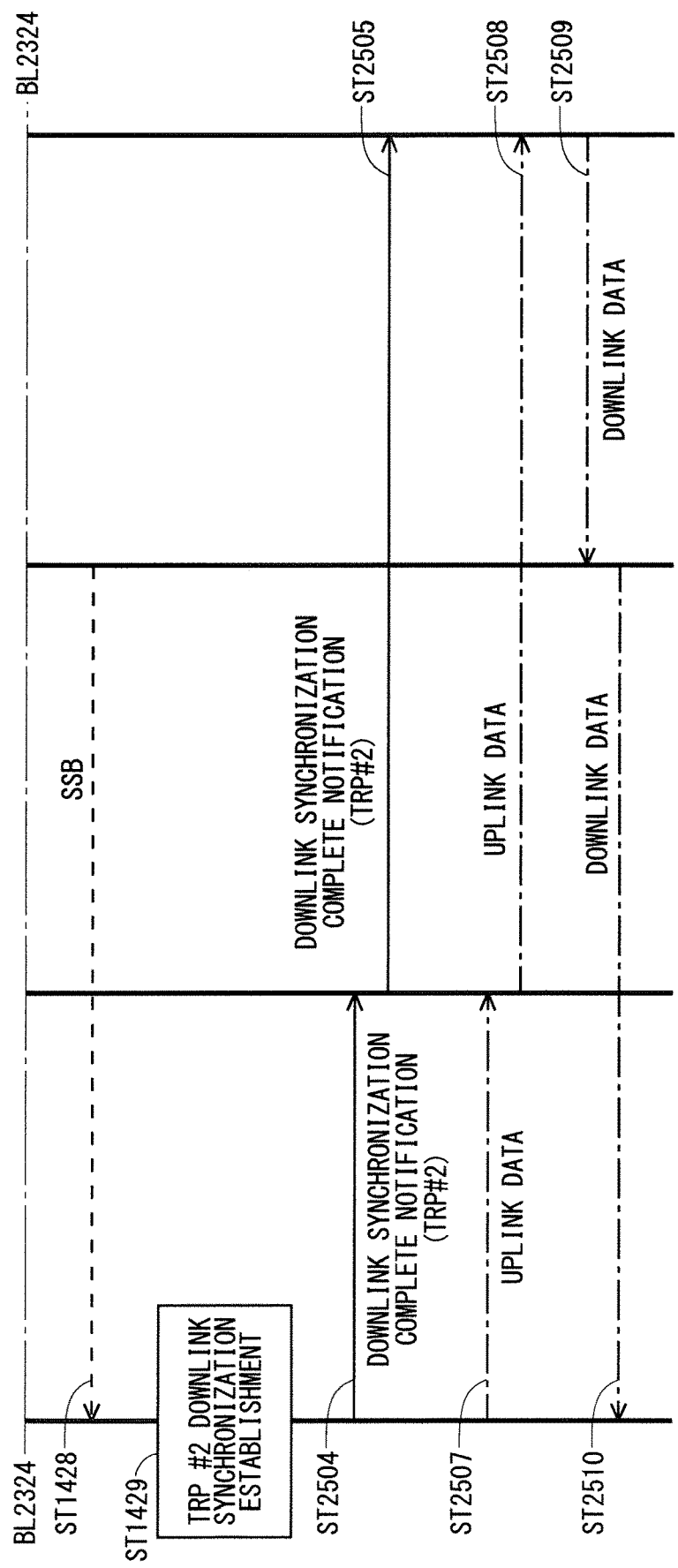
FIG. 24 is a diagram illustrating operation of switch of the TRP for downlink communication in the UE according to the first modification of the first embodiment.

FIG. 23 and FIG. 24 are each a diagram illustrating operation of switch of the TRP for downlink communication in the UE. FIG. 23 and FIG. 24 are connected at the position of the boundary line BL2324. FIG. 23 and FIG. 24 illustrate a case in which the TRP for downlink communication is switched to TRP #2 and TRP #1 turns to be the TRP for uplink communication regarding the UE connected to TRP #1. Further, FIG. 23 and FIG. 24 illustrate an operation example of a case in which the UE measures the CSI-RS, and the gNB determines switch of the TRP for downlink communication by using the measurement results. In FIG. 23 and FIG. 24, the parts common to those of FIG. 14 and FIG. 15 are denoted by the same numbers, and common description will be omitted.

Steps ST1401 to ST1416 in FIG. 23 are similar to those of FIG. 14.

In Step ST2501 illustrated in FIG. 23, the gNB judges that the TRP for downlink communication of the UE is to be switched from TRP #1 to TRP #2, by using the measurement results of Step ST1416.

In Steps ST2502 and ST2503 in FIG. 23, the gNB starts a command of switch of the TRP for downlink communication to the UE via TRP #1. Step ST2502 illustrates the command from the gNB to TRP #1, and further, Step ST2503 illustrates the command from TRP #1 to the UE. The command may be transmitted by using the PDCCH. The command includes information indicating switch from TRP #1 to TRP #2 regarding the TRPs for downlink communication. Using Step ST2503, the UE starts reception operation of the SS block transmitted from TRP #2 to the UE in Step ST1428 illustrated in FIG. 24. In Step ST1429 illustrated in FIG. 24, the UE establishes downlink synchronization with TRP #2 by using the SS block of Step ST1428.

In Steps ST2504 and ST2505 illustrated in FIG. 24, the UE notifies, via TRP #1, the gNB that downlink synchronization with TRP #2 has completed. Step ST2504 illustrates the notification from the UE to TRP #1, and further, Step ST2505 illustrates the notification from TRP #1 to the gNB. Using ST2505, the gNB recognizes completion of switch of the TRP for downlink communication in the UE.

In Steps ST2507 and ST2508 illustrated in FIG. 24, transmission of uplink data from the UE to the gNB via TRP #1 is performed. Step ST2507 illustrates data transmission from the UE to TRP #1, and further, Step ST2508 illustrates data transmission from TRP #1 to the gNB.

In Steps ST2509 and ST2510 illustrated in FIG. 24, transmission of downlink data from the gNB to the UE via TRP #2 is performed. Step ST2509 illustrates data transmission from the gNB to TRP #2, and further, Step ST2510 illustrates data transmission from TRP #2 to the UE.

FIG. 23 and FIG. 24 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

Figure 25:
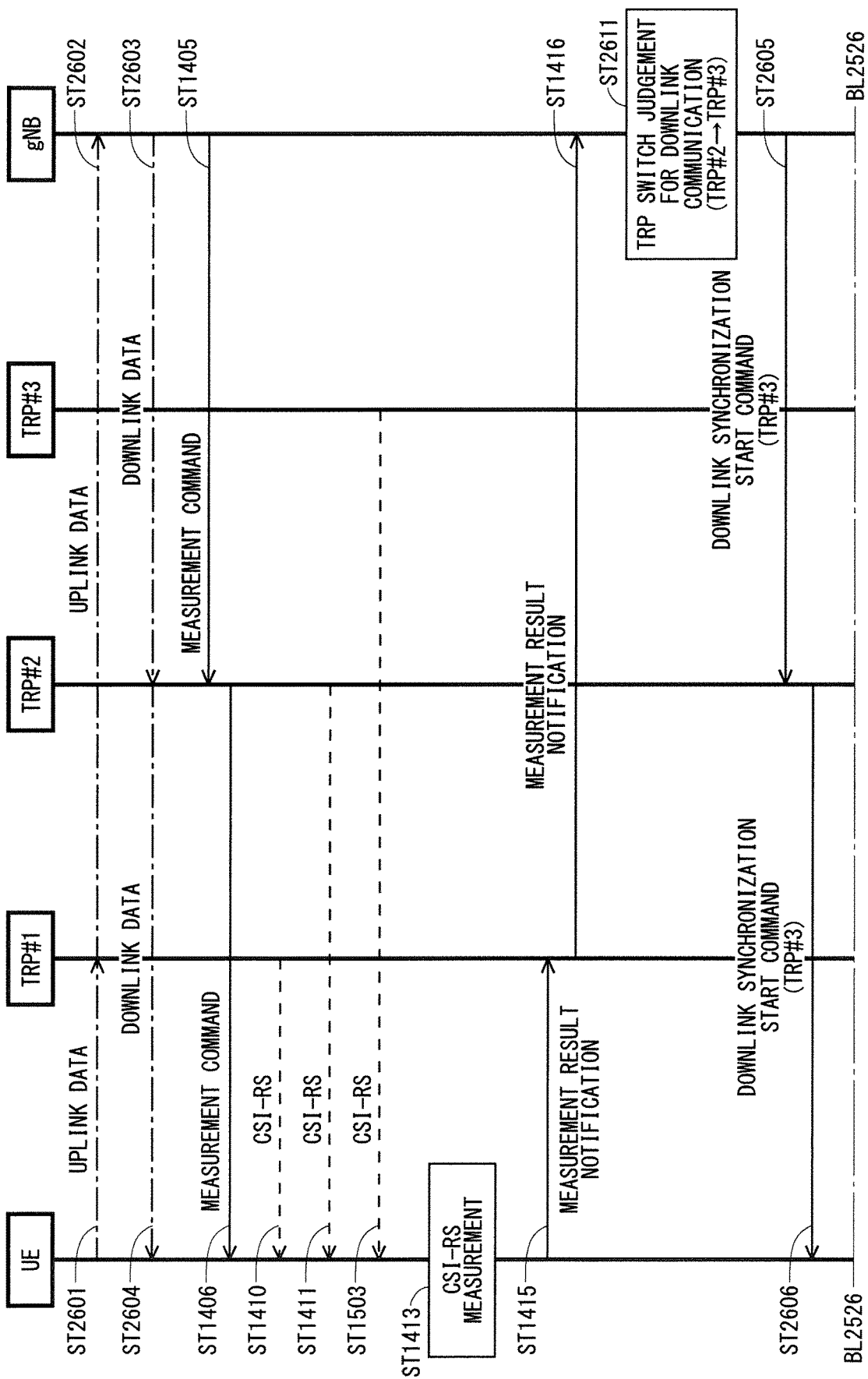
FIG. 25 is a diagram illustrating another example of operation of switch of the TRP for downlink communication in the UE according to the first modification of the first embodiment.
Figure 26:
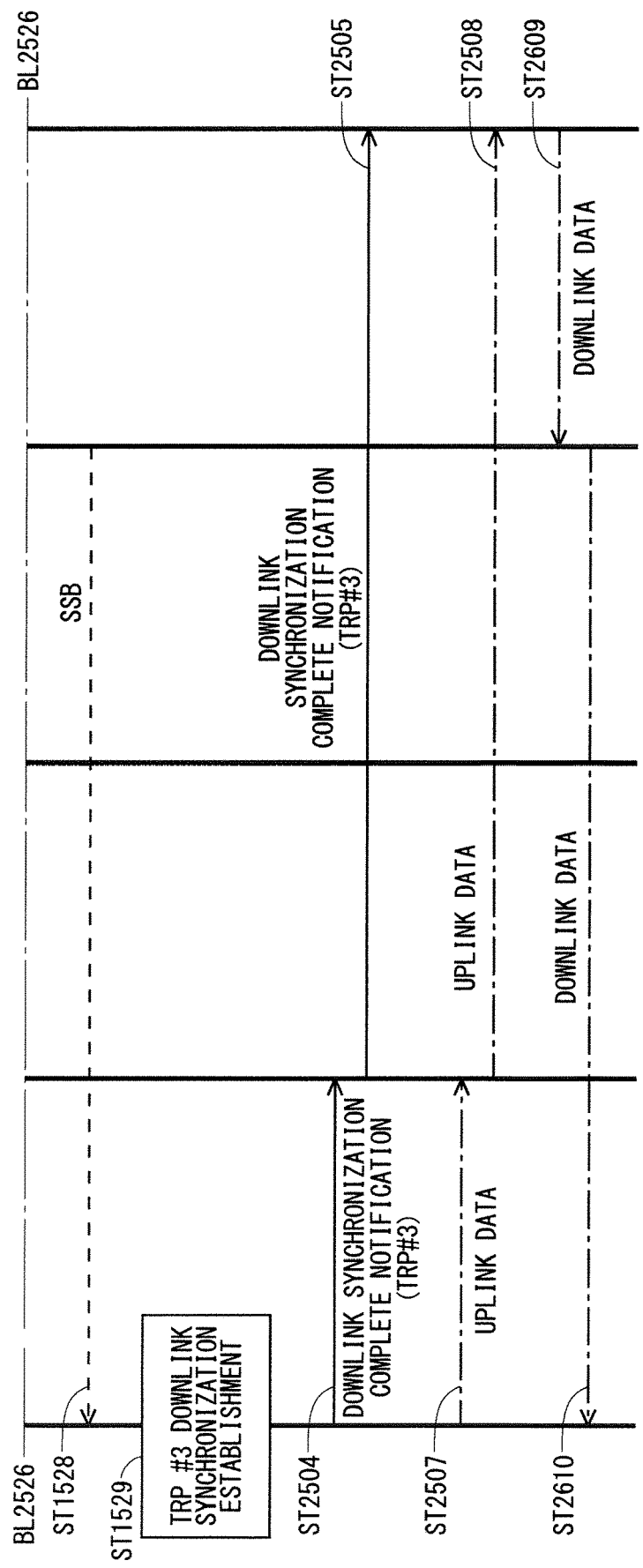
FIG. 26 is a diagram illustrating another example of operation of switch of the TRP for downlink communication in the UE according to the first modification of the first embodiment.

FIG. 25 and FIG. 26 are each a diagram illustrating another example of operation of switch of the TRP for downlink communication in the UE. FIG. 25 and FIG. 26 are connected at the position of the boundary line BL2526. The example illustrated in FIG. 25 and FIG. 26 illustrates a case in which the TRP for downlink communication is switched from TRP #2 to TRP #3 regarding the UE that performs uplink communication with TRP #1 and performs downlink communication with TRP #2. Further, FIG. 25 and FIG. 26 illustrate an operation example of a case in which the UE measures the CSI-RS, and the gNB determines switch of the TRP for downlink communication by using the measurement results. In FIG. 25 and FIG. 26, the parts common to those of FIG. 14 and FIG. 15 are denoted by the same numbers, and common description will be omitted.

In Steps ST2601 and ST2602 illustrated in FIG. 25, transmission of uplink data from the UE to the gNB via TRP #1 is performed. Step ST2601 illustrates data transmission from the UE to TRP #1, and further, Step ST2602 illustrates data transmission from TRP #1 to the gNB.

In Steps ST2603 and ST2604 illustrated in FIG. 25, transmission of downlink data from the gNB to the UE via TRP #2 is performed. Step ST2603 illustrates data transmission from the gNB to TRP #2, and further, Step ST2604 illustrates data transmission from TRP #2 to the UE.

Steps ST1405 to ST1411 in FIG. 25 are similar to those of FIG. 14. Step ST1503 in FIG. 25 is similar to that of FIG. 16. Steps ST1413 to ST1416 in FIG. 25 are similar to those of FIG. 14.

In Step ST2611 illustrated in FIG. 25, the gNB judges that the TRP for downlink communication of the UE is to be switched from TRP #2 to TRP #3, by using the measurement results of Step ST1416.

In Steps ST2605 and ST2606 in FIG. 25, the gNB starts a command of switch of the TRP for downlink communication to the UE via TRP #2. Step ST2605 illustrates the command from the gNB to TRP #2, and further, Step ST2606 illustrates the command from TRP #2 to the UE. The command may be transmitted by using the PDCCH. The command includes information indicating switch from TRP #2 to TRP #3 of the TRP for downlink communication. Using Step ST2606, the UE starts reception operation of the SS block transmitted from TRP #3 to the UE in Step ST1528 illustrated in FIG. 26. In Step ST1529 illustrated in FIG. 26, the UE establishes downlink synchronization with TRP #3 by using the SS block of Step ST1528.

Steps ST2504 and ST2505 illustrated in FIG. 26 are similar to those of FIG. 24.

Steps ST2507 and ST2508 illustrated in FIG. 26 are similar to those of FIG. 24.

In Steps ST2609 and ST2610 illustrated in FIG. 26, transmission of downlink data from the gNB to the UE via TRP #3 is performed. Step ST2609 illustrates data transmission from the gNB to TRP #3, and further, Step ST2610 illustrates data transmission from TRP #3 to the UE.

FIG. 25 and FIG. 26 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

The first modification of the first embodiment may be applied when the TRP for uplink communication and the TRP for downlink communication are the same after switch of the TRP for downlink communication. In the case described above, the UE may maintain a downlink synchronization state necessary for the currently continued uplink communication by using a downlink TRP switch command. The UE may not perform downlink synchronization complete notification to the gNB. With this, for example, prompt switch of the TRP for downlink communication in the UE can be achieved.

Figure 27:
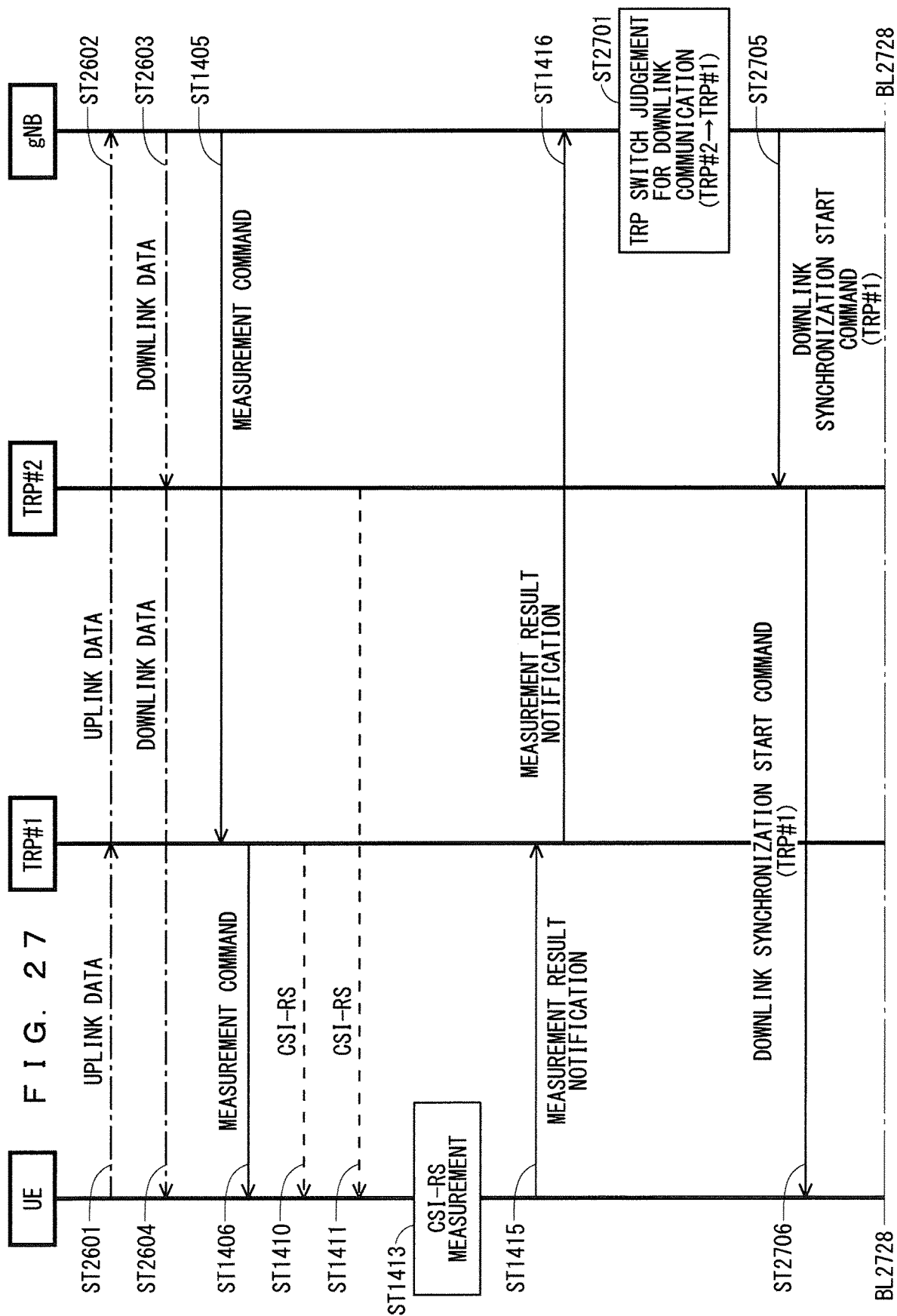
FIG. 27 is a diagram illustrating another example of operation of switch of the TRP for downlink communication in the UE according to the first modification of the first embodiment.

FIG. 27 and FIG. 28 are each a diagram illustrating another example of operation of switch of the TRP for downlink communication in the UE. FIG. 27 and FIG. 28 are connected at the position of the boundary line BL2728. The example illustrated in FIG. 27 and FIG. 28 illustrates a case in which the TRP for downlink communication is switched from TRP #2 to TRP #1 and uplink and downlink communication is performed with TRP #1 regarding the UE that performs uplink communication with TRP #1 and performs downlink communication with TRP #2. Further, FIG. 27 and FIG. 28 illustrate an operation example of a case in which the UE measures the CSI-RS, and the gNB determines switch of the TRP for downlink communication by using the measurement results. In FIG. 27 and FIG. 28, the parts common to those of FIG. 14 and FIG. 15 and FIG. 25 and FIG. 26 are denoted by the same numbers, and common description will be omitted.

Steps ST2601 to ST2604 in FIG. 27 are similar to those of FIG. 25.

Steps ST1405 to ST1416 in FIG. 27 are similar to those of FIG. 14.

In Step ST2701 illustrated in FIG. 27, the gNB judges that the TRP for downlink communication of the UE is to be switched from TRP #2 to TRP #1, by using the measurement results of Step ST1416.

In Steps ST2705 and ST2706 in FIG. 27, the gNB starts a command of switch of the TRP for downlink communication to the UE via TRP #2. Step ST2705 illustrates the command from the gNB to TRP #2, and further, Step ST2706 illustrates the command from TRP #2 to the UE. The command may be transmitted by using the PDCCH. The command includes information indicating switch from TRP #2 to TRP #1 regarding the TRPs for downlink communication. Using Step ST2706, the UE starts reception operation of the SS block transmitted from TRP #1 to the UE in Step ST2702 illustrated in FIG. 28. In Step ST2703 illustrated in FIG. 28, the UE establishes downlink synchronization with TRP #1 by using the SS block of Step ST2702.

Steps ST2504 and ST2505 illustrated in FIG. 28 are similar to those of FIG. 24.

Steps ST1511 and ST1512 illustrated in FIG. 28 are similar to those of FIG. 17.

FIG. 27 and FIG. 28 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

FIG. 27 and FIG. 28 illustrate an example in which the UE performs downlink synchronization establishment with TRP #1 in Step ST2703. The downlink synchronization establishment may not be performed. In the description above, the UE may maintain the downlink synchronization state necessary for the currently continued uplink communication. In the description above, the UE may not perform the downlink synchronization complete notification in Steps ST2504 and ST2505. With this, for example, prompt switch of the TRP for downlink communication in the UE can be achieved.

According to the first modification of the first embodiment, the UE becomes capable of communicating uplink communication and downlink communication by using TRPs different from each other. As a result, for example, when uplink and downlink radio wave environments are different, uplink communication and downlink communication can be communicated by using communication paths optimal for each other.

Second Modification of First Embodiment

In the first modification of the first embodiment, the TRPs are switched only for downlink communication. However, the TRPs may be switched only for uplink communication.

The gNB may notify the UE of an uplink synchronization command. The notification of the uplink synchronization command may be performed by using the TRP before switch. The uplink synchronization command may be the random access start command disclosed in the first embodiment, or may be other signaling. The uplink synchronization command may be, for example, performed by using L1/L2 signaling. With this, for example, the base station becomes capable of promptly notifying the UE of the uplink synchronization command. As another example, the uplink synchronization command may be performed by using MAC signaling, or may be performed by using RRC signaling. With this, for example, a large amount of information can be included in the uplink synchronization command so as to be notified to the UE.

In the random access start command, information indicating that only the TRP for uplink communication is to be switched may be included. For example, an identifier indicating that only the TRP for uplink communication is to be switched may be included in the random access start command. Alternatively, information indicating that the TRP for downlink communication is not to be switched may be included. For example, an identifier indicating that the TRP for downlink communication is not to be switched may be included, or information of a source TRP (for example, an identifier of a source TRP) may be included as the TRP for downlink communication. For example, this eliminates the necessity of providing new signaling as the uplink synchronization command. As a result, complexity of design in the communication system can be avoided.

The UE may transmit a HARQ response to the uplink synchronization command to the TRP for uplink communication before switch. With this, for example, even when a HARQ decoded result of the uplink synchronization command in the UE indicates NG, the UE becomes capable of notifying the gNB of a HARQ-Nack.

Pieces of the information included in the uplink synchronization command from the gNB to the UE may be similar to (1) to (14) disclosed as examples of the information included in the random access start command according to the first embodiment.

The UE may establish uplink synchronization with the TRP included in the uplink synchronization command, by using the uplink synchronization command. Processing of the establishment of the uplink synchronization may be, for example, random access processing. For downlink communication of the UE, the TRP that has been used before switch of the TRP for uplink communication may be continuously used. With this, for example, the UE becomes capable of communicating uplink communication and downlink communication by using TRPs different from each other. As a result, for example, when uplink and downlink radio wave environments are different, uplink communication and downlink communication can be communicated by using communication paths optimal for each other.

The gNB may notify the UE of information indicating that uplink synchronization between the UE and the TRP has been established. The notification may be, for example, a random access response from the gNB to the UE. For example, this eliminates the necessity of providing new signaling for uplink synchronization establishment processing and notification of uplink synchronization establishment. As a result, complexity of design in the communication system can be avoided.

The timing of the HARQ response to the downlink data in the UE may be derived with a slot number of the TRP for uplink communication at a downlink data reception time point being used as a reference. A slot offset from downlink data reception to HARQ response transmission may be a slot offset with a slot length of the TRP for uplink communication being used as a unit. The slot offset may be, for example, semi-statically notified from the gNB to the UE, may be dynamically notified, or may be a combination of both of the above. The UE may transmit the HARQ response in the slot number that is obtained by adding the slot offset to the slot number of the TRP for uplink communication at the downlink data reception time point, for example. The gNB may derive the slot number of the TRP for uplink communication at the downlink data reception time point in the UE by using a difference of the backhaul delay from the TA in each TRP and/or each TRP. With this, for example, the UE becomes capable of transmission of the HARQ response also to the TRP asynchronous with the TRP for downlink communication.

For the timing of SRS transmission in the UE, a method similar to that for the timing of the HARQ response to the downlink data may also be used. With this, for example, effects similar to the above can be obtained.

Figure 29:
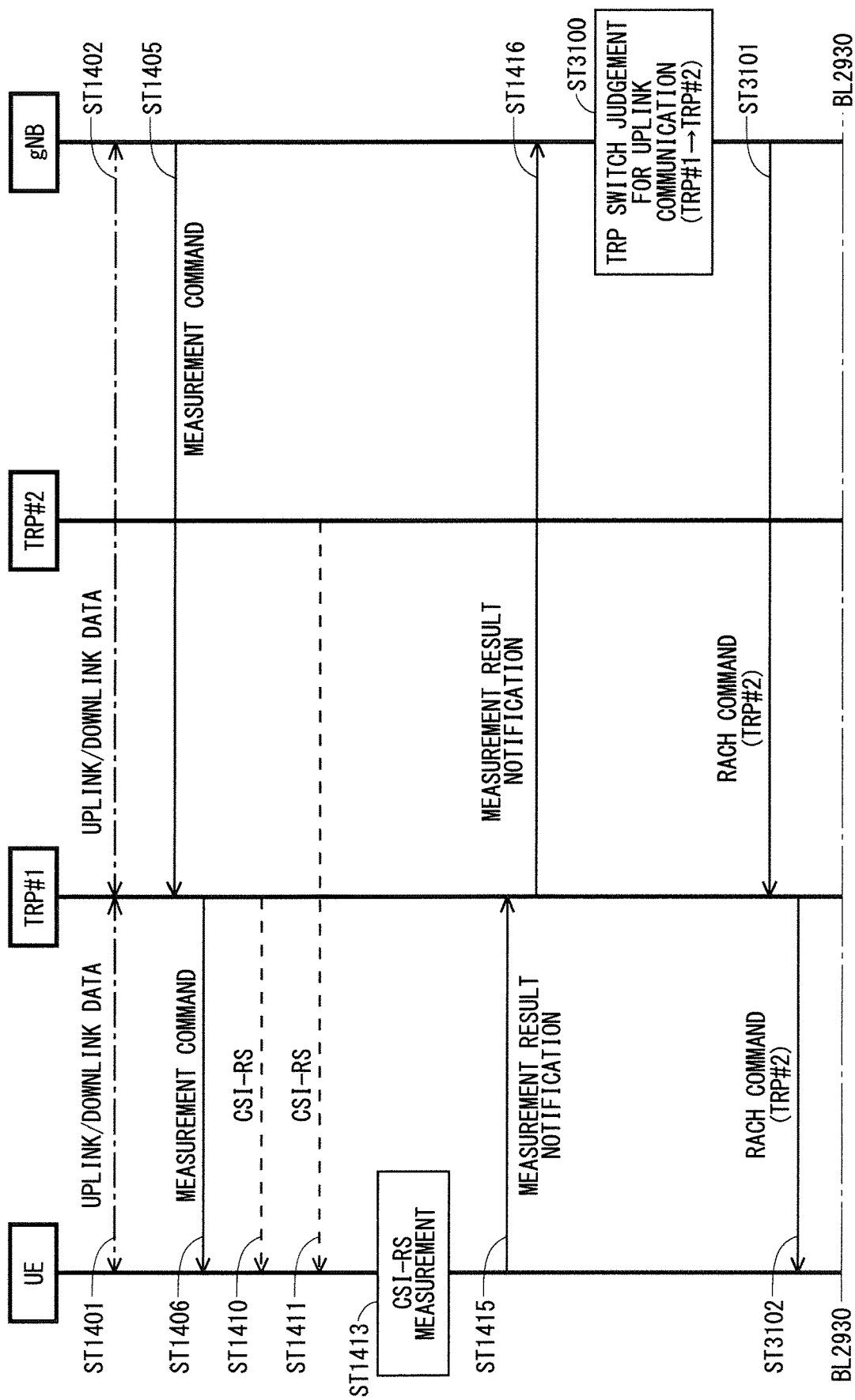
FIG. 29 is a diagram illustrating operation of switch of the TRP for uplink communication in the UE according to the second modification of the first embodiment.
Figure 30:
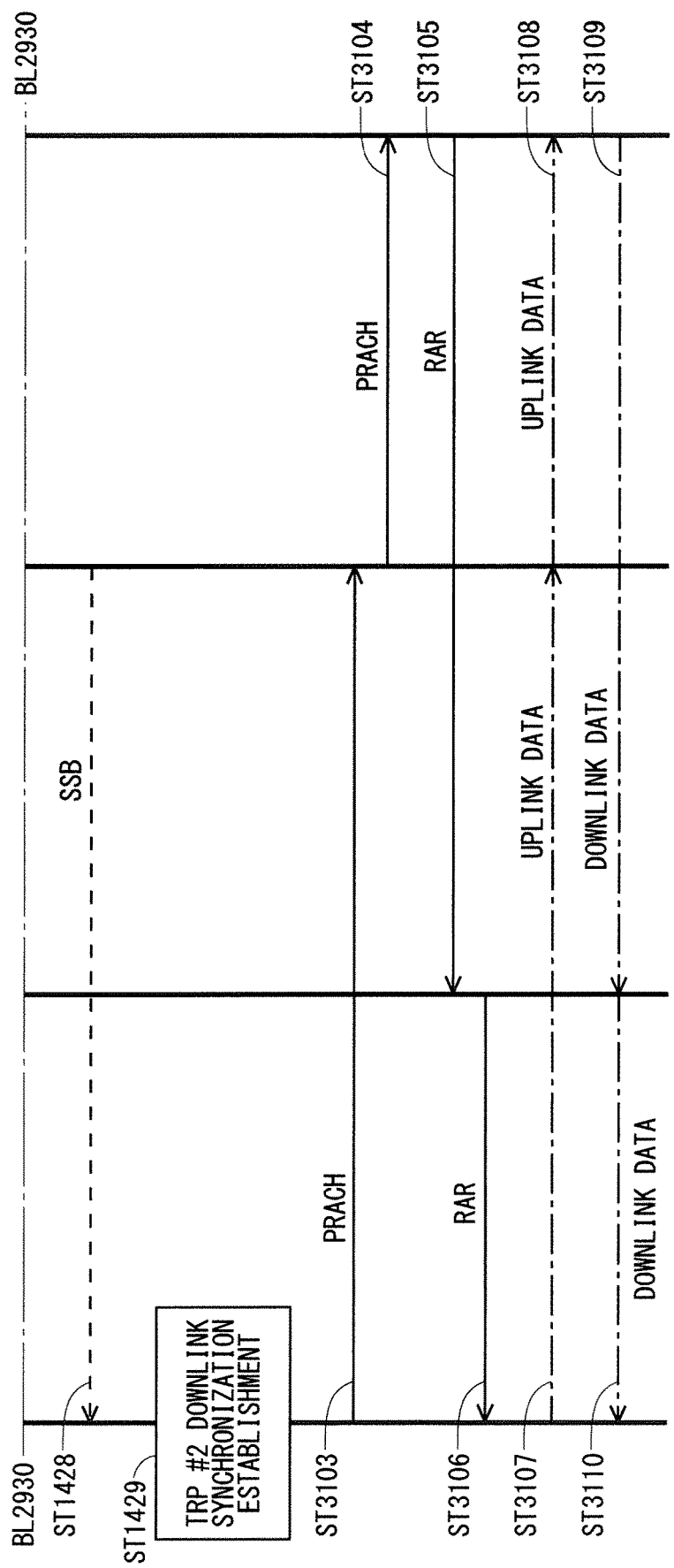
FIG. 30 is a diagram illustrating operation of switch of the TRP for uplink communication in the UE according to the second modification of the first embodiment.

FIG. 29 and FIG. 30 are each a diagram illustrating operation of switch of the TRP for uplink communication in the UE. FIG. 29 and FIG. 30 are connected at the position of the boundary line BL2930. The example illustrated in FIG. 29 and FIG. 30 illustrates a case in which the TRP for uplink communication is switched to TRP #2 and TRP #1 turns to be the TRP for downlink communication regarding the UE connected to TRP #1. Further, FIG. 29 and FIG. 30 illustrate an operation example of a case in which the UE measures the CSI-RS, and the gNB determines switch of the TRP for downlink communication by using the measurement results. In FIG. 29 and FIG. 30, the parts common to those of FIG. 14 and FIG. 15 are denoted by the same numbers, and common description will be omitted.

Steps ST1401 to ST1416 in FIG. 29 are similar to those of FIG. 14.

In Step ST3100 illustrated in FIG. 29, the gNB judges that the TRP for uplink communication of the UE is to be switched from TRP #1 to TRP #2, by using the measurement results of Step ST1416.

In Steps ST3101 and ST3102 in FIG. 29, the gNB starts a command of switch of the TRP for uplink communication to the UE via TRP #1. Step ST3101 illustrates the command from the gNB to TRP #1, and further, Step ST3102 illustrates the command from TRP #1 to the UE. The command may be transmitted by using the PDCCH. The command includes information indicating switch from TRP #1 to TRP #2 regarding the TRPs for uplink communication. The command may include information related to the RA preamble. Using Step ST3102, the UE starts reception operation of the SS block transmitted from TRP #2 to the UE in Step ST1428 illustrated in FIG. 30. In Step ST1429 illustrated in FIG. 30, the UE establishes downlink synchronization with TRP #2 by using the SS block of Step ST1428.

In Steps ST3103 and ST3104 illustrated in FIG. 30, the UE transmits the PRACH to the gNB via TRP #2. Step ST3103 illustrates PRACH transmission from the UE to TRP #2, and further, Step ST3104 illustrates PRACH transmission from TRP #2 to the gNB. The RA preamble in the PRACH transmission may be, or may be different from, the RA preamble included in Step ST3102.

In Steps ST3105 and ST3106 illustrated in FIG. 30, the gNB notifies the UE of a random access response via TRP #1. Step ST3105 illustrates random access response notification from the gNB to TRP #1, and further, Step ST3106 illustrates random access response notification from TRP #1 to the UE. The UE establishes uplink synchronization with TRP #2 by using the response.

In Steps ST3107 and ST3108 illustrated in FIG. 30, transmission of uplink data from the UE to the gNB via TRP #2 is performed. Step ST3107 illustrates data transmission from the UE to TRP #2, and further, Step ST3108 illustrates data transmission from TRP #2 to the gNB.

In Steps ST3109 and ST3110 illustrated in FIG. 30, transmission of downlink data from the gNB to the UE via TRP #1 is performed. Step ST3109 illustrates data transmission from the gNB to TRP #1, and further, Step ST3110 illustrates data transmission from TRP #1 to the UE.

FIG. 29 and FIG. 30 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

FIG. 29 and FIG. 30 illustrate an example in which the UE establishes uplink synchronization after the random access response. However, the UE may transmit message 3 of random access to the gNB, similarly to the description of FIG. 14 and FIG. 15. The gNB may transmit message 4 of random access to the UE. With this, for example, contention-based random access is enabled in TRP switch between the UE and the gNB. As a result, the number of accommodation UEs in the gNB can be increased.

Figure 31:
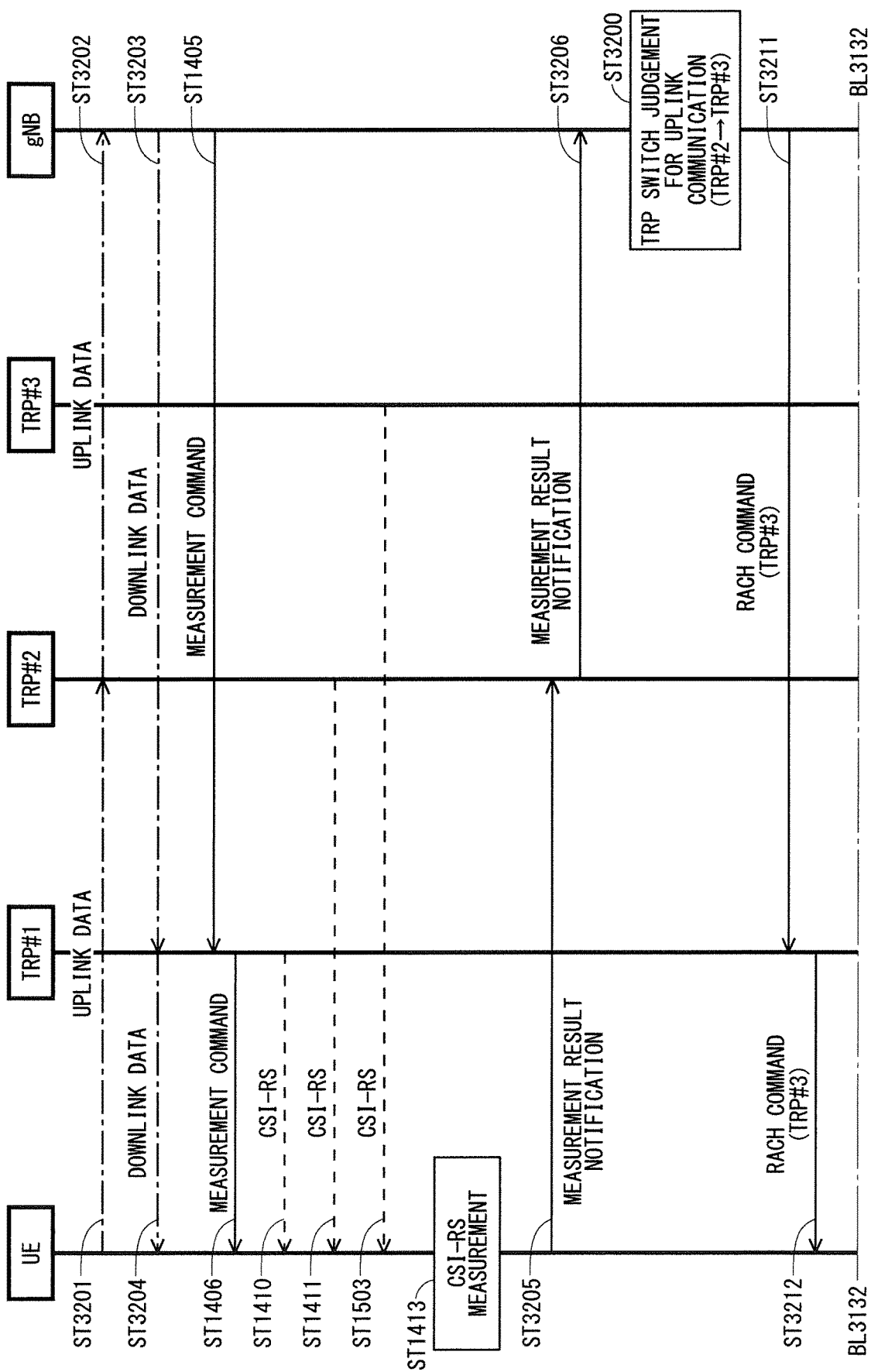
FIG. 31 is a diagram illustrating another example of operation of switch of the TRP for uplink communication in the UE according to the second modification of the first embodiment.
Figure 32:
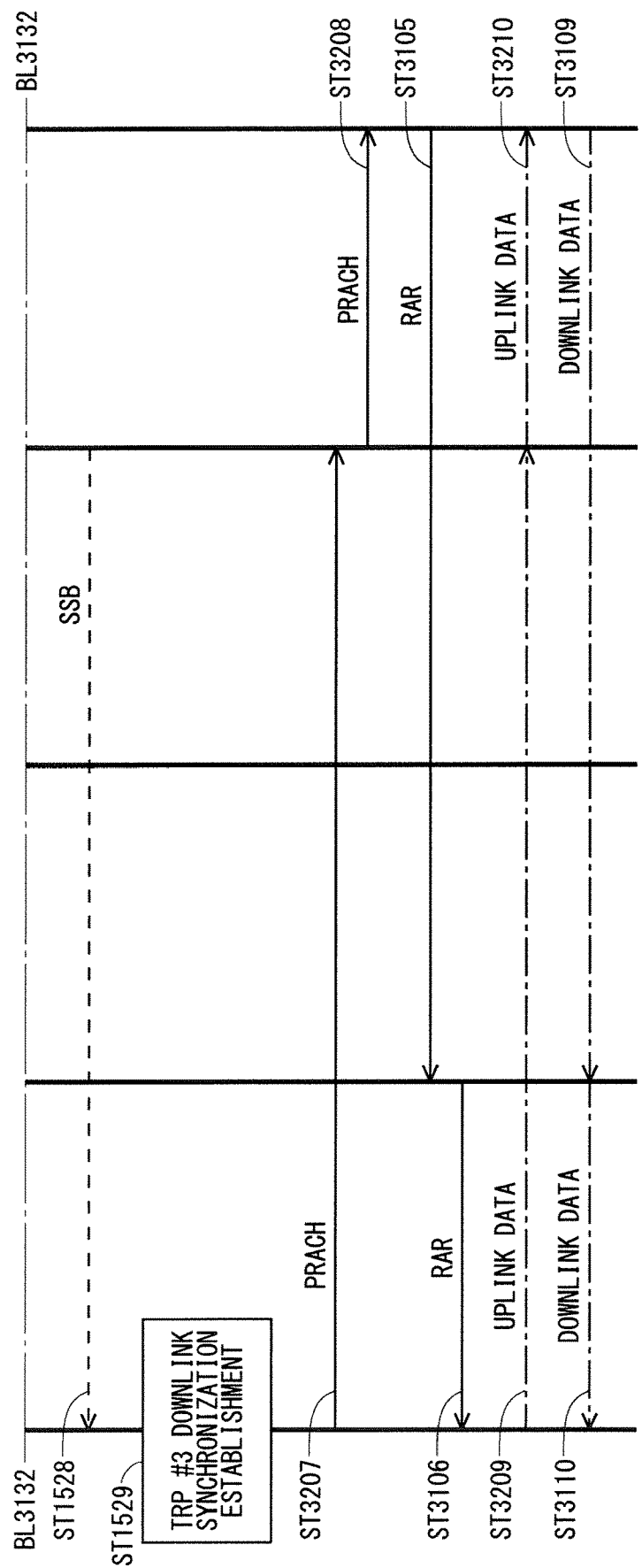
FIG. 32 is a diagram illustrating another example of operation of switch of the TRP for uplink communication in the UE according to the second modification of the first embodiment.

FIG. 31 and FIG. 32 are each a diagram illustrating another example of operation of switch of the TRP for uplink communication in the UE. FIG. 31 and FIG. 32 are connected at the position of the boundary line BL3132. The example illustrated in FIG. 31 and FIG. 32 illustrates a case in which the TRP for uplink communication is switched from TRP #2 to TRP #3 regarding the UE that performs downlink communication with TRP #1 and performs uplink communication with TRP #2. Further, FIG. 31 and FIG. 32 illustrate an operation example of a case in which the UE measures the CSI-RS, and the gNB determines switch of the TRP for downlink communication by using the measurement results. In FIG. 31 and FIG. 32, the parts common to those of FIG. 14 and FIG. 15, FIG. 16 and FIG. 17, and FIG. 29 and FIG. 30 are denoted by the same numbers, and common description will be omitted.

Steps ST3201 and ST3202 illustrated in FIG. 31 are similar to Steps ST3107 and ST3108 illustrated in FIG. 30. Steps ST3203 and ST3204 are similar to Steps ST3109 and ST3110 illustrated in FIG. 30.

Steps ST1405 to ST1411 illustrated in FIG. 31 are similar to those of FIG. 14. Step ST1503 illustrated in FIG. 31 is similar to that of FIG. 16. Step ST1413 illustrated in FIG. 31 is similar to that of FIG. 14.

In Steps ST3205 and ST3206 illustrated in FIG. 31, the UE notifies the gNB of measurement results of the CSI-RS via TRP #2. Information included in Steps ST3205 and ST3206 may be similar to that of Steps ST1415 and ST1416 illustrated in FIG. 14. Signaling used in Steps ST3205 and ST3206 may be similar to that of Steps ST1415 and ST1416 illustrated in FIG. 14.

In Step ST3200 illustrated in FIG. 31, the gNB judges that the TRP for uplink communication of the UE is to be switched from TRP #2 to TRP #3, by using the measurement results of Step ST3206.

In Steps ST3211 and ST3212 of FIG. 31, the gNB starts a command of switch of the TRP for uplink communication to the UE via TRP #1. Step ST3211 illustrates the command from the gNB to TRP #1, and further, Step ST3212 illustrates the command from TRP #1 to the UE. The command may be transmitted by using the PDCCH. The command includes information indicating that switch from TRP #2 to TRP #3 regarding the TRPs for uplink communication. The command may include information related to the RA preamble. Using Step ST3212, the UE starts reception operation of the SS block transmitted from TRP #3 to the UE in Step ST1528 illustrated in FIG. 32. In Step ST1529 illustrated in FIG. 32, the UE establishes downlink synchronization with TRP #3 by using the SS block of Step ST1528.

In Steps ST3207 and ST3208 illustrated in FIG. 32, the UE transmits the PRACH to the gNB via TRP #3. Step ST3207 illustrates PRACH transmission from the UE to TRP #3, and further, Step ST3208 illustrates PRACH transmission from TRP #3 to the gNB. The RA preamble in the PRACH transmission may be, or may be different from, the RA preamble included in Step ST3212.

Steps ST3105 and ST3106 illustrated in FIG. 32 are each a random access response similar to that of FIG. 30. The UE establishes uplink synchronization with TRP #3 by using the response.

In Steps ST3209 and ST3210 illustrated in FIG. 32, transmission of uplink data from the UE to the gNB via TRP #3 is performed. Step ST3209 illustrates data transmission from the UE to TRP #3, and further, Step ST3210 illustrates data transmission from TRP #3 to the gNB.

Steps ST3109 and ST3110 illustrated in FIG. 32 are similar to those of FIG. 30.

FIG. 31 and FIG. 32 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

FIG. 31 and FIG. 32 illustrate an example in which the UE establishes uplink synchronization after the random access response. However, the UE may transmit message 3 of random access to the gNB, similarly to the description of FIG. 14 and FIG. 15. The gNB may transmit message 4 of random access to the UE. With this, for example, contention-based random access is enabled in TRP switch between the UE and the gNB. As a result, the number of accommodation UEs in the gNB can be increased.

The second modification of the first embodiment may be applied when the TRP for uplink communication and the TRP for downlink communication are the same after switch of the TRP for uplink communication. In the case described above, the UE may maintain the downlink synchronization state necessary for the currently continued downlink communication by using an uplink TRP switch command. With this, for example, prompt switch of the TRP for uplink communication in the UE can be achieved.

Figure 33:
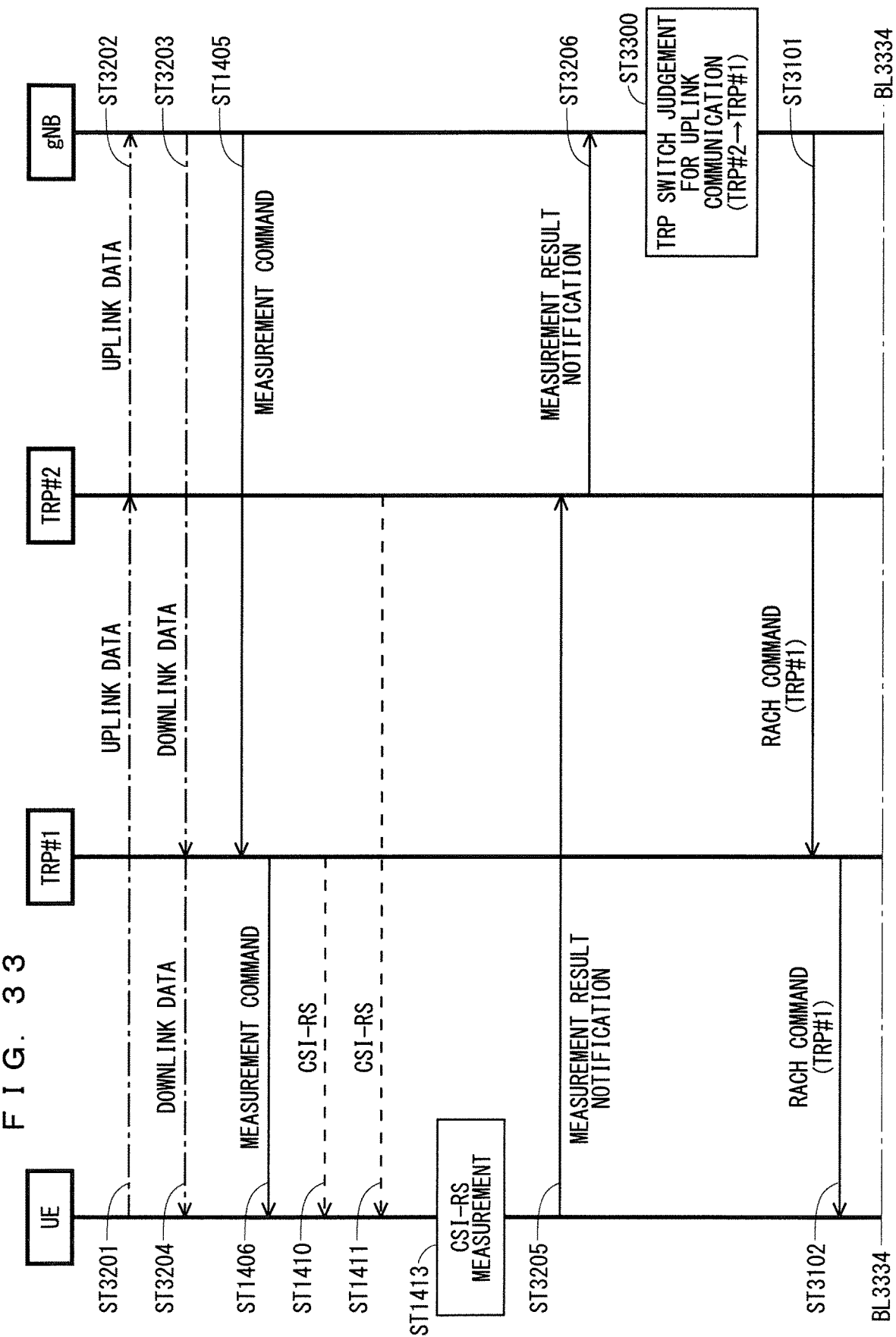
FIG. 33 is a diagram illustrating another example of operation of switch of the TRP for uplink communication in the UE according to the second modification of the first embodiment.
Figure 34:
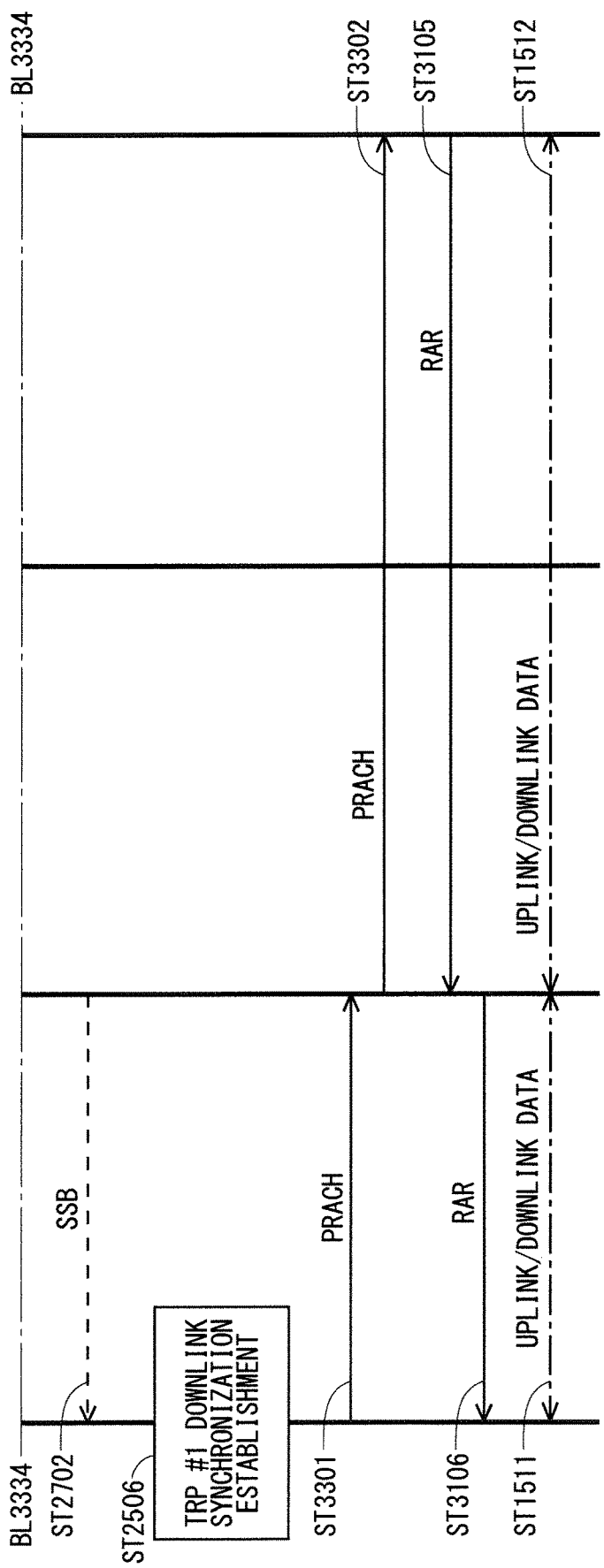
FIG. 34 is a diagram illustrating another example of operation of switch of the TRP for uplink communication in the UE according to the second modification of the first embodiment.

FIG. 33 and FIG. 34 are each a diagram illustrating another example of operation of switch of the TRP for uplink communication in the UE. FIG. 33 and FIG. 34 are connected at the position of the boundary line BL3334. The example illustrated in FIG. 33 and FIG. 34 illustrates a case in which the TRP for uplink communication is switched from TRP #2 to TRP #1 and uplink and downlink communication is performed with TRP #1 regarding the UE that performs downlink communication with TRP #1 and performs uplink communication with TRP #2. Further, FIG. 33 and FIG. 34 illustrate an operation example of a case in which the UE measures the CSI-RS, and the gNB determines switch of the TRP for downlink communication by using the measurement results. In FIG. 33 and FIG. 34, the parts common to those of FIG. 14 and FIG. 15, FIG. 17 and FIG. 18, and FIG. 29 to FIG. 32 are denoted by the same numbers, and common description will be omitted.

Steps ST3201 to ST3204 illustrated in FIG. 33 are similar to those of FIG. 31.

Steps ST1405 to ST1413 illustrated in FIG. 33 are similar to those of FIG. 14. Step ST3205 and Step ST3206 illustrated in FIG. 33 are similar to those of FIG. 31.

In Step ST3300 illustrated in FIG. 33, the gNB judges that the TRP for uplink communication of the UE is to be switched from TRP #2 to TRP #1, by using the measurement results of Step ST3206.

In Steps ST3101 and ST3102 in FIG. 33, the gNB starts a command of switch of the TRP for uplink communication to the UE via TRP #1. Step ST3101 illustrates the command from the gNB to TRP #1, and further, Step ST3102 illustrates the command from TRP #1 to the UE. The command may be transmitted by using the PDCCH. The command includes information indicating switch from TRP #2 to TRP #1 regarding the TRPs for uplink communication. The command may include information related to the RA preamble. Using Step ST3102, the UE starts reception operation of the SS block transmitted from TRP #1 to the UE in Step ST2702 illustrated in FIG. 34. In Step ST2506 illustrated in FIG. 34, the UE establishes downlink synchronization with TRP #1 by using the SS block of Step ST2702.

In Steps ST3301 and ST3302 illustrated in FIG. 34, the UE transmits the PRACH to the gNB via TRP #1. Step ST3301 illustrates PRACH transmission from the UE to TRP #1, and further, Step ST3302 illustrates PRACH transmission from TRP #1 to the gNB. The RA preamble in the PRACH transmission may be, or may be different from, the RA preamble included in Step ST3102.

Steps ST3105 and ST3106 illustrated in FIG. 34 are each a random access response similar to that of FIG. 30. The UE establishes uplink synchronization with TRP #1 by using the response.

Steps ST1511 and ST1512 illustrated in FIG. 34 are similar to those of FIG. 17.

FIG. 33 and FIG. 34 illustrate an example in which measurement of the CSI-RS is performed. However, measurement of the SS block may be performed, similarly to the description of FIG. 14 and FIG. 15. With this, for example, the UE can directly use the signal used for synchronization of a measurement target TRP as a measurement target, and thus the UE becomes capable of prompt measurement.

FIG. 33 and FIG. 34 illustrate an example in which the UE establishes uplink synchronization after the random access response. However, the UE may transmit message 3 of random access to the gNB, similarly to the description of FIG. 14 and FIG. 15. The gNB may transmit message 4 of random access to the UE. With this, for example, contention-based random access is enabled in TRP switch between the UE and the gNB. As a result, the number of accommodation UEs in the gNB can be increased.

FIG. 33 and FIG. 34 illustrate an example in which the UE performs downlink synchronization establishment with TRP #1 in Step ST2506. The downlink synchronization establishment may not be performed. In the description above, the UE may maintain the downlink synchronization state in the currently continued downlink communication. With this, for example, prompt switch of the TRP for downlink communication in the UE can be achieved.

The switch of the TRP disclosed in the first embodiment may be performed according to a combination of the first modification and the second modification of the first embodiment. Specifically, the switch of the TRP may be performed separately for the switch of the TRP for uplink communication and the switch of the TRP for downlink communication. In the description above, the TRP for uplink communication may be switched first. For example, in switch from a TRP capable of high power transmission (which may be hereinafter referred to as a high power TRP) to a TRP that performs low power transmission (which may be hereinafter referred to as a low power TRP), the TRP for uplink communication may be switched to the low power TRP first when the distance between the UE and the high power TRP is increased. For example, when the distance between the UE and the high power TRP is further increased, the TRP for downlink communication may be switched to the low power TRP. With this, for example, communication quality can be secured both in the uplink and the downlink.

As another example, the TRP for downlink communication may be switched first. For example, in switch from the low power TRP to the high power TRP, the TRP for downlink communication may be switched to the high power TRP first when, for example, the distance between the UE and the high power TRP is reduced. For example, when the distance between the UE and the high power TRP is further reduced, the TRP for uplink communication may be switched to the high power TRP. With this, effects similar to the above can be obtained.

In the second modification of the first embodiment, the TRP for uplink communication may be added or may be released. In addition and/or release of the TRP for uplink communication, the method disclosed in the first embodiment may be applied. With this, for example, flexibility in the communication system can be enhanced.

According to the second modification of the first embodiment, the UE becomes capable of communicating uplink communication and downlink communication by using TRPs different from each other. As a result, for example, when uplink and downlink radio wave environments are different, uplink communication and downlink communication can be communicated by using communication paths optimal for each other.

Third Modification of First Embodiment

When addition of a plurality of TRPs is simultaneously performed, problems described below are caused. Specifically, when the UE transmits the PRACH to a part of addition target TRPs, the RA preamble interferes with other addition target TRPs, resulting in causing a problem that communication quality of the PRACH is deteriorated. Further, a problem that such other addition target TRPs erroneously detect the RA preamble described above is caused.

A solution to the problems described above will be disclosed. Different RA preambles are assigned to each of the PRACHs for each TRP. The gNB may be capable of assigning a plurality of RA preambles to the UE. The gNB may notify the UE of information combining the TRP and/or the beam and the RA preamble to be assigned. Using the information, the UE may transmit the RA preamble included in the information to the TRP and/or the beam included in the information. The gNB may receive only the RA preamble included in the information in the TRP and/or the beam included in the information transmitted to the UE. With this, for example, the TRP can be prevented from erroneously detecting the RA preamble for other TRPs.

The information may be, for example, included in the random access command disclosed in the first embodiment so as to be notified, or may be included in the uplink synchronization command disclosed in the second modification of the first embodiment so as to be notified.

Another solution will be disclosed. Transmission timings of the PRACHs for each TRP are arranged to be different from each other. The gNB may be capable of assigning a plurality of PRACH transmission timings to the UE. The gNB may notify the UE of information combining the TRP and/or the beam and the PRACH transmission timing. Using the information, the UE may transmit the PRACH at the PRACH transmission timing included in the information to the TRP and/or the beam included in the information. The gNB may receive the PRACH only at the PRACH transmission timing included in the information in the TRP and/or the beam included in the information transmitted to the UE. With this, for example, deterioration of the communication quality of the PRACH due to the PRACH for the TRP interfering with the PRACHs for other TRPs can be prevented.

The information may be, for example, included in the random access command disclosed in the first embodiment so as to be notified, or may be included in the uplink synchronization command disclosed in the second modification of the first embodiment so as to be notified.

The gNB may notify the UE of only information related to the TRP and/or the beam. The UE may acquire the PRACH transmission timing in the TRP and/or the beam by using broadcast information from the gNB. With this, for example, the signaling amount from the gNB to the UE can be reduced.

The two solutions described above may be used in combination. For example, both of the RA preamble and the PRACH transmission timing for each TRP may be arranged to be different from each other. With this, for example, deterioration of the communication quality of the PRACH due to the PRACH for the TRP interfering with the PRACHs for other TRPs can further be prevented.

Another solution will be disclosed. The UE may not simultaneously perform addition of a plurality of TRPs. For example, the UE may not perform transmission of the PRACHs to other TRPs before receiving the RA response from one TRP. With this, for example, deterioration of the communication quality of the PRACH due to interference with the PRACHs for other TRPs and erroneous detection of the PRACHs in other TRPs can be prevented. In addition, complexity of processing of the UE can be avoided as well.

The gNB may be capable of receiving the PRACH transmitted to one TRP in any of the TRPs. The UE may be capable of receiving the RA response in any of the RA response reception timings corresponding to each TRP described above. With this, for example, RA connection occasions in the UE can be increased. As a result, prompt RA processing from the UE can be implemented.

According to the third modification of the first embodiment, interference of the PRACHs between the TRPs can be reduced and erroneous detection can be prevented when a plurality of TRPs are switched and/or added. As a result, reliability of the random access processing can be enhanced.

Fourth Modification of First Embodiment

In measurement of the TRP by the UE, a problem described below is caused. Specifically, when the currently connected TRP and the measurement target TRP are asynchronous, the UE cannot measure the measurement target TRP.

A solution to the problem described above will be disclosed. The UE performs measurement of each TRP by using a measurement gap. The UE may establish synchronization with the measurement target TRP in a period of the measurement gap.

The TRP and/or the beam measured by the UE by using the measurement gap may be only the TRP and/or the beam that is asynchronous with the currently connected TRP and/or beam. The gNB may notify the UE of information related to the TRP and/or the beam that is asynchronous with the currently connected TRP and/or beam. The information may be, for example, similar to (1) disclosed as the information included in the random access start command from the gNB to the UE in the first embodiment. Using the information, the UE may acquire information of the TRP to be asynchronous with the currently connected TRP and/or beam. The UE may perform measurement of the TRP and/or the beam that is synchronous with the currently connected TRP and/or beam at timing different from the measurement gap. With this, for example, increase in the number of measurement target TRPs and/or beams in the measurement gap period can be prevented. In the description above, "to be synchronous" may be defined as a state in which, for example, a difference of a transmission delay (for example, a backhaul delay) in each TRP from the gNB is equal to or less than or is less than a time period of a cyclic prefix.

As another example, the gNB may notify the UE of information related to the TRP and/or the beam that is synchronous with the currently connected TRP and/or beam. The information may be information similar to the described above. The information may be information indicating whether or not each TRP and/or beam is in a quasi-colocated (QCL) relationship with the currently connected TRP and/or beam.

According to the fourth modification of the first embodiment, the UE can execute measurement of both of the TRP and/or the beam that is synchronous with the currently connected TRP and/or beam and the TRP and/or the beam that is asynchronous with the currently connected TRP and/or beam in a short period of time. As a result, efficiency in the communication system can be enhanced.

Fifth Modification of First Embodiment

The switch of the primary TRP may be performed without the switch of the TRP to be connected by the UE. The primary TRP may be a TRP to be connected at initial access by the UE. As another example, the primary TRP may be a TRP to which control plane data is preferentially transmitted over other TRPs. The primary TRP may be either only one TRP or a plurality of TRPs out of the TRPs connected by the UE. The secondary TRP may be a TRP out of the TRPs connected by the UE other than the primary TRP. In the description above, the gNB may command the switch of the primary TRP to the UE. The UE may switch the primary TRP by using the command. The UE may regard the connection destination TRPs other than the primary TRP after switch as the secondary TRPs.

The command may be notified by using L1/L2 signaling, for example, the PDCCH. With this, for example, the gNB becomes capable of prompt primary TRP switch for the UE.

As another example, the command may be notified by using MAC signaling. With this, for example, prompt notification from the gNB to the UE can be achieved, and at the same time, a large amount of information can be transmitted by means of multi-level modulation.

As another example, the command may be notified by using RRC signaling. With this, for example, a larger amount of information can be transmitted from the gNB to the UE.

As another example, the command may be notified by using RRC signaling. With this, for example, a larger amount of information can be transmitted from the gNB to the UE.

As another example, the command may be notified as a combination of the above. For example, information associating candidates of the switch destination TRP and predetermined serial numbers may be notified in advance from the gNB to the UE by using RRC signaling, and the above-described serial numbers corresponding to the switch destination TRP may be notified from the gNB to the UE by using L1/L2 signaling. With this, for example, a large amount of information can be transmitted from the gNB to the UE, and at the same time, prompt TRP switch can be achieved.

As information included in the command of the primary TRP switch, information similar to (1) disclosed as the information included in the random access start command from the gNB to the UE in the first embodiment may be used.

The switch of the TRP that transmits the primary and/or secondary PDCCH may also be performed without the switch of the TRP to be connected by the UE. The primary PDCCH may be a PDCCH transmitted from the primary TRP. The secondary PDCCH may be a PDCCH other than the primary PDCCH. As another example, the primary PDCCH may be a PDCCH used to preferentially schedule control plane data over other PDCCHs. In the description above, the gNB may command the switch of the TRP that transmits the primary and/or secondary PDCCH to the UE. The command may be notified by using signaling similar to that of the primary TRP switch command. The switch command of the TRP that transmits the primary PDCCH and the switch command of the TRP that transmits the secondary PDCCH may be performed by using the same signaling, or may be performed by using different signaling. With this, for example, flexibility of scheduling can be enhanced.

A single TRP that transmits the secondary PDCCH may be present, or a plurality of TRPs that transmit the secondary PDCCH may be present. There may be no TRPs that transmit the secondary PDCCH. When there are no TRPs that transmit the secondary PDCCH, the secondary PDCCH may be deactivated. Each TRP may not be capable of transmitting either of the primary PDCCH or the secondary PDCCH. As another example, each TRP may be capable of transmitting both of the primary PDCCH and the secondary PDCCH. With this, for example, complexity of TRP control in the communication system can be avoided.

As information included in the command of the switch of the TRP that transmits the primary and/or secondary PDCCH, information similar to (12) disclosed as the information included in the random access start command from the gNB to the UE in the first embodiment may be used.

Switch of activation/deactivation of the secondary PDCCH may be performed without the switch of the TRP to be connected by the UE. The primary PDCCH may constantly operate. The gNB may command the switch of activation/deactivation of the secondary PDCCH to the UE. The command may be notified by using signaling similar to that of the primary TRP switch command. The switch command of the TRP that transmits the primary PDCCH and the switch command of the TRP that transmits the secondary PDCCH may be performed by using the same signaling, or may be performed by using different signaling. With this, for example, flexibility of scheduling can be enhanced.

The switch of the TRP that transmits the primary and/or secondary PDSCH may also be performed without the switch of the TRP to be connected by the UE. The primary PDSCH may be a PDSCH transmitted from the primary TRP, or may be a PDSCH scheduled by using the primary PDCCH. The secondary PDSCH may be a PDSCH scheduled by using the secondary PDCCH. As another example, the primary PDSCH may be a PDSCH to which control plane data is preferentially mapped over other PDSCHs. In the description above, the gNB may command the switch of the TRP that transmits the primary and/or secondary PDSCH to the UE. The command may be notified by using signaling similar to that of the primary TRP switch command. The switch command of the TRP that transmits the primary PDSCH and the switch command of the TRP that transmits the secondary PDSCH may be performed by using the same signaling, or may be performed by using different signaling. With this, for example, flexibility of scheduling can be enhanced.

As information included in the command of the switch of the TRP that transmits the primary and/or secondary PDSCH, information similar to (13) disclosed as the information included in the random access start command from the gNB to the UE in the first embodiment may be used.

For the switch of the TRP to which the UE transmits the primary and/or secondary PUCCH, a method similar to that for the switch of the TRP that transmits the primary and/or secondary PDSCH may also be applied. The primary PUCCH may be a PUCCH transmitted to the primary TRP, or may be a PUCCH scheduled by using the primary PDCCH. The secondary PUCCH may be a PUCCH scheduled by using the secondary PDCCH, or may be a PUCCH out of the PUCCHs transmitted by the UE that is different from the primary PUCCH.

For the switch of the TRP to which the UE transmits the primary and/or secondary PUSCH, a method similar to that for the switch of the TRP that transmits the primary and/or secondary PDSCH may also be applied. The primary PUSCH may be a PUSCH transmitted to the primary TRP, or may be a PUSCH scheduled by using the primary PDCCH. The secondary PUSCH may be a PUSCH scheduled by using the secondary PDCCH, or may be a PUSCH out of the PUSCHs transmitted by the UE that is different from the primary PUSCH. As another example, the primary PUSCH may be a PUSCH to which control plane information is preferentially mapped over other PUSCHs.

For the switch of the TRP to which the UE transmits the primary and/or secondary SRS, a method similar to that for the switch of the TRP that transmits the primary and/or secondary PDSCH may also be applied. The primary SRS may be an SRS transmitted to the primary TRP, or may be an SRS scheduled by using the primary PDCCH. The secondary SRS may be an SRS scheduled by using the secondary PDCCH, or may be an SRS out of the SRSs transmitted by the UE that is different from the primary SRS.

The timing of the HARQ response to downlink data in the UE may be derived with a slot number of the TRP for uplink communication at a downlink data reception time point being used as a reference. A slot offset from downlink data reception to HARQ response transmission may be a slot offset with a slot length of the TRP for uplink communication being used as a unit. The slot offset may be, for example, semi-statically notified from the gNB to the UE, may be dynamically notified, or may be a combination of both of the above. The UE may transmit the HARQ response in the slot number that is obtained by adding the slot offset to the slot number of the TRP for uplink communication at the downlink data reception time point, for example. The gNB may derive the slot number of the TRP for uplink communication at the downlink data reception time point in the UE by using a difference of the backhaul delay from the TA in each TRP and/or each TRP. With this, for example, the UE becomes capable of transmission of the HARQ response also to the TRP asynchronous with the TRP for downlink communication.

For the timing of SRS transmission in the UE, a method similar to that for the timing of the HARQ response to the downlink data may also be used. With this, for example, effects similar to the above can be obtained.

Each command described in the fifth modification of the first embodiment may be included in the same signaling for transmission, or different signaling may be used for notification. A plurality of signalings may be combined for transmission. With this, for example, the number of times of signaling from the gNB to the UE can be reduced. As a result, prompt scheduling from the gNB to the UE can be achieved.

For a single gNB, the UE may use only a single MAC entity, or may use a plurality of MAC entities. For example, the UE may use as many MAC entities as the number of primary PDCCHs and secondary PDCCHs. Alternatively, for example, the UE may use a single MAC entity for the primary PDCCH, and use a single MAC entity for the secondary PDCCH. With this, for example, flexibility of scheduling in communication using a plurality of TRPs can be enhanced.

Deactivation of the secondary PDCCH may be used for, for example, diversity using a plurality of TRPs. With this, for example, communication quality between the UE and the gNB can be enhanced.

Activation of the secondary PDCCH may be used for, for example, packet duplication using a plurality of PDCCHs. The plurality of PDCCHs described above may be, for example, the primary PDCCH and the secondary PDCCH. The UE may transmit each of duplicated PDCP packets by using the PUSCH that is scheduled by using each PDCCH. With this, for example, reliability of communication between the UE and the gNB can be enhanced.

According to the fifth modification of the first embodiment, flexible scheduling can be achieved without performing the switch of the connected TRP. Further, reliability of communication can be enhanced.

Second Embodiment

The UE may perform communication with a plurality of TRPs and/or beams in parallel. For example, the UE may perform communication with different TRPs and/or beams by using different beams controlled by the UE.

In application of the method described above, a problem described below is caused. For example, when a plurality of TRPs seen from the UE are located within a range of the same beam out of UE control beams, the UE cannot perform communication with the plurality of TRPs and/or beams described above in parallel. With this, in transmission and reception between the UE and a plurality of TRPs, when interference occurs between the plurality of TRPs, reliability of the communication is deteriorated, and further, throughput is deteriorated, which poses a problem.

A solution to the problem described above will be disclosed. The UE notifies the gNB of information as to whether communication can be performed with a plurality of TRPs and/or beams in parallel.

A solution to the problem described above will be disclosed for the information. The UE notifies the gNB of information as to whether communication can be performed with a plurality of TRPs and/or beams in parallel. The information may be, for example, a flag representing whether or not communication with a plurality of TRPs and/or beams can be performed in parallel regarding the UE. The information may be, for example, information related to presence or absence of support of a plurality of transmission and reception circuits in the UE. The information may be, for example, information related to a position relationship between the UE and the currently connected TRP and/or beam. The information related to the position relationship described above may be, for example, information related to the TRP and/or the beam belonging to a range of the same UE control beam. As another example, the information may be information related to a combination of the TRPs and/or beams that the UE is capable of transmission and reception in parallel, or may be information related to a combination of the TRPs and/or beams that the UE is incapable of transmission and reception in parallel.

For notification of the information, L1/L2 signaling may be used. For example, UCI for a CSI report may be used, or new UCI may be provided. With this, for example, the UE becomes capable of promptly notifying the gNB of the information.

As another example, the UE may perform notification of the notification by using MAC signaling or by using RRC signaling. With this, for example, the UE becomes capable of notifying the gNB of a large amount of information.

A combination of the notification methods described above may be used. For example, the information related to presence or absence of support of a plurality of transmission and reception circuits in the UE may be notified from the UE to the gNB by using RRC signaling (for example, by being included in UE capability), or the information related to a position relationship between the TRP and/or the beam currently connected by the UE and the UE may be notified from the UE to the gNB by using L1/L2 signaling. With this, for example, the signaling amount from the UE to the gNB can be reduced.

The gNB may perform scheduling for the UE by using the notification from the UE. The gNB may include information related to the TRP and/or the beam used by the gNB for downlink data and/or uplink data in downlink allocation for the UE and/or notification of an uplink grant so as to be notified. As the information, for example, information similar to (1) disclosed as an example of the information included in the random access start command from the gNB to the UE in the first embodiment may be used. Using the information, the UE may perform transmission and reception with the gNB by controlling the beam of the UE. With this, for example, reliability of the communication when the UE performs transmission and reception with the gNB by using a plurality of TRPs and/or beams can be enhanced.

As another example of information included by the gNB in the downlink allocation for the UE and/or the notification of an uplink grant, information related to beams controlled by the UE (for example, identifiers of the beams controlled by the UE) may be used. As another example, information related to the TRP of communication destination of the UE (for example, an identifier of the TRP) may be included in the information. The UE may notify the base station of information related to available beams (for example, the number of available beams) in advance. With this, for example, effects similar to the above can be obtained.

According to the second embodiment, interference between the TRPs in transmission and reception between the UE and a plurality of TRPs can be reduced. As a result, enhancement of reliability and enhancement of throughput can be achieved.

Third Embodiment

When the gNB performs communication with the UE by using a plurality of TRPs, interference between different TRPs and/or beams is increased. As a result, reliability and throughput in communication between the UE and the gNB is deteriorated, which poses a problem.

A solution to the problem described above will be disclosed. The gNB stops a part of the plurality of TRPs under the gNB. The TRP to be stopped may be, for example, a TRP to which the UE under the gNB is not connected.

The stop described above may be executed by not stopping a part of signals. For example, transmission of the SS burst may not be stopped. With this, for example, power consumption of the TRP can be reduced, and at the same time, the gNB becomes capable of restarting the TRP when the UE is present within a communication range of the TRP. As a result, the UE becomes capable of continuing communication with the gNB by using the TRP. In the description above, the UE may perform measurement of the SS burst. The UE may notify the gNB of measurement results of the SS burst. The signal not to be stopped may be, for example, the CSI-RS. Effects similar to the above can be obtained.

As another example of the stop described above, transmission frequency of the SS burst may be lowered. With this, for example, power consumption of the TRP can further be reduced. In the description above, the signal not to be stopped may be, for example, the CSI-RS. Effects similar to the above can be obtained.

As another example in the stop described above, all transmission and reception in the TRP may be stopped. The base station may restart operation of the TRP, based on whether or not the UE is present within coverage of a TRP near the TRP and/or a beam. With this, for example, power consumption of the TRP can further be reduced.

Candidates of the TRP to be stopped may be determined in advance. The gNB may determine the TRP to be stopped out of the candidates. The TRP not belonging to the candidates may not be stopped. The TRP not belonging to the candidates may be, for example, a TRP having a large communication range. With this, for example, power consumption of the TRP can be reduced, and at the same time, stability of communication in the TRP under the gNB can be secured.

The gNB may perform broadcast or individual notification of information related to the TRP stop to the UEs under the gNB. As the information related to the TRP stop, the following (1) to (4) are disclosed:
  (1) Information related to a stopping TRP
  (2) Information related to candidates of a TRP to be stopped
  (3) Information related to a signal to be transmitted to a stopping TRP
  (4) Combination of (1) to (3) described above In (1) described above, an identifier of the TRP may be used. With this, for example, the signaling amount from the gNB to the UE can be reduced. As another example, information related to a beam in the TRP may be used. In the description above, the identifier of the beam may be uniquely given through the gNB. Using the information, the UE may determine a TRP to be connected. With this, for example, when the UE receives the SS block of both of a currently stopping TRP and a non-stopping TRP, the UE becomes capable of starting connection to the non-stopping TRP. As a result, the UE becomes capable of promptly executing the connection to the TRP.

The information (2) described above may be similar to the information related to (1) described above. With this, for example, effects similar to those of (1) described above can be obtained.

The information (3) described above may be, for example, information related to a type of the signal (for example, the SS block or the CSI-RS), or may be information related to period and/or a timing offset in which the signal is transmitted. Using the information, the UE may perform reception operation of the signal in the currently stopping TRP. With this, for example, power consumption in the UE can be reduced.

The method disclosed in the third embodiment may be applied to stop of a panel in the TRP. The gNB may perform broadcast or individual notification of information related to the panel stop to the UEs under the gNB. As the information related to the panel stop, information arranged by changing the "TRP" in (1) to (4) of the information related to the TRP stop disclosed in the third embodiment to "panel" may be used. With this, for example, interference power in the communication system can be reduced.

According to the third embodiment, interference between the TRPs in transmission and reception between the UE and a plurality of TRPs can be reduced. As a result, enhancement of reliability and enhancement of throughput between the UE and the gNB can be achieved.

Fourth Embodiment

The UE using DC configuration may transmit the information of MCG failure to an SCG. In the transmission, for example, a split bearer may be used. The SCG may transmit the information to an MN. Using the information, the MN may perform recovery from the MCG failure.

In the method described above, a problem described below is caused. Specifically, signaling between the base stations is increased in the operation of the MCG recovery by the MN. For example, when the MN is changed to another base station without change of the SN, a handover request from the MN before change to the MN after change and a response thereto, an SN addition request from the MN after change to the SN and a response thereto, and an SN release request from the MN before change to the SN and a response thereto occur (see Non-Patent Document 12). With this, a problem that the MCG recovery is not promptly performed is caused.

A solution to the problem described above will be disclosed. A role change of the MN and the SN is used in recovery from the MCG failure. The role change may be, for example, executed by applying a method used in handover disclosed in Non-Patent Document 23 (R2-1802473) to the recovery from the MCG failure. With this, for example, signaling between the base stations in the MCG recovery can be reduced. As a result, prompt MCG recovery can be achieved.

The MN may judge presence or absence of execution of the role change. The judgement may be performed by using, for example, information of the MCG failure notified from the UE via the SCG. With this, for example, after the MCG failure, the MCG recovery operation can be promptly started.

The MN may notify the SN of a role change request. The notification may include information related to MN configuration that has been used by the MN for connection with the UE. Using the information, the SN may perform connection configuration with the UE after role change. The SN may notify the MN of a role change response. The notification may include information related to SN configuration that has been used by the SN for connection with the UE. Using the information, the MN may perform connection configuration with the UE after role change.

In recovery of the MCG failure, the SN may not use the MN as the SN after change. The SN may judge whether or not the MN is to be used as the SN after change, by using the role change request from the MN. The SN may include information as to whether or not the MN is to be used as the SN after change in the role change response to be notified to the MN and thereby notify the MN of the information. The MN may release connection with the UE by using the fact that the information is not true. With this, for example, flexible NW configuration in the communication system can be achieved, and the UE also becomes capable of promptly executing release of the MN before change.

As another example, the SN may include SN release request in the role change response and thereby notify the MN of the SN release request. The SN release request may be notified by using signaling different from that for the role change response. With this, for example, signaling between the base stations in release of the MN before change can be reduced.

The MN may transmit a configuration modification command for the UE, for example, signaling of RRC connection reconfiguration, via the SCG. For the transmission, for example, a split SRB may be used. With this, for example, even in a state of the MCG failure, the MN becomes capable of giving the configuration modification command to the UE. As a result, the UE becomes capable of promptly executing the MCG recovery.

The UE may transmit, to the SN, a response to the configuration modification command, for example, the RRC connection reconfiguration. By receiving the response, the SN may operate as the MN after change.

As another example, the SN may transmit, to the UE, the configuration modification command for the UE, for example, the signaling of RRC connection reconfiguration. In the description above, the SN may perform the connection configuration with the UE after role change. For the transmission, an SRB terminated by the SN, for example, SRB3, may be used. The UE may transmit, to the SN, a response to the configuration modification command, for example, the RRC connection reconfiguration. With this, for example, signaling between the base stations can be reduced.

Figure 35:
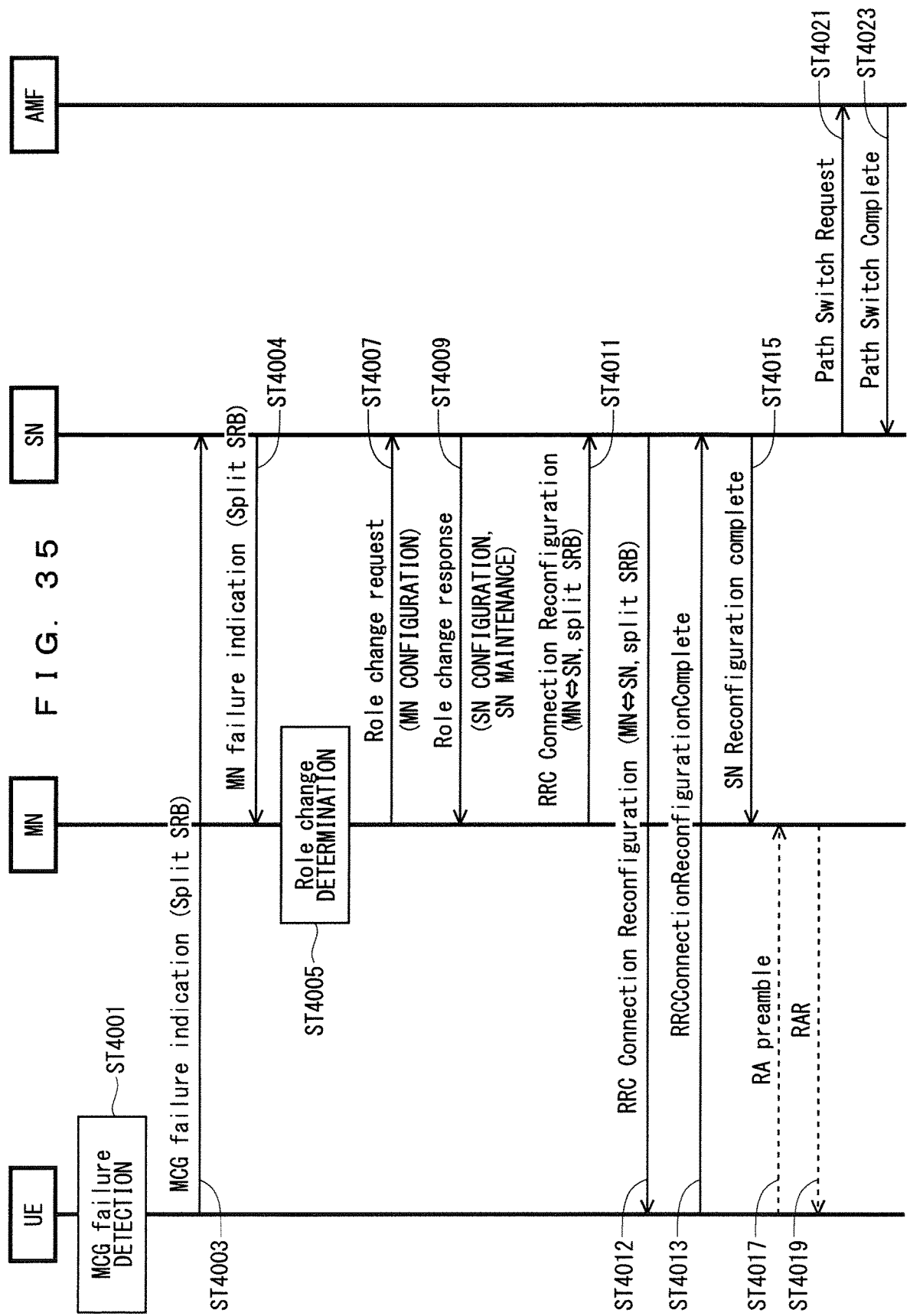
FIG. 35 is a diagram illustrating operation of applying role change to recovery from MCG failure according to the fourth embodiment.

FIG. 35 is a diagram illustrating operation of applying role change to the recovery from the MCG failure. The example illustrated in FIG. 35 illustrates a case in which release of the MN after change is not performed.

In Step ST4001 illustrated in FIG. 35, the UE detects MCG failure. The reason of the MCG failure detection may be, for example, RLF in the MCG. In Step ST4003, the UE transmits MCG failure indication to the SN. In Step ST4003, it is assumed that a split SRB is used. In Step ST4004, the SN transfers the MCG failure indication received in Step ST4003 to the MN.

In Step ST4005 illustrated in FIG. 35, the MN determines to perform role change of the master base station and the secondary base station with the SN. In Step ST4007, the MN transmits a role change request to the SN. The role change request may include UE configuration information in the MN. In Step ST4009, the SN notifies the MN of a role change response. The role change response may include the UE configuration information in the SN, or may include information indicating whether or not the secondary base station after role change can be maintained. In the example illustrated in FIG. 35, the secondary base station after role change is maintained.

In Step ST4011 illustrated in FIG. 35, the MN transmits, to the SN, the signaling of RRC connection reconfiguration to be notified to the UE. In Step ST4012, the SN transmits, to the UE, the signaling of RRC connection reconfiguration received in Step ST4011. For the transmission, a split SRB may be used. Using Step ST4012, the UE performs configuration related to change of the role of the MN and the SN. In Step ST4013, the UE notifies the SN, that is, the master base station after role change, of RRC connection reconfiguration complete. In Step ST4015, the SN notifies the MN, that is, the secondary base station after role change, of secondary base station reconfiguration complete (SN reconfiguration complete).

In Step ST4017 illustrated in FIG. 35, the UE transmits the RA preamble to the MN. In Step ST4019, the MN transmits the RA response to the UE.

In Step ST4021 illustrated in FIG. 35, the SN transmits a path switch request to the AMF. In Step ST4023, the AMF transmits a path switch response to the SN.

The example of FIG. 35 illustrates a case in which the MN is maintained as the secondary base station after change. However, the MN may be released. In the case described above, the random access processing illustrated as Steps ST4017 and ST4019 may not be performed between the UE and the MN. With this, for example, complexity in MCG recovery processing of the UE can be avoided.

According to the fourth embodiment, the signaling amount in the operation of the MCG recovery can be reduced. As a result, the MCG recovery operation in the UE can be promptly executed.

First Modification of Fourth Embodiment

The fourth embodiment discloses an example in which notification of the information of the MCG failure in the DC configuration is performed by using a split SRB. However, an SRB terminated in the SN, that is, SRB3, may be used. For example, when the split SRB is not configured, the UE may notify the SN of the information of the MCG failure.

In the method described above, a problem described below is caused. Specifically, the role change of the MN and the SN is started by the MN. Thus, there is a problem that the role change of the MN and the SN cannot be applied when the notification of the MCG failure is performed by the UE using SRB3. This results in causing a problem that the recovery from the MCG failure cannot be promptly executed.

A solution to the problem described above will be disclosed. The SN starts the role change. The SN judges presence or absence of execution of the role change. The judgement may be performed by using, for example, information of the MCG failure notified from the UE to the SN. With this, for example, after the MCG failure, the MCG recovery operation can be promptly started.

The SN may notify the MN of a role change request. The notification may include information related to SN configuration that has been used by the SN for connection with the UE.

The SN may not use the MN as the SN after change. The SN may judge whether or not the MN is to be used as the SN after change by using MCG failure information notification from the UE. The SN may include information as to whether or not the MN is to be used as the SN after change in the role change request to be notified to the MN and thereby notify the MN of the information. With this, for example, flexible NW configuration in the communication system can be achieved, and the UE also becomes capable of promptly executing release of the MN before change.

As another example, the SN may include SN release request in the role change response and thereby notify the MN of the SN release request. The SN release request may be notified by using signaling different from that for the role change response. With this, for example, signaling between the base stations in release of the MN before change can be reduced.

The MN may notify the SN of a role change response. The notification may include information related to MN configuration that has been used by the MN for connection with the UE. Using the information, the SN may perform connection configuration with the UE after role change.

The SN may transmit a configuration modification command for the UE, for example, signaling of RRC connection reconfiguration. For the transmission, for example, SRB3 may be used. With this, for example, even in a state of the MCG failure, the MN becomes capable of giving the configuration modification command to the UE. As a result, the UE becomes capable of promptly executing the MCG recovery.

The UE may transmit, to the SN, a response to the configuration modification command, for example, the RRC connection reconfiguration. By receiving the response, the SN may operate as the MN after change.

As another example, the MN may transmit, to the UE, the configuration modification command for the UE, for example, the signaling of RRC connection reconfiguration, via the SCG. In the description above, connection configuration with the UE after role change may be performed by the MN. For the transmission, a split SRB may be used. The UE may transmit, to the SN, a response to the configuration modification command, for example, the RRC connection reconfiguration. With this, for example, complexity of design in the communication system can be avoided.

Figure 36:
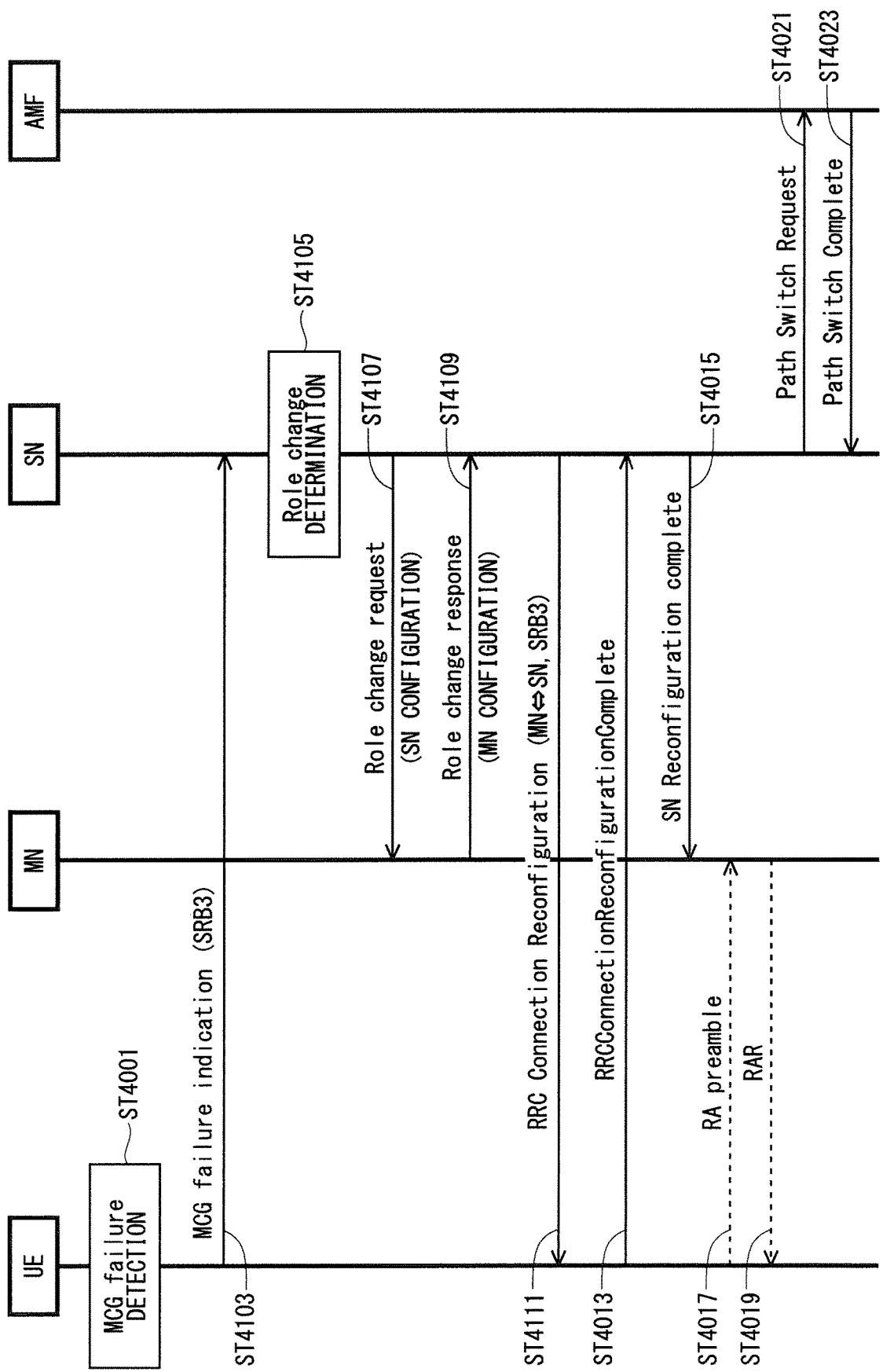
FIG. 36 is a diagram illustrating operation of applying role change to recovery from MCG failure according to the first modification of the fourth embodiment.

FIG. 36 is a diagram illustrating operation of applying role change to the recovery from the MCG failure. The example illustrated in FIG. 36 illustrates a case in which release of the MN after change is not performed. In FIG. 36, the processes common to those of FIG. 35 are denoted by the same step numbers, and common description will be omitted.

Step ST4001 illustrated in FIG. 36 is the same as that of FIG. 35.

In Step ST4103 illustrated in FIG. 36, the UE transmits MCG failure indication to the SN. In Step ST4103, it is assumed that SRB3 is used. In Step ST4105, the SN determines to perform role change of the secondary base station and the master base station with the MN. In Step ST4107, the SN transmits a role change request to the MN. The role change request may include UE configuration information in the SN, or may include information indicating whether or not the secondary base station after role change can be maintained. In the example illustrated in FIG. 36, the secondary base station after role change is maintained. In Step ST4109, the MN notifies the SN of a role change response. The role change response may include UE configuration information in the MN.

In Step ST4111 illustrated in FIG. 36, the SN transmits the signaling of RRC connection reconfiguration to the UE. For the transmission, SRB3 may be used. Using Step ST4111, the UE performs configuration related to change of the role of the MN and the SN.

Steps ST4013 to ST4023 illustrated in FIG. 36 are the same as those of FIG. 35.

Similarly to FIG. 35, the example of FIG. 36 illustrates a case in which the MN is maintained as the secondary base station after change. However, the MN may be released. In the case described above, the random access processing illustrated as Steps ST4017 and ST4019 may not be performed between the UE and the MN. With this, for example, complexity in MCG recovery processing of the UE can be avoided.

The fourth embodiment and the first modification of the fourth embodiment may be used in combination. For example, which bearer of the split SRB or SRB3 is used for the MCG failure indication from the UE may be statically determined in a specification. With this, for example, complexity in the communication system can be avoided.

As an example in which the bearer used for the MCG failure indication from the UE is statically determined in a specification, the split SRB may be used. For example, in DC configuration of the UE, when both of the split SRB and SRB3 are configured and/or when only the split SRB is configured, the split SRB may be used. With this, for example, complexity in function implementation of the MCG failure indication to the communication system can be avoided.

As another example, SRB3 may be used. For example, in DC configuration of the UE, when both of the split SRB and SRB3 are configured and/or when only SRB3 is configured, SRB3 may be used. With this, for example, the signaling amount between the base stations in the recovery from the MCG failure can be reduced.

As another example as to which bearer of the split SRB or SRB3 is used for the MCG failure indication from the UE, the bearer to be used may be determined by the base station and notified to the UE. With this, for example, flexibility in the communication system can be enhanced. The notification may be, for example, notified by using RRC signaling. The RRC signaling may be, for example, signaling used for initial connection between the UE and the master base station, or may be signaling used by the UE for handover to the master base station. As another example, the RRC signaling may be signaling used at the time of SN addition, may be signaling used for SN modification, or may be signaling used for SN change.

As another example related to the combination of the fourth embodiment and the first modification of the fourth embodiment, which bearer of the split SRB or SRB3 is used for the signaling of RRC connection reconfiguration from a network (the master base station or the secondary base station) to the UE may be determined in a manner similar to that for the MCG failure indication from the UE. With this, for example, effects similar to the above can be obtained. As another example, the same bearer as that for the MCG failure indication from the UE may be used, or a bearer different from that for the MCG failure indication from the UE may be used.

According to the first modification of the fourth embodiment, the signaling amount in the operation of the MCG recovery can be reduced. As a result, the MCG recovery operation in the UE can be promptly executed.

Fifth Embodiment

In 3GPP, a sidelink (SL) is supported for Device to Device (D2D) communication and Vehicle to Vehicle (V2V) communication (see Non-Patent Document 1). The SL is defined by the PC5 interface.

Physical channels (see Non-Patent Document 1) used in the SL will be described. A physical sidelink broadcast channel (PSBCH) carries information related to the system and synchronization, and is transmitted from the UE.

A physical sidelink discovery channel (PSDCH) carries a sidelink discovery message from the UE.

A physical sidelink control channel (PSCCH) carries control information from the UE for sidelink communication and V2X sidelink communication.

A physical sidelink shared channel (PSSCH) carries data from the UE for sidelink communication and V2X sidelink communication.

Transport channels (see Non-Patent Document 1) used in the SL will be described. A sidelink broadcast channel (SL-BCH) includes a predetermined transport format, and is mapped to the PSBCH being a physical channel.

A sidelink discovery channel (SL-DCH) includes periodic broadcast transmission of a predetermined format having a fixed size. Further, the SL-DCH supports both of UE autonomous resource selection and resource allocation scheduled by the eNB. In the UE autonomous resource selection, there is a collision risk. When individual resources are allocated to the UE by the eNB, there is no collision. Further, the SL-DCH supports HARQ combining. Note that the SL-DCH does not support HARQ feedback. The SL-DCH is mapped to the PSDCH being a physical channel.

A sidelink shared channel (SL-SCH) supports broadcast transmission. The SL-SCH supports both of UE autonomous resource selection and resource allocation scheduled by the eNB. In the UE autonomous resource selection, there is a collision risk. When individual resources are allocated to the UE by the eNB, there is no collision. Further, the SL-SCH supports HARQ combining. Note that the SL-SCH does not support HARQ feedback. Further, the SL-SCH supports dynamic link adaptation by changing transmission power, modulation, and coding. The SL-SCH is mapped to the PSSCH being a physical channel.

Logical channels (see Non-Patent Document 1) used in the SL will be described. A sidelink broadcast control channel (SBCCH) is a sidelink channel for broadcasting sidelink system information from one UE to another UE. The SBCCH is mapped to the SL-BCH being a transport channel.

A sidelink traffic channel (STCH) is a one-to-many sidelink traffic channel for transmitting user information from one UE to another UE. The STCH is used only by the UE that has sidelink communication capability and the UE that has V2X sidelink communication capability. One-to-one communication between the two UEs having the sidelink communication capabilities is also implemented by using the STCH. The STCH is mapped to the SL-SCH being a transport channel.

In the SL, multi-carrier operation is supported. FIG. 37 is a conceptual diagram illustrating multi-carrier operation in the SL. Between the eNB and the UE, communication is performed by using interface Uu. Uplink communication is performed in the uplink from the UE to the eNB, and downlink communication is performed in the downlink from the eNB to the UE. Between the UE and the UE, communication is performed by using interface PC5.

In the SL, one or a plurality of carriers (carrier #0 to carrier #n) are used, and communication from one UE (UE #1) to one or a plurality of UEs (UE #2 to UE #4) is performed.

Resources for the PSCCH and the PSSCH are configured in one SL carrier. When a plurality of carriers are configured in the SL, the resources for the PSCCH and the PSSCH are individually configured in each carrier, and thus PSCCH timing and PSSCH timing in each carrier are different.

A transmitter UE (UE_tx) in the SL performs transmission at the PSCCH timing and the PSSCH timing in each carrier. When the PSCCH timing and the PSSCH timing in each carrier are different, a receiver UE (UE_rx) in the SL needs to receive the PSCCH and the PSSCH in each carrier with different timings, which leads to increase of power consumption.

The increase of power consumption results in acceleration of consumption of a battery and reduction of communication time. For example, if the UE_rx is a terminal for a pedestrian, usually, the terminal only has a small-capacity battery, and the increase of power consumption thus presents a problem. In the fifth embodiment, a method for solving such a problem will be disclosed.

In a plurality of carriers in the SL, the PSSCHs at the same timing are configured. In other words, in a plurality of carriers in the SL, the transmission timings of the PSSCHs are set to be the same. A configuration method will be disclosed. The resource timings of the PSSCHs in each carrier are set to be the same. In scheduling information of the PSSCH, parameters in the time-axis direction are set to be the same. The scheduling information of the resources of the PSSCH is included in SCI, and is notified from the UE_tx to the UE_rx by using the PSCCH. The PSCCH and the PSSCH are transmitted in each carrier, and the PSCCH and the PSSCH are transmitted in the same carrier.

Scheduling information of the PSCCH of each carrier is included in DCI, and is notified from the eNB to the UE_tx by using the PDCCH. By receiving the PDCCH, the UE_tx can receive the scheduling information of the PSCCH of each carrier.

As another method, the UE_tx may select resources to be used for the PSCCH and/or the PSSCH of each carrier. The eNB notifies the UE_tx of resources available for the PSCCH and/or the PSSCH for each carrier in advance. The available resources may be notified as a resource pool. The UE_tx may select resources to be used out of the resources available for each carrier that are notified from the eNB.

The resources available for the PSCCH and/or the PSSCH of each carrier may be configured in the UE_tx in advance. For example, information of the available resources may be stored in a SIM of the UE_tx by an operator. The UE_tx may select resources to be used out of the resources available for each carrier that are configured in advance.

As a method for the UE_tx to select resources to be used for the PSCCH and the PSSCH of each carrier, sensing processing may be performed. As the sensing processing, the UE_tx measures received power and received signal strength of the resources available for the PSSCH that are notified from the eNB in advance or that are configured for the UE_tx in advance. For the selection of the resources, a predetermined threshold may be provided for measurement results.

For example, resources available for the PSSCH are measured for each RB. When the measurement results exceed the predetermined threshold, the RB is unable to be selected, and when the measurement results are equal to or less than the predetermined threshold, the RB is able to be selected. The measurement may be performed for each RB, or may be performed for each unit of a plurality of RBs. In this manner, the UE_tx becomes capable of selecting the resources to be used for the PSCCH and the PSSCH of each carrier.

FIG. 38 and FIG. 39 are each an example of a sequence for configuring the PSSCHs at the same timing in a plurality of carriers. FIG. 38 and FIG. 39 are connected at the position of the boundary line BL3839. The example of FIG. 38 and FIG. 39 illustrates a case in which four carriers are used as the carriers of SL communication.

In Step ST4901, the eNB notifies the UE_tx and the UE_rx of PC5 resource configuration. Examples of the PC5 resource configuration include a carrier list including one or a plurality of pieces of carrier information and resource pool configuration of each carrier. In the carrier list, frequency information of each carrier may be included. The PC5 resource configuration may be included in system information to be broadcast, or may be included in RRC information to be notified in dedicated RRC signaling.

In Step ST4902, the UE_tx in which data to be transmitted in PC5 is generated requests resources to be used for PC5 communication from the eNB. The request is included in the RRC information to be notified by using the dedicated RRC signaling. An SR or a BSR may be included in the request message to be notified. With this, the eNB recognizes that the UE_tx has data to be transmitted in PC5.

In Step ST4903, the eNB notifies the UE_tx of carrier information and PSCCH scheduling information by using the PDCCH. These pieces of information may be included in DCI to be notified. A format for DCI including these pieces of information may be newly provided. Alternatively, these pieces of information may be included in existing DCI 5A to be notified. As the carrier information, an identifier or a number for identifying the carrier may be used. The carrier information may be associated with each carrier in the carrier list. The carriers in the carrier list of Step ST4901 can be identified.

For example, in Step ST4903, information related to carrier number 0 is notified. As the scheduling information of the PSCCH, the scheduling information of the resource of the PSCCH transmitted on carrier number 0 may be included. The UE_tx can recognize that carrier number 0 can be transmitted, and can identify the PSCCH resource in the carrier.

In a similar manner, in Step ST4904, the eNB notifies the UE_tx of carrier information and PSCCH scheduling information by using the PDCCH. The UE_tx can recognize that carrier number 1 can be transmitted, and can identify the PSCCH resource in the carrier.

In a similar manner, in Step ST4905, the eNB notifies the UE_tx of carrier information and PSCCH scheduling information by using the PDCCH. The UE_tx can recognize that carrier number 2 can be transmitted, and can identify the PSCCH resource in the carrier.

In a similar manner, in Step ST4906, the eNB notifies the UE_tx of carrier information and PSCCH scheduling information by using the PDCCH. The UE_tx can recognize that carrier number 3 can be transmitted, and can identify the PSCCH resource in the carrier.

In Step ST4903 to Step ST4906, the eNB transmits, to the UE_tx, the carrier information and the scheduling information of the PSCCH resource for each carrier by using the PDCCH. As another method, the carrier information and the scheduling information of the PSCCH resource of each carrier may be transmitted in a single PDCCH. The eNB includes the carrier information and the scheduling information of the PSCCH resource of one carrier in one piece of DCI, and includes pieces of DCI for a plurality of carriers in one PDCCH. With this, the eNB notifies the UE_tx of the carrier information and the scheduling information of the PSCCH resource of the one carrier by using the one PDCCH.

In this manner, the UE_tx only needs to receive a single PDCCH, and thus the information of each carrier can be received at an early stage. Further, through reduction of the number of times of reception, power consumption of the UE_tx can be reduced.

Further, in the method, a piece of DCI of each carrier is individually included in the PDCCH. However, information of a plurality of carriers and scheduling information of the PSCCH resource for each carrier may be included in one piece of DCI. The eNB may include the information in one piece of DCI and include the one piece of DCI in one PDCCH, and thereby notify the UE_tx of the information by using one PDCCH. In this manner, a plurality of pieces of DCI need not be received. Thus, DCI information can be received at an early stage.

As the method of indicating a plurality of pieces of carrier information in one piece of DCI, for example, a bitmap may be used. A bitmap of the number of carriers of the carrier list illustrated in Step ST4901 may be provided, such that association between information and a carrier may be indicated by using a bit corresponding to the carrier. For example, association may be provided from the LSB of the bitmap in ascending order of the carrier list. In this manner, information of a plurality of carriers can be indicated by using a small number of bits.

In Step ST4907, the UE_tx performs sensing processing for searching for the resources for the PSSCH in each carrier (carrier number 0, carrier number 1, carrier number 2, and carrier number 3). In the sensing processing, for example, resources not used for SL communication by other UEs are detected. The UE_tx may use the resource pool configuration of each carrier notified in Step ST4901. The UE_tx identifies available resources through the sensing processing.

The eNB may notify the UE_tx of the scheduling information of the PSSCH in Step ST4903 to Step ST4906. With this, the UE_tx becomes capable of identifying the scheduling information of the PSSCH. In this case, the sensing processing in each carrier in Step ST4907 can be omitted.

When the eNB notifies the UE_tx of the scheduling information of the PSSCH, the eNB performs the notification by configuring the resources for PSSCH transmission at the same timing in each carrier. With this, the UE_tx becomes capable of configuring the resources for PSSCH transmission at the same timing in each carrier.

Step ST4902 to Step ST4906 for notification from the eNB to the UE_tx may be omitted. In this case, the UE_tx may perform the sensing processing in each carrier in Step ST4907 by using the resource pool of each carrier received from the eNB in Step ST4901. In this manner, the UE_tx becomes capable of selecting the resources and the carriers at the same timing for PSSCH transmission.

In Step ST4908, the UE_tx selects the resources at the same timing in a plurality of carriers out of the identified available resources. Alternatively, the UE_tx may select the carriers having the resources at the same timing out of the identified available resources. In this manner, the UE_tx selects a plurality of carriers having the resources at the same timing. In the example of FIG. 38 and FIG. 39, the carriers having the resource at the same timing are three carriers, namely, carrier number 0, carrier number 1, and carrier number 3.

In Step ST4909, the UE_tx notifies the UE_rx of the scheduling information of the PSSCH by using the PSCCH of carrier number 0. In a similar manner, in Step ST4910, the UE_tx notifies the UE_rx of the scheduling information of the PSSCH by using the PSCCH of carrier number 1. In a similar manner, in Step ST4911, the UE_tx notifies the UE_rx of the scheduling information of the PSSCH by using the PSCCH of carrier number 3.

The scheduling information of the PSSCH may be the scheduling information of the resources at the same timing selected in Step ST4908. The scheduling information of the resources in the time axis is the same as that of other carriers. The scheduling information of the resources in the frequency axis may be the same as or different from that of other carriers.

The resource timing of the PSSCH may be periodic. Further, the resource timing of the PSSCH may be semi-persistent.

In Step ST4912, the UE_tx performs data transmission by using the PSSCH of carrier number 0. Further, in Step ST4913, the UE_tx performs data transmission by using the PSSCH of carrier number 1. Further, in Step ST4914, the UE_tx performs data transmission by using the PSSCH of carrier number 3.

The UE_rx receives the PSCCH in the carriers of carrier numbers 0, 1, and 3 in Steps ST4909, ST4910, and ST4911, and receives data from the UE_tx in each carrier by using the scheduling information of the PSCCH included in the PSCCH of each carrier.

By adopting the method disclosed in the fifth embodiment, in the SL in which a plurality of carriers are supported, the resource timing of the PSSCH of each carrier can be set to be the same. Therefore, power consumption of the UE_rx can be reduced.

First Modification of Fifth Embodiment

In the method disclosed in the fifth embodiment, scheduling of the same resource timing needs to be configured for each carrier for a plurality of carriers used in the SL. This increases the information amount, and increases the resource amount required for control. This further increases overhead required for data transmission. In the first modification, a method for solving such a problem will be disclosed.

Carrier information as a candidate for scheduling the same resource timing is provided. This is referred to as candidate carrier information. The eNB notifies the UE_tx of the candidate carrier information. The candidate carrier information may be included in DCI to be notified by using the PDCCH. The candidate carrier information can be dynamically configured as the UE_tx requires. As another notification method, the candidate carrier information may be notified as RRC information by using RRC signaling. Alternatively, the candidate carrier information may be notified as MAC information by using MAC signaling. Retransmission control is performed, and the reception error rate can thus be reduced.

The carrier information for the PSCCH for performing scheduling of the PSSCH is provided. This is referred to as carrier information for the PSCCH. In a plurality of carriers for scheduling the same resource timing, the PSCCH is transmitted in one carrier. The carrier information for the PSCCH is information of the one carrier for transmitting the PSCCH. The eNB notifies the UE_tx of the carrier information for the PSCCH. As the notification method, a method similar to that for the candidate carrier information may be applied.

The carrier information for actually performing scheduling of the same resource timing is provided. This is referred to as use carrier information. The UE_tx notifies the UE_rx of the use carrier information. The use carrier information may be included in SCI to be notified by using the PSCCH.

The scheduling information of the PSSCH is notified by using the PSCCH of the carrier for the PSCCH. As the scheduling information of the PSSCH, the scheduling information of the PSSCH at the same resource timing configured for a plurality of carriers may be used. The UE_tx may include the information in SCI to notify the UE_rx of the information by using the PSCCH of the carrier for the PSCCH.

In the resource configuration of the PSSCH, not only the resource timing but also the resource in the frequency axis may be configured in the same manner. An offset of the frequency direction and a resource from the offset may be configured. The offset may be, for example, configured with the lowest subcarrier in the carrier being used as a reference. A configuration unit may be, for example, a subcarrier unit, a PRB unit, or the like. As the scheduling information, the scheduling information of the PSSCH of the same resource configured for a plurality of carriers may be used. By arranging the resource configuration of the PSSCH to be the same in all of the use carriers, the information amount that needs to be notified from the UE_tx to the UE_rx can be reduced. The information amount that needs to be notified by using the PSCCH can be reduced.

Figure 40:
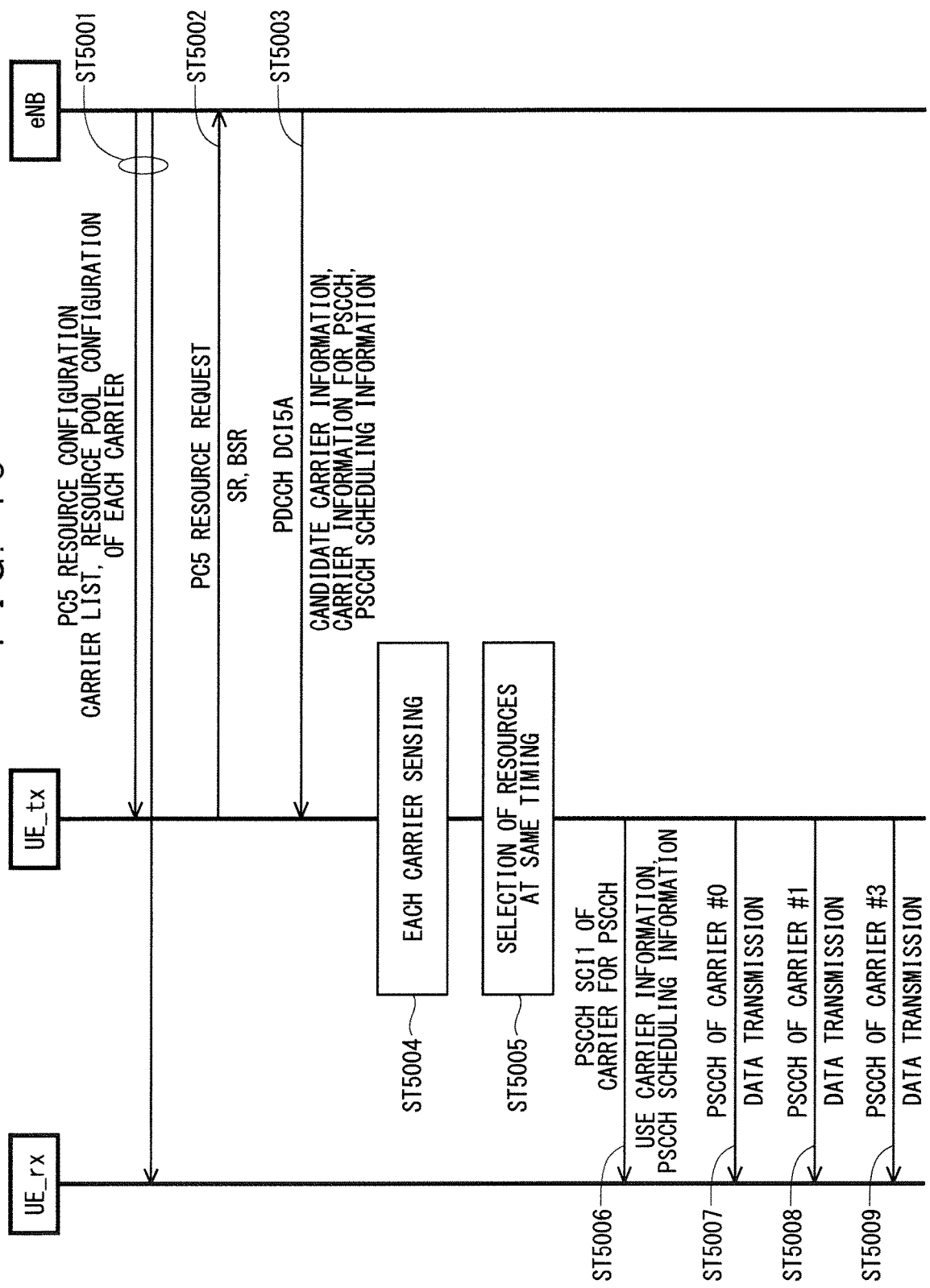
FIG. 40 is an example of a sequence for configuring the PSCCH and the PSSCH at the same timing in a plurality of carriers according to the first modification of the fifth embodiment.

FIG. 40 is an example of a sequence for configuring the PSCCH and the PSSCH at the same timing in a plurality of carriers according to the present modification of the fifth embodiment. The example of FIG. 40 illustrates a case in which four carriers are used as the carriers of SL communication.

Steps ST5001 and ST5002 are the same as Steps ST4901 and ST4902 of FIG. 38 and FIG. 39, and description thereof is herein omitted.

In Step ST5003, the eNB notifies the UE_tx of the candidate carrier information, the carrier information for the PSCCH, and the PSCCH scheduling information by using the PDCCH. These pieces of information may be included in DCI to be notified. A format for DCI including these pieces of information may be newly provided. Alternatively, these pieces of information may be included in existing DCI 5A to be notified. As the candidate carrier information, an identifier or a number for identifying the carrier may be used. The candidate carrier information may be associated with each carrier in the carrier list. The carriers in the carrier list of Step ST5001 can be identified.

For example, the candidate carrier information is carrier numbers 0, 1, 2, and 3. For example, the carrier information for the PSCCH is carrier number 0. As the scheduling information of the PSCCH, the scheduling information of the resources of the PSCCH transmitted in carrier number 0 is included.

Based on the candidate carrier information, the UE_tx recognizes that the four carriers of carrier numbers 0, 1, 2, and 3 can be transmitted. Further, based on the PSCCH carrier information, the UE_tx recognizes that PSCCH transmission is performed in the carrier of carrier number 0. Further, based on the scheduling information of the PSCCH, the UE_tx recognizes the resources for the PSCCH in the carrier of carrier number 0.

In Step ST5004, the UE_tx performs sensing processing for searching for the resources for the PS SCH in the candidate carrier (carrier number 0, carrier number 1, carrier number 2, and carrier number 3). The UE_tx may use the resource pool configuration of each carrier notified in Step ST5001. The UE_tx identifies available resources through the sensing processing.

The eNB may notify the UE_tx of the use carrier information in Step ST5003. Further, the eNB may notify the UE_tx of the scheduling information of the PSSCH in Step ST5003. With this, the UE_tx becomes capable of identifying the scheduling information of the PSSCH. In this case, the sensing processing in each carrier of Step ST5004 can be omitted.

When the eNB notifies the UE_tx of the scheduling information of the PSSCH, the eNB performs the notification by configuring the resources for PSSCH transmission at the same timing in each carrier. With this, the UE_tx becomes capable of configuring the resources for PSSCH transmission at the same timing in each carrier.

Step ST5002 to Step ST5003 for notification from the eNB to the UE_tx may be omitted. In this case, the UE_tx may perform the sensing processing in each carrier in Step ST5004 by using the resource pool of each carrier received from the eNB in Step ST5001. In this manner, the UE_tx becomes capable of selecting the resources and the carriers at the same timing for PSSCH transmission.

In Step ST5005, the UE_tx selects the resources at the same timing in a plurality of carriers out of the identified available resources. Alternatively, the UE_tx may select the carriers having the resources at the same timing out of the identified available resources. In this manner, the UE_tx selects a plurality of carriers having the resources at the same timing. In the example of FIG. 40, the carriers having the resource at the same timing are three carriers, namely, carrier number 0, carrier number 1, and carrier number 3.

In Step ST5006, the UE_tx notifies the UE_rx of the use carrier information. The UE_tx notifies the UE_rx of the scheduling information of the PSSCH by using the PSCCH of carrier number 0. As the use carrier information, carrier number 0, carrier number 1, and carrier number 3 are herein notified. As the scheduling information of the PSSCH, the scheduling information of the resources at the same timing selected in Step ST5005 may be used.

The resources in the time axis may be the same in all of the carriers being used. Only a piece of scheduling information is required in the time axis. The resources in the frequency axis may be the same or different in all of the carriers being used. When the resources are the same, only a piece of scheduling information is required in the frequency axis. When the resources are different, each carrier and the scheduling information in each carrier may be associated with each other.

The resource timing of the PSSCH may be periodic. Further, the resource timing of the PSSCH may be semi-persistent.

In Step ST5006, it is indicated that the UE_tx transmits the PSCCH of the carrier for the PSCCH to the UE_rx. The UE_rx receives the carrier for the PSCCH, and may thus receive the PSCCH of the carriers in the carrier list. For example, by receiving the PSCCH including the use carrier information and the PSSCH scheduling information, the UE_rx can recognize the carrier for the PSCCH. When the UE_rx receives the PSCCH for the carrier of the PSCCH, the UE_rx may stop further reception of the PSCCH of the carrier.

Another method for the UE_rx to obtain the carrier information for the PSCCH will be disclosed. The eNB may include the carrier information for the PSCCH in the information notified in Step ST5001 so as to be notified. The carrier information for the PSCCH may be included in the SIB so as to be broadcast. Both of the UE_tx and the UE_rx become capable of recognizing the carrier information for the PSCCH. The UE_tx becomes capable of identifying the carrier for the PUCCH of Step ST5006. The UE_rx only needs to receive the PSCCH of only the carrier for the PSCCH in Step ST5006.

The eNB may include the PSCCH scheduling information in the information notified in Step ST5001 so as to be notified. The PSCCH scheduling information may be included in the SIB so as to be broadcast. Both of the UE_tx and the UE_rx become capable of recognizing the PSCCH scheduling information. Both of the UE_tx and the UE_rx can recognize the resources of the PSCCH to be used in the carrier for the PUCCH of Step ST5006.

The eNB may include the candidate carrier information in the information notified in the Step ST5001 so as to be notified. The eNB may include the candidate carrier information in the SIB so as to be broadcast. The UE_tx becomes capable of recognizing the candidate carrier information. The UE_tx becomes capable of sensing in each carrier of the candidate carriers in Step ST5004.

When the eNB notifies the UE_tx and the UE_rx of the carrier information for the PSCCH, the PSCCH scheduling information, and the candidate carrier information in Step ST5001, signaling of Step ST5002 to Step ST5003 can be omitted. For example, this can be applied when the UE_tx selects the resources to be used for the PSSCH of each carrier.

In Step ST5007, the UE_tx performs data transmission by using the PSSCH of carrier number 0. Further, in Step ST5008, the UE_tx performs data transmission by using the PSSCH of carrier number 1. Further, in Step ST5009, the UE_tx performs data transmission by using the PSSCH of carrier number 3.

In Step ST5006, the UE_rx receives the PSCCH of the carrier for the PSCCH, and receives data from the UE_tx in the carriers of carrier numbers 0, 1, and 3 by using the scheduling information of the PSCCH included in the PSCCH.

Another method for the UE_rx to obtain the scheduling information of the PSSCH of the use carrier will be disclosed. The use carrier information and the PSSCH scheduling information may be notified by using the PSCCH of all of the carriers included in the candidate carriers. By receiving the PSCCH of any of the candidate carriers, the UE_rx becomes capable of acquiring the use carrier and the scheduling information of the PSSCH. Reception processing of the UE_rx can be reduced, and power consumption can be reduced.

By adopting the method disclosed in the first modification of the fifth embodiment, effects similar to those of the fifth embodiment can be obtained. Further, the information amount required to perform multi-carrier communication in the SL can be reduced. The resource amount required for notification from the eNB to the UE_tx and the resource amount required for notification from the UE_tx to the UE_rx can be reduced, and thus overhead required for data communication in the SL can be reduced.

The fifth embodiment and the first modification of the fifth embodiment disclose that the UE_tx performs sensing in each carrier. This is because the resources for SL communication may be used by other UE_txs. When the resources for SL communication are used by other UE_txs, the resources at the same timing cannot be selected in a plurality of carriers. In V2V communication and V2P communication, it is assumed that a large number of UEs communicate. For example, when such a large number of UEs use the resources for SL communication, the resources at the same timing cannot be selected in a plurality of carriers.

A method for solving such a problem will be disclosed. A resource pool dedicated to the resource configuration at the same timing in a plurality of carriers is provided. By making a distinction from a conventional resource pool, the resources at the same timing in a plurality of carriers are more easily selected. As the PC5 resource configuration, the resource pool configuration dedicated to the resource configuration at the same timing in a plurality of carriers may be notified in Step ST4901 in the example of FIG. 38 and FIG. 39 or in Step ST5001 in the example of FIG. 40. The resource pool configuration may be configured separately from the resource pool configuration of each carrier of Step ST4901 of the example of FIG. 38 and Step ST5001 of the example of FIG. 40 so as to be notified.

In this manner, incapability of selection of the resources at the same timing in a plurality of carriers can be prevented. This easily enables reduction of power consumption of the UE_rx.

In the first modification of the fifth embodiment, the eNB configures the carrier for the PSCCH and notifies the UE_tx of the configuration. As another method, the UE may configure the carrier for the PSCCH. This eliminates the necessity of notification of the carrier for the PSCCH from the eNB to the UE_tx.

The description above discloses operation in which the UE_tx selects a plurality of carriers having resources at the same timing. The UE_tx selects the carrier for the PSCCH out of the selected carriers. For example, in FIG. 40, the processing may be performed in Step ST5005.

The UE_tx notifies the UE_rx of the use carrier information and the scheduling information of the PSSCH by using the carrier for the PSCCH selected by the UE_tx. These pieces of information may be included in SCI1 of the PSCCH of the carrier for the PSCCH being selected so as to be notified. For example, in FIG. 40, the processing may be performed in Step ST5006.

In this manner, the UE becomes capable of selecting the carrier for transmitting the PSCCH, and thus becomes capable of selecting the carrier for the SL having satisfactory communication quality. By enhancing communication quality of the control channel for communication in the SL, reliability of data communication in the SL can be enhanced.

In NR, a supplementary uplink (SUL) is supported (see Non-Patent Document 16). The SL may be configured in the SUL. As the carrier used for the SL, the carrier configured as the SUL may be used.

For example, when the eNB performs the PC5 resource configuration for the UE for D2D or for V2V, the carrier configured as the SUL is configured as the carrier used for PC5. In this case, information indicating the SUL may be provided. Numbers as the carriers for the SUL may be assigned when the carriers for the SUL are configured in RRC, and the numbers may be used as the information indicating the SUL.

Further, the carriers of the SUL corresponding to each non-SUL carrier may be provided. The non-SUL carrier numbers and the SUL carrier numbers may be associated with each other.

A channel for the SL is allocated to the carrier configured as the SUL. For example, the PSCCH and the PSSCH may be allocated to the carrier configured as the SUL.

For SL communication using the SUL, the method disclosed in the fifth embodiment and the first modification of the fifth embodiment may be applied.

The SUL and the non-SUL may be used for the SL communication. The SL communication is performed by using the SUL carrier and the non-SUL carrier. The SUL and the non-SUL may be switched. The switch may be, for example, dynamically performed. For example, the method for setting the resource timings of the PSSCHs in a plurality of carriers to be the same according to the fifth embodiment and the first modification of the fifth embodiment may be applied as appropriate. With this, the resource timings of the PSCCHs become the same, and the SUL and the non-SUL can be dynamically switched.

The switch of the SUL and the non-SUL may be performed by using a control channel of any one of the carriers. For example, the switch may be performed by using the PSCCH of the carrier for the PSCCH. Information indicating switch of the SUL and the non-SUL may be included in SCI. The SCI is notified from the UE_tx to the UE_rx by using the PSCCH of the carrier for the PSCCH. As information indicating the SUL and non-SUL switch, configuration of a used carrier may be used.

For example, when the SUL is used, SUL carrier configuration is used as information indicating switch. When the non-SUL is used, non-SUL carrier configuration is used as information indicating switch. Further, as well as the information indicating the SUL and non-SUL switch, resource allocation information may also be included in the SCI.

For example, these pieces of information may be included in the SCI of the PSCCCH of the carrier for the PSCCH of Step ST5006 of FIG. 40 so as to be notified. The UE_tx judges which of the SUL and the non-SUL is to be used, and includes these pieces of information in the SCI so as to notify the UE_rx of the pieces of information by using the PSCCH of the carrier for the PSCCH.

The UE_rx that has received the PSCCH of the carrier for the PSCCH can recognize the SUL and non-SUL switch, that is, which carrier of the SUL or the non-SUL is used for transmission of the PSSCH. Further, by receiving the scheduling information of the PSCCH, the UE_rx becomes capable of receiving the PSCCH.

The description above discloses that notification of the information indicating the switch of the SUL and the non-SUL may be performed by using the PSCCH of the carrier for the PSCCH. As another example, the information indicating the switch may be notified by using the PSCCH of one carrier out of a plurality of carriers for actually performing communication with the SL. For example, the information indicating the switch may be notified by using the PSCCH of carrier number 0 illustrated in Step ST4909 of FIG. 39. This is effective also when the SUL carrier corresponding to each non-SUL carrier is provided.

In this manner, when the SUL is configured in NR, SL can be configured in the carrier in which the SUL is configured, which enables SL communication. By using the SUL, coverage of communication in the SL can be increased. Reliability of SL communication can be enhanced.

Although the description above discloses that the SUL may be used in the SL communication, the SUL may be used in V2X communication using the Uu interface. The SUL may be used in the uplink of V2X communication using Uu. Further, the SUL and non-SUL switch may be performed in the uplink of V2X communication using Uu. In this manner, when the SUL is configured in NR, V2X communication using Uu is enabled in the carrier in which the SUL is configured, and coverage of V2X communication can be increased. Reliability of V2X communication can be enhanced.

The fifth embodiment and the first modification of the fifth embodiment disclose that the resource timings of the PSSCHs of a plurality of carriers are arranged to be the same. The timings need not be the same. The timings may be arranged to coincide within a predetermined range. The predetermined range may be determined in a specification or the like in advance. For example, the predetermined range may be a timing window. As a configuration unit, for example, a symbol unit, a mini-slot unit, a slot unit, a subframe unit, a TTI unit, a short TTI unit, or the like may be used. This provides flexibility in scheduling. Further, the UE_rx only needs to perform reception in the predetermined range, which also provides effects of reducing power consumption.

In the fifth embodiment and the first modification of the fifth embodiment, the eNB is taken as an example of the base station. However, the gNB may be used instead. Also when the SL is supported in NR, a method as that disclosed in the fifth embodiment and the first modification of the fifth embodiment may be applied as appropriate. Similar effects can be obtained.

Sixth Embodiment

In 3GPP, two routes are studied in V2V communication in coverage of the eNB. The two routes are PC5-based V2V and Uu-based V2V (see Non-Patent Document 24 (TR 36.885V14.0.0)). FIG. 41 and FIG. 42 are each a conceptual diagram for illustrating PC5-based V2V and Uu-based V2V. FIG. 41 is a conceptual diagram of PC5-based V2V. In PC5-based V2V, communication is directly performed from the UE for V2V (UE #1) to the UE for V2V (UE #2, UE #3, UE #4) by using an SL 5102.

FIG. 42 is a conceptual diagram of Uu-based V2V. In Uu-based V2V, communication is performed from the UE for V2V (UE #1) to the UE for V2V (UE #2, UE #3, UE #4) via an eNB 5103. The communication from the UE for V2V (UE #1) to the eNB 5103 is performed by using a UL 5104. The communication from the eNB 5103 to the UE for V2V (UE #2, UE #3, UE #4) is performed by using a DL 5105.

V2X communication including V2V is used for automated driving. It is assumed that V2X communication is used for the sake of safety measures for the purpose of avoiding collision at an intersection or between vehicles, avoiding collision with a sudden braking vehicle or an emergency braking vehicle, or avoiding collision with a pedestrian or a bicycle, for example. For this reason, V2X communication requires high reliability.

For reliability enhancement in V2V communication, PC5 CA-based packet duplication is studied in 3GPP (see Non-Patent Document 25 (R2-1708062)). PC5 CA-based packet duplication is a method in which carrier aggregation (CA) is performed in the SL, and pieces of data duplicated with the PDCP are transmitted by using different component carriers.

In PC5 CA-based packet duplication, for example, when there is an obstruction between the UE for V2V and the UE for V2V, communication quality of all of the carriers is deteriorated even though a plurality of carriers are subjected to CA. When packet duplication is performed in such a case, neither of the pieces of data transmitted by using different component carriers can be received. As described above, PC5 CA-based packet duplication presents a problem that reliability of V2V communication is deteriorated.

In the sixth embodiment, a method for solving such a problem will be disclosed.

Figure 43:
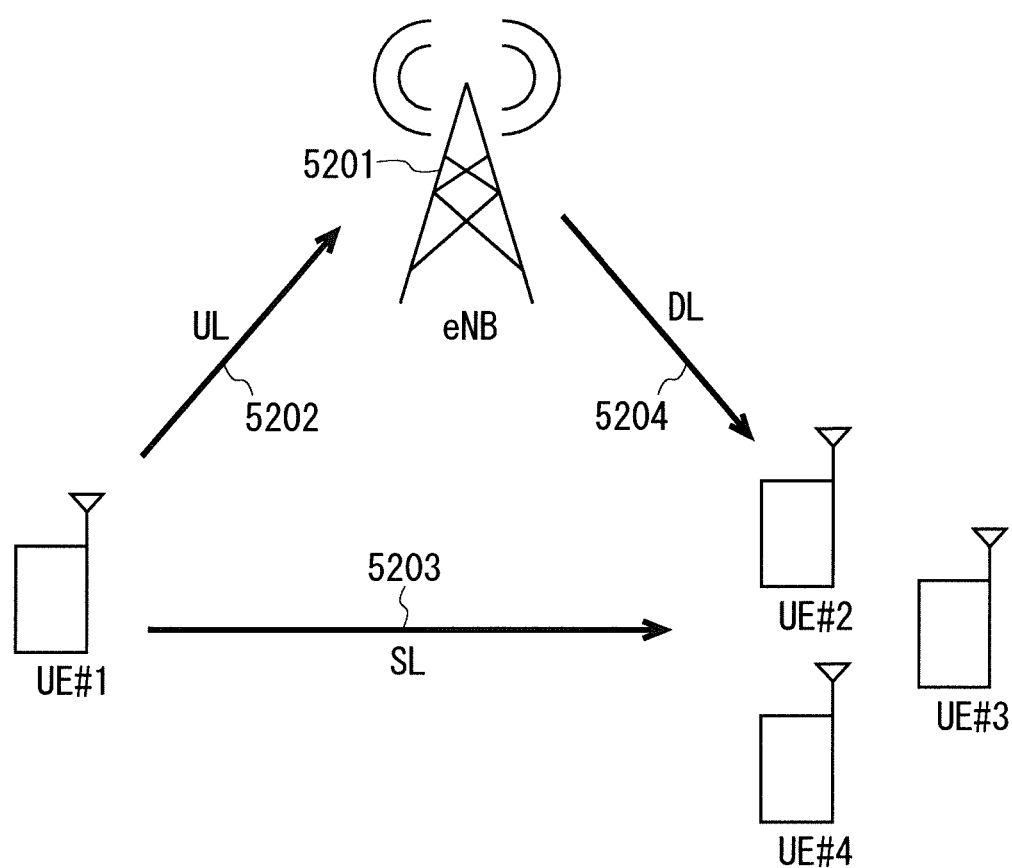
FIG. 43 is a conceptual diagram for illustrating packet duplication using PC5-based V2V and Uu-based V2V according to the sixth embodiment.

Packet duplication is performed by using PC5-based V2V communication and Uu-based V2V communication. FIG. 43 is a conceptual diagram for illustrating packet duplication using PC5-based V2V and Uu-based V2V. The UE for V2V (UE #1) performs duplication of transmission data, and directly transmits one piece of the duplicated data to the UE for V2V (UE #2, UE #3, UE #4) by using an SL 5203.

The UE for V2V (UE #1) transmits the other piece of data to the UE for V2V (UE #2, UE #3, UE #4) via an eNB 5201. The communication from the UE for V2V (UE #1) to the eNB 5201 is performed by using a UL 5202. The communication from the eNB 5201 to the UE for V2V (UE #2, UE #3, UE #4) is performed by using a DL 5204.

A detailed method for performing packet duplication using PC5-based V2V and Uu-based V2V will be disclosed. A transmitter UE for V2V communication is referred to as a UE_tx and a receiver UE as a UE_rx. A protocol stack for PC5 and a protocol stack for Uu are provided in the UE_tx.

Packet duplication is performed in a higher layer of the PDCP of the UE_tx. One piece of the duplicated data is transmitted to the UE_rx through the protocol stack for PC5. The other piece of the data is transmitted to the eNB through the protocol stack for Uu.

Figure 44:
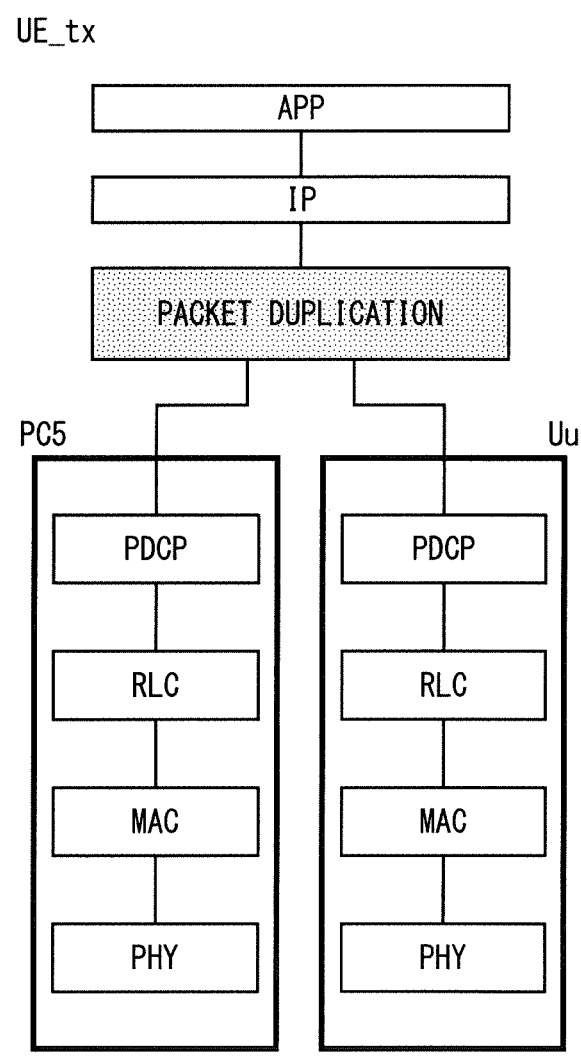
FIG. 44 is a diagram illustrating packet duplication in a UE_tx according to the sixth embodiment.

FIG. 44 is a diagram illustrating packet duplication in the UE_tx. The UE_tx includes an application layer, an IP layer, layers for PC5 (PDCP, RLC, MAC, PHY), and layers for Uu (PDCP, RLC, MAC, PHY). The packet duplication function is provided in a layer higher than the PDCP for PC5 and the PDCP for Uu. A layer for packet duplication may be provided. Alternatively, packet duplication may be performed in the IP layer. Alternatively, packet duplication may be performed in the application layer.

The UE_tx duplicates data in the packet duplication layer, transmits a piece of the data to the UE_rx through the protocol stack for PC5, and transmits the other piece of the data to the eNB through the protocol stack for Uu.

The eNB transfers the duplicated data received from the UE_tx from the receiver to the transmitter in the layer higher than the PDCP, and transmits to the UE_rx. Regarding the duplicated data received from the eNB, the UE_rx performs detection as to whether or not the data is redundant in the layer higher than the PDCP, and when the data is redundant, the UE_rx discards the redundant data.

In this manner, packet duplication is enabled by using PC5-based V2V communication and Uu-based V2V communication.

When the received data is for V2X use, the eNB terminates the received data in the eNB, and when the received data is for V2V use, the eNB transfers the received data from the receiver to the transmitter. A method enabling judgement as to whether the data received by the eNB is for V2X use or V2V use will be disclosed.

In the UE_tx, information indicating either V2V use or V2X use is provided for the data transmitted in Uu. For example, information indicating data for V2V use is provided for the data for V2V use. Alternatively, in the UE_tx, information indicating data for V2X use may be provided for the data for V2X use. Alternatively, both of these may be used.

The provision of the information indicating the V2V use or the V2X use may be performed in the layer for packet duplication. This facilitates control due to high compatibility with packet duplication. Alternatively, the information provision may be performed in the IP layer or the application layer. The information provision may be performed in a layer in which judgement as to whether the data is for V2X use or V2V use is performed.

As another method, the provision of the information indicating the V2V use or the V2X use may be performed in the PDCP of Uu. This is effective when the access stratum (AS) of the UE_tx judges the V2V use or the V2X use. For example, this is effective when packet duplication is performed in the AS of the UE_tx.

The eNB that has received the data transmitted from the UE_tx by using Uu judges whether the data is for V2X use or V2V use, by using the information indicating the V2V use or the V2X use provided in the received data. The judgement may be performed in the layer higher than the PDCP. The eNB terminates the received data in the eNB when the received data is for V2X use, and transfers the received data from the receiver to the transmitter when the received data is for V2V use. In this manner, a problem that the data received by the eNB from the UE_tx by using Uu is unknown between the V2V use and the V2X use can be avoided.

The eNB may transfer the data received from the UE_tx by using Uu from the receiver to the transmitter in the IP layer or the application layer of the eNB. For example, when the UE_tx performs packet duplication in the IP layer, the eNB may transfer the received data from the receiver to the transmitter in the IP layer of the eNB. Further, for example, when the UE_tx performs packet duplication in the application layer, the eNB may transfer the received data from the receiver to the transmitter in the application layer of the eNB.

When the eNB transfers the data from the receiver to the transmitter in the IP layer or the application layer, the SN of the IP packet data is changed at the time when the data is transferred from the receiver to the transmitter. When the SN is changed, the UE_rx cannot detect redundancy of the duplicated data, regarding the data for V2V use received from the eNB. A method for solving such a problem will be disclosed.

The UE_tx provides the SN dedicated to data for V2V transmission to the data for V2V transmission. The UE_tx provides the SN dedicated to data for V2V transmission separately from the SN provided for usual IP packet data. The UE_tx provides the SN dedicated to data for V2V transmission for the data for V2V transmission in the IP layer or the application layer, provides the SN for IP packet data for the data provided with the SN dedicated to data for V2V transmission, and transmits the data provided with the SN dedicated to data for V2V transmission and the SN for IP packet data.

When the eNB receives the data for V2V use from the UE_tx, the eNB transfers the data provided with the SN dedicated to data for V2V transmission from the receiver to the transmitter in the IP layer or the application layer. The UE_rx recognizes the SN in the IP layer or the application layer, based on the data provided with the SN dedicated to data for V2V transmission that is received from the eNB.

Further, the UE_rx recognizes the SN dedicated to data for V2V transmission provided for the data for V2V use transmitted by using the SL from the UE_tx. The UE_rx detects redundancy of the data for V2V use by using the SN dedicated to data for V2V transmission provided for the data for V2V use received from the eNB and the SN dedicated to data for V2V transmission provided for the data for V2V use received from the UE_tx. Redundant data is discarded.

In this manner, even when the SN of the IP packet data is changed when the data for V2V use is transferred from the receiver to the transmitter in the eNB, the UE_rx can detect redundancy of the data for V2V use transmitted from the UE_tx.

FIG. 45 is a diagram illustrating an example of packet duplication using PC5-based V2V communication and Uu-based V2V communication. FIG. 45 discloses an example in which the packet duplication layer (which may be a protocol) having the packet duplication function is provided in the layer higher than the PDCP of the UE_tx. The UE_tx provides information indicating the V2V use or the V2X use for the data for V2V use in the packet duplication layer, and performs packet duplication.

A piece of the duplicated packet data is input to the PDCP of PC5, processed in the RLC, the MAC, and the PHY, and is transmitted to the UE_rx. The other piece of the duplicated packet data is input to the PDCP of Uu, processed in the RLC, the MAC, and the PHY, and is transmitted to the eNB.

After performing packet duplication in the packet duplication layer, information indicating the V2V use or the V2X use may be provided for the data transmitted in the Uu. This enables judgement as to whether the data is for V2V use or V2X use in the eNB. Further, this eliminates the necessity of provision of the information indicating the V2V use or the V2X use for the data transmitted in PC5, and thus overhead of the data can be reduced.

The eNB receives the data for V2V use transmitted from the UE_tx, and performs processing of the PHY, the MAC, the RLC, and the PDCP of the receiver on the received data. The eNB performs detection of duplicated packets and transfer from the receiver to the transmitter on the data output from the PDCP of the receiver. The detection processing and the transfer processing for the duplicated packets are performed in the layer higher than the PDCP. Here, a layer (which may be a protocol) for the detection and transfer processing for the duplicated packets is provided.

The eNB judges whether the data is for V2V use or V2X use, by using the information indicating the V2V use or the V2X use provided for the data output from the PDCP. When the received data is for V2X use, the eNB transfers the data to the core network, and processing of the IP layer and the application layer is performed in the core network, thereby obtaining data for V2X use. When the received data is for V2V use, the eNB transfers the data from the receiver to the transmitter.

At the time of transfer to the transmitter, the information indicating the V2V use or the V2X use may remain being provided. Alternatively, the information may be removed. When the information is removed, overhead of the data from the eNB to the UE_rx can be reduced.

The data for V2V use transferred from the receiver to the transmitter in the eNB is input to the PDCP of the transmitter, processed in the RLC, the MAC, and the PHY, and is transmitted to the UE_rx. The UE_rx receives the data for V2V use transmitted from the eNB, and performs processing of the PHY, the MAC, the RLC, and the PDCP on the received data.

On the other hand, the UE_rx receives the data for V2V use transmitted from the UE_tx, and performs processing of the PHY, the MAC, the RLC, and the PDCP on the received data.

The UE_rx performs detection and discard of the redundant data for these pieces of data output from the PDCP. The detection processing and the discard processing for the redundant data are performed in the layer higher than the PDCP. Here, a layer (which may be a protocol) for detection and discard processing for the redundant data is provided.

The UE_rx may perform detection of the duplicated data by using the SN provided in the IP layer. When the UE_rx receives pieces of data of the same SN, the UE_rx discards the data received the latest. A period for detecting whether pieces of data of the same SN have been received may be provided. Whether the pieces of data of the same SN have been received is detected within a predetermined period from the first reception. The predetermined period may be notified from the eNB to the UE_rx in advance, or may be determined in a specification or the like in advance. In this manner, the data received first need not be maintained indefinitely. Buffer capacity for maintaining the data can be reduced.

The detection processing and the discard processing for the redundant data in the UE_rx may be performed in the IP layer or the application layer. When the SN is provided for the IP packet data in the IP layer, processing is facilitated if the detection processing and the discard processing are performed in the IP layer.

Although the duplicated data detection and transfer function is provided in the eNB, the duplicated data detection and transfer function may be provided in the core network. When the duplicated data detection and transfer function is provided in the eNB, transfer time from the receiver to the transmitter can be reduced. Delay time of Uu-based V2V communication can be reduced. In NR, separating the base station gNB into a central unit (CU) and a distributed unit (DU) is supported. The duplicated data detection and transfer function may be provided in the CU. Similar effects can be obtained.

PC5 resource pool configuration and Uu bearer configuration may be performed for packet duplication. These configurations may be performed before the packet duplication start in advance. Using the packet duplication configuration as a trigger, the PC5 resource pool configuration and the Uu bearer configuration may be performed. The configurations may be performed by using a QoS (QCI) of a data service for performing packet duplication.

Figure 46:
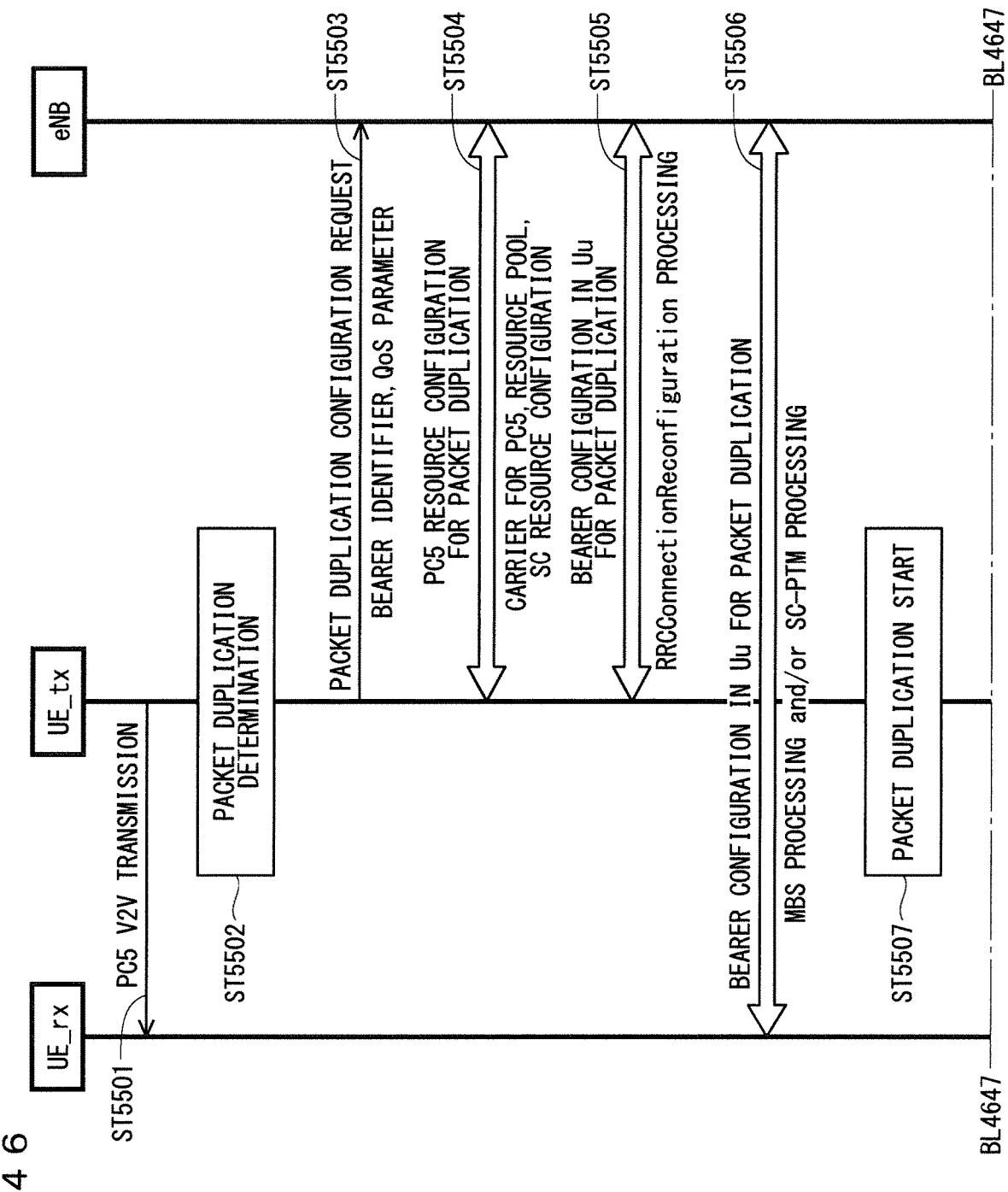
FIG. 46 is a diagram illustrating an example of a sequence for bearer configuration for packet duplication according to the sixth embodiment.
Figure 47:
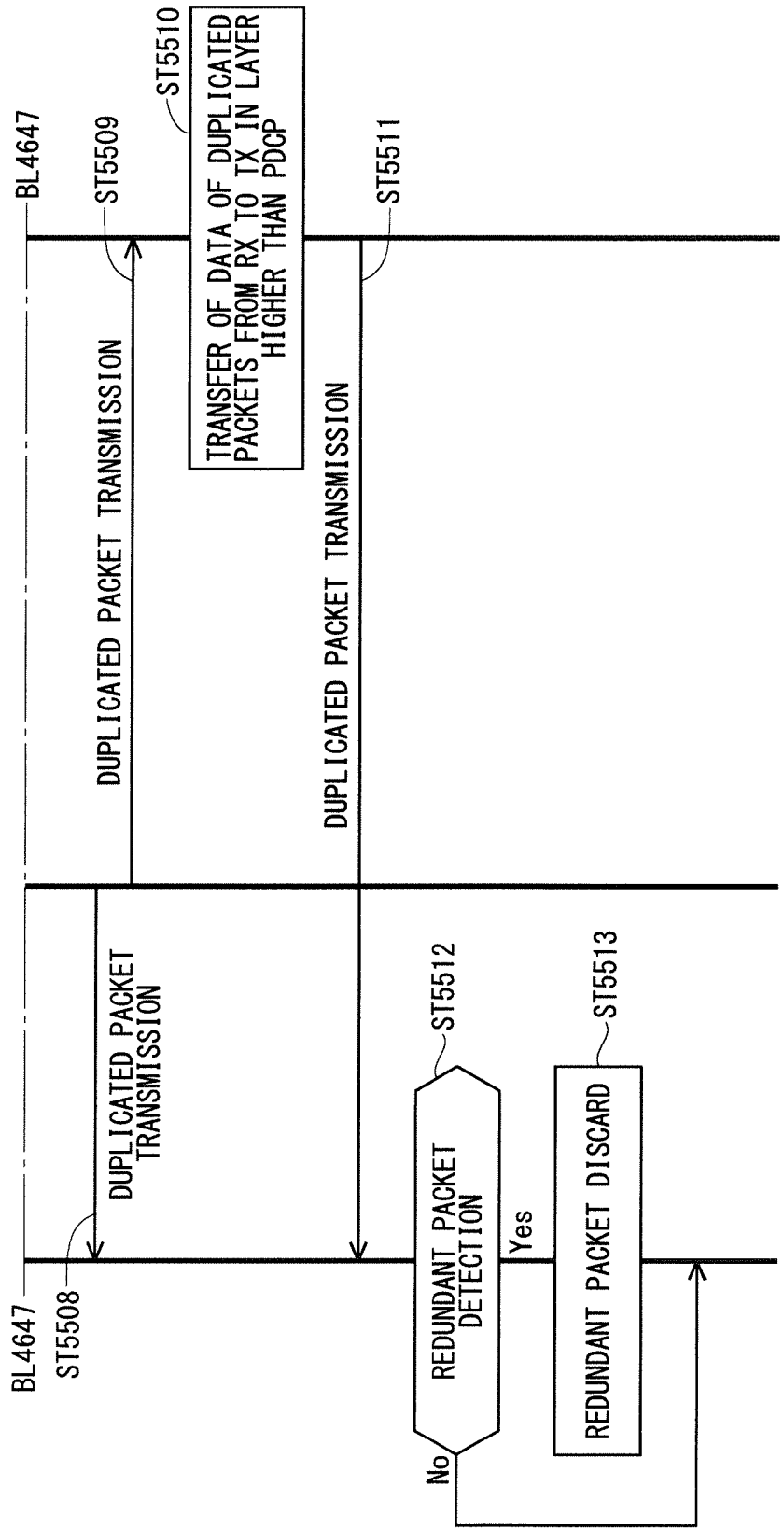
FIG. 47 is a diagram illustrating an example of a sequence for bearer configuration for packet duplication according to the sixth embodiment.

FIG. 46 and FIG. 47 are each a diagram illustrating an example of a sequence for bearer configuration for packet duplication. FIG. 46 and FIG. 47 are connected at the position of the boundary line BL4647. In Step ST5502, the UE_tx determines whether or not packet duplication is performed. Before packet duplication is determined, V2V communication may or may not be performed. Here, in Step ST5501, V2V communication in PC5 is performed between the UE_tx and the UE_rx.

The determination of performing packet duplication may be, for example, performed when the QoS of communication data does not satisfy a predetermined value or when the QoS required in communication data is equal to or greater than a predetermined value.

An indicator of QoS may be, for example, an indicator indicating reliability. The indicator indicating reliability may be, for example, a reception error rate. The indicator of QoS may be, for example, an indicator indicating delay characteristics. The indicator indicating delay characteristics may be, for example, delay time. The indicator of QoS may be, for example, an indicator indicating communication speed. The indicator of QoS may be, for example, an indicator indicating a bit rate.

In this manner, when desired QoS cannot be achieved only in V2V communication of PC5, packet duplication can be determined. The desired QoS can be achieved owing to packet duplication.

Further, the UE_tx may determine whether or not packet duplication is to be performed, by using a load amount of resources used for SL communication. As the load amount of resources used for SL communication, a usage amount, a degree of margin, priority with SL communication of other UEs, or the like may be used. When the load amount is low, it may be determined that Uu-based packet duplication is to be performed, considering that resources sufficient for communication cannot be secured. The UE_tx may measure the load amount of resources used for SL communication in advance.

The UE_tx that has determined to execute packet duplication in Step ST5502 notifies the eNB of a packet duplication configuration request in Step ST5503. In the request, information such as an identifier of a bearer, a QoS indicator, and a load amount of SL resources may be included. In the request, information indicating the packet duplication use may be included. The QoS indicator may be information as described above. The request may be notified by using RRC signaling, or may be notified by using MAC signaling. Alternatively, the request may be included in UCI so as to be notified by using the PUCCH.

In Step ST5504, PC5 resource configuration for packet duplication of V2V communication data is performed between the eNB and the UE_tx. For example, the eNB notifies the UE of carrier frequency for PC5, a resource pool, PSCCH resource configuration, for example, resource allocation information. These pieces of information may be notified by using RRC signaling, or may be notified by using MAC signaling. Alternatively, these pieces of information may be included in DCI so as to be notified by using the PDCCH. When RRC signaling is used, RRCConnectionReconfiguration being an existing RRC message may be used. This eliminates the necessity of providing a new message, and can thus facilitate control.

In Step ST5505, bearer configuration in Uu for packet duplication of V2V communication data is performed between the eNB and the UE_tx. The eNB performs, for the UE, configuration of the communication in Uu. For example, configuration of frequency for the UL and the like may be performed. The configuration may be notified by using RRC signaling, or may be notified by using MAC signaling. Alternatively, the configuration may be included in DCI so as to be notified by using the PDCCH. When RRC signaling is used, RRCConnectionReconfiguration being an existing RRC message may be used. This eliminates the necessity of providing a new message, and can thus facilitate control.

In Step ST5506, bearer configuration in Uu for packet duplication of V2V communication data is performed between the eNB and the UE_rx. The eNB performs, for the UE, configuration of the communication in Uu. For example, configuration of MBMS communication and SC-PTM communication may be performed for the DL. The configuration may be notified by using RRC signaling, or may be notified by using MAC signaling. Alternatively, the configuration may be included in DCI so as to be notified by using the PDCCH.

When configuration of MBMS communication and SC-PTM communication is performed, the eNB may perform bearer configuration for MBMS communication and SC-PTM communication with the core network.

The UE_tx that has performed the PC5 resource configuration for packet duplication and the bearer configuration in Uu of V2V communication data starts packet duplication in Step ST5507. The UE_tx performs duplication of data in the packet duplication layer, transmits a piece of the duplicated data to the UE_rx by using PC5 in Step ST5508, and transmits the other piece of the duplicated data to the eNB by using Uu in Step ST5509.

In Step ST5510, the eNB detects whether or not the data received from the UE_tx is data for V2V communication, by using information indicating the V2V use or the V2X use in a duplicated packet detection and transfer layer. When the data is the data for V2V communication, the eNB transfers the data from the receiver to the transmitter. In Step ST5511, the eNB transmits the transferred duplicated data to the UE_rx.

The communication of Steps ST5508, ST5509, and ST5511 may be performed by using the configuration of Steps ST5504, ST5505, and ST5506.

In Step ST5512, the UE_rx detects whether or not the data received from the eNB and the data received from the UE_tx are redundant in the layer for detection and discard processing for the redundant data, by using the SN provided in the IP layer. When those pieces of data are redundant, in Step ST5513, the data received the latest is discarded. The data received first and non-redundant data are transmitted to the IP layer and the application layer.

In this manner, the UE_rx becomes capable of receiving data for V2V communication that has been subjected to packet duplication in the UE_tx.

The UE_tx may determine whether or not packet duplication is to be ended. For example, whether or not packet duplication is to be ended may be judged by using QoS of communication data and a load amount of resources used for SL communication. For example, when the QoS of communication data satisfies a predetermined value, it may be determined that packet duplication is to be ended. Further, for example, when the load amount of resources used for SL communication falls below a predetermined value, it may be determined that packet duplication is to be ended.

In this manner, when packet duplication is not required, packet duplication can be ended. Packet duplication requires resources of both of PC5 and Uu. When the packet duplication can be ended, unnecessary use of resources can be reduced.

A bearer for V2V communication may be separately provided. Packet duplication may be performed by using the bearer for V2V communication. Further, when the bearer for packet duplication of V2V communication data is separately provided, a channel and/or a channel group to be used for packet duplication may be arranged to be different from a channel and/or a channel group to be used for other communication. A channel and/or channel group dedicated to packet duplication may be configured. This allows processing according to QoS to be performed.

Configured PC5 resource configuration and Uu bearer configuration may be used for packet duplication of V2V communication data. Steps ST5504, ST5505, and ST5506 can be omitted. In this manner, time required for PC5 resource configuration processing and Uu bearer configuration processing can be reduced. Delay time from determining packet duplication to performing packet duplication can be reduced.

A part of configured PC5 resource configuration and configured Uu bearer configuration may be used for packet duplication of V2V communication data. For example, for the Uu configuration from the eNB to the UE_rx, resource configuration for an existing MBMS bearer or SC-PTM bearer is used. Configurations other than the configuration are newly configured. For the Uu configuration from the eNB to the UE_rx, resource configuration for MBMS or for SC-PTM is used, and thus requires bearer configuration with the core network. For this reason, much time is required for the configuration. By reducing the time, delay time from determining packet duplication to performing packet duplication can be reduced.

In the method disclosed in the description above, the UE_tx judges whether or not packet duplication is to be performed. As another method, the eNB may judge whether or not packet duplication is to be performed. The eNB that has determined to execute packet duplication notifies the UE_tx of execution (activation) of packet duplication. Information indicating packet duplication of which bearer is to be activated may be included in the activation of packet duplication. As the information, for example, an identifier of the bearer may be used.

For the notification, RRC signaling may be used. A large amount of information can be notified. The notification may be performed by using MAC signaling or the PDCCH. This enables dynamic notification. When MAC signaling is used, malfunction can be reduced.

The UE_tx that has received activation of packet duplication from the eNB performs packet duplication. The UE_tx that has completed the packet duplication configuration may report configuration complete to the eNB. The report may be notified by using RRC signaling, or MAC signaling, or the PUCCH.

In the method disclosed in the above, the UE_tx judges whether or not packet duplication is to be ended. As another method, the eNB may judge whether or not packet duplication is to be ended. The eNB that has determined the end of packet duplication notifies the UE_tx of the end (deactivation) of packet duplication. Information indicating packet duplication of which bearer is to be deactivated may be included in the deactivation of packet duplication. As the information, for example, an identifier of the bearer may be used.

For the notification, RRC signaling may be used. A large amount of information can be notified. The notification may be performed by using MAC signaling or the PDCCH. This enables dynamic notification. When MAC signaling is used, malfunction can be reduced.

The eNB may notify the UE_tx of the packet duplication configuration and reset by using RRC signaling, and notify the UE_tx of the packet duplication activation and deactivation by using MAC signaling or the PDCCH. With the configuration being performed in advance, the activation and deactivation using the configuration can be dynamically performed.

The UE_tx may notify the eNB of a packet duplication execution request. When the eNB receives the request, the eNB judges whether or not packet duplication is to be executed. When the eNB determines execution, the eNB notifies the UE_tx of activation of packet duplication. When the eNB determines no execution, the eNB notifies the UE_tx of a reject message. The reason for no execution may be included in the reject message. Examples of the reason include resource deficiency between Uus or the like.

In a similar manner, the UE_tx may notify the eNB of a packet duplication execution end request. When the eNB receives the request, the eNB judges whether or not packet duplication is to be ended. When the eNB determines end, the eNB notifies the UE_tx of deactivation of packet duplication. When the eNB determines no end, the eNB notifies the UE_tx of a reject message. The reason for no end may be included in the reject message. Examples of the reason include sufficiency of resources between Uus or the like. When packet duplication is continued, low delay characteristics can be obtained, and thus further enhancement of throughput can be achieved.

Information such as an identifier of a bearer, a QoS indicator, and a load amount of SL resources requiring packet duplication execution may be included in the packet duplication execution request notified from the UE_tx to the eNB, so as to be notified. The QoS and the load amount of SL resources measured by the UE_tx may be notified. The eNB may judge whether or not packet duplication is to be executed by using these pieces of information.

Further, the eNB may judge whether or not packet duplication is to be executed by using information related to the eNB or information related to Uu resources. Examples of the information related to the eNB include processing capability, a CPU usage amount, and a buffer usage amount of the eNB, for example. Examples of the information related to Uu resources include a usage amount of UL resources and a subframe usage amount in the MBSFN of the DL, for example. In this manner, by using information in the eNB, judgement can be made in consideration of a state of the eNB, a radio wave propagation environment in Uu, and a load amount.

For the packet duplication execution request notified from the UE_tx to the eNB, the packet duplication configuration request (Step ST5503) disclosed in FIG. 46 and FIG. 47 may be used. In the configuration request, information indicating the packet duplication execution request may be included. Further, for the packet duplication activation notified from the eNB to the UE_tx, the PC5 resource configuration for packet duplication (Step ST5504) or the bearer configuration in Uu for packet duplication (Step ST5505) disclosed in FIG. 46 and FIG. 47 may be used Information indicating packet duplication activation may be included in the PC5 resource configuration for packet duplication or the bearer configuration in Uu for packet duplication.

The eNB may also notify the UE_rx of the packet duplication activation and deactivation. The bearer configuration in Uu for packet duplication (Step ST5506) disclosed in FIG. 46 and FIG. 47 may be used.

By adopting the method disclosed in the sixth embodiment, packet duplication can be performed by using PC5-based V2V communication and Uu-based V2V communication. Unlike CA-based packet duplication, packet duplication can be performed by using another node, for example, the eNB. Thus, for example, even when SL communication quality between V2Vs is deteriorated regardless of carrier frequency such as when an obstruction is present between V2Vs, packet duplication using another node can be performed. Therefore, high reliability required in V2V communication can be achieved.

Further, in CA-based packet duplication, packet duplication cannot be applied to the terminal not supporting CA. However, by adopting the method disclosed in the sixth embodiment, the terminal not supporting CA is also enabled to execute packet duplication. Therefore, high reliability required in V2V communication can be achieved.

Further, in V2V communication of only PC5, when SL communication quality is deteriorated, retransmission of packet data is caused, and delay time may thus be increased. By adopting the method disclosed in the sixth embodiment, even when a delay is caused in PC5-based V2V communication, communication of packet data can be performed by using Uu-based V2V communication, and thus delay time of communication can be reduced.

In a base station (gNB) in NR and a base station in LTE connected to a 5G core network and further in a UE connected to the base stations, the SDAP is configured in a layer higher than the PDCP. When the SDAP is configured, packet duplication may be performed in a layer higher than the SDAP or the SDAP. Packet duplication in a PDU session is performed. Also in such a case, the method of providing the information indicating the V2V use or the V2X use disclosed in the sixth embodiment may be used.

In the base station (gNB) in NR and the base station in LTE connected to a 5G core network, data for V2V communication from the UE_tx is detected and can be transferred to the UE_rx. These functions may be performed in a layer higher than the SDAP or the SDAP. Further, in the UE_rx, detection and discard of redundant packets may be performed in the layer higher than the SDAP or the SDAP.

In this manner, V2V communication in the base station (gNB) in NR and the base station in LTE connected to a 5G core network and further in the UE connected to the base stations is enabled, and packet duplication using PC5-based V2V communication and Uu-based V2V communication is enabled.

The description above discloses that the UE_tx notifies the eNB of the packet duplication configuration request. When the UE_tx is connected to the base station (gNB) in NR and the base station in LTE connected to a 5G core network, the UE_tx may notify the base stations of a PDU session identifier and a QoS flow identifier.

Further, the description above discloses that the eNB may notify the UE_tx of activation and deactivation of packet duplication. The UE_tx may include the PDU session identifier and the QoS flow identifier in the activation and deactivation packet duplication notified to the UE_tx from the base station (gNB) in NR and the base station in LTE connected to a 5G core network.

In this manner, also when packet duplication is performed for a PDU session or a QoS flow, the PDU session or the QoS flow for performing the packet duplication can be identified.

First Modification of Sixth Embodiment

Another method for solving the problem as described in the sixth embodiment will be disclosed. Packet duplication is performed in the PDCP layer of the UE_tx. Packet duplication may be performed in the PDCP layer for PC5. The packet duplication function is provided in the PDCP layer of the UE_tx. The packet duplication function is provided in the PDCP layer for PC5.

Figure 48:
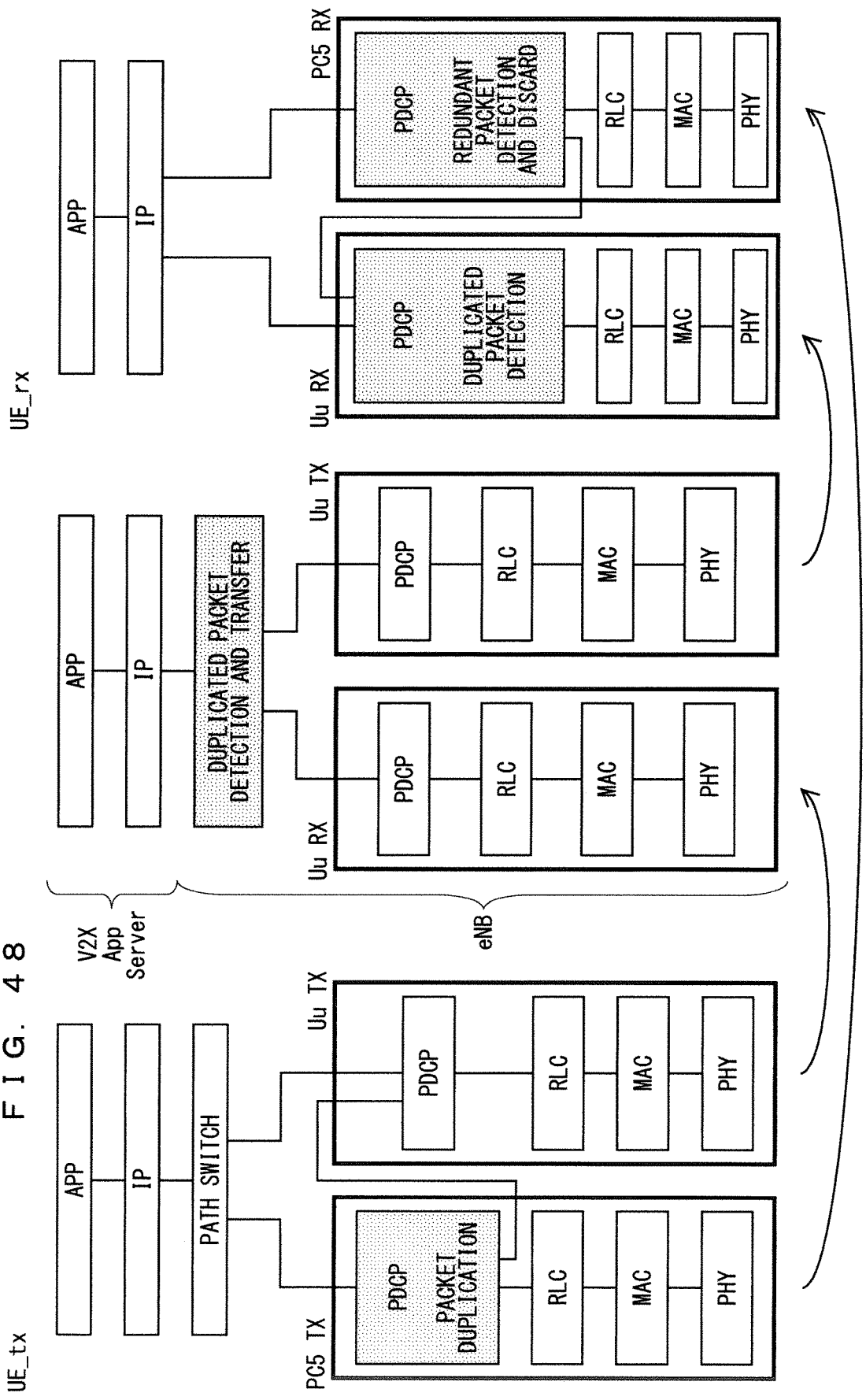
FIG. 48 is a diagram illustrating an example of packet duplication using PC5-based V2V communication and Uu-based V2V communication according to the first modification of the sixth embodiment.

FIG. 48 is a diagram illustrating an example of packet duplication using PC5-based V2V communication and Uu-based V2V communication. FIG. 48 discloses a case in which the packet duplication function is provided in the PDCP layer of the UE_tx.

Packet duplication is performed in the PDCP for PC5 of the UE_tx. A piece of duplicated data is transmitted to the UE_rx through the protocol stack for PC5. The other piece of the data is input to the PDCP layer of Uu, and is transmitted to the eNB through the protocol stack for Uu. When the duplicated data is input to the PDCP of Uu, the data may be input to the PDCP for Uu as the PDCP SDU.

The eNB transfers the duplicated data received from the UE_tx from the receiver to the transmitter in the PDCP layer or the layer higher than the PDCP, and transmits to the UE_rx. The UE_rx detects the duplicated data received from the eNB in the PDCP layer of Uu or the layer higher than the PDCP, and transfers to the PDCP layer of PC5. The UE_rx performs detection as to whether or not the data is redundant in the PDCP of PC5, and when the data is redundant, the UE_rx discards the redundant data.

In this manner, packet duplication is enabled by using PC5-based V2V communication and Uu-based V2V communication.

The eNB terminates the received data in the eNB when the received data is for V2X use, and transfers the received data from the receiver to the transmitter when the received data is for V2V use. A method enabling judgement as to whether the data received by the eNB is for V2X use or V2V use will be disclosed.

In the PDCP of PC5 of the UE_tx, information indicating the data for V2V transmission is provided. A sequence number (SN) of the PDCP of PC5 may be provided as in the conventional method. Concealment processing may be performed in the PDCP of PC5 as in the conventional method.

After performing the provision processing and the concealment processing of the SN, packet duplication may be performed. The provision of information indicating the data for V2V transmission may be performed after performing packet duplication in the PDCP of PC5. The information provision may be performed only for data to be input to the PDCP layer of Uu. The data communicated in PC5 has a data format the same as that of the conventional data format, and thus control can be facilitated. The data provided with the information indicating the data for V2V transmission is input to the PDCP layer of Uu as the PDCP SDU.

The eNB that has received the data transmitted from the UE_tx by using Uu judges whether the data is for V2X use or V2V use, by using information indicating the data for V2V transmission provided for the received data. The judgement may be performed in the PDCP layer or the layer higher than the PDCP. The eNB terminates the received data in the eNB when the received data is for V2X use, and transfers the received data from the receiver to the transmitter when the received data is for V2V use. In this manner, a problem that the data received by the eNB from the UE_tx by using Uu is unknown between the V2V use and the V2X use can be avoided.

When the eNB recognizes concealment information, for example, a concealment key or the like, that is used for PC5 communication of the UE_tx, processing for providing the information indicating the data for V2V transmission in the UE_tx may be performed before the concealment processing is performed. The eNB releases the data transmitted from the UE_tx by using Uu by using the concealment information used for PC5 communication, and judges whether the data is for V2X use or V2V use by using the information indicating the data for V2V transmission provided for the data. The judgement may be performed in the layer higher than the PDCP. By separating functions of the PDCP of Uu of the receiver of the eNB, concealment release processing need not be performed a plurality of times in the PDCP. Therefore, malfunction in the PDCP can be reduced.

The eNB may notify the UE_tx of the concealment information used by the UE_tx for PC5 communication in advance. The eNB may include the concealment information in the PC5 resource configuration so as to be notified. Alternatively, when the UE_tx autonomously determines the concealment information used for PC5 communication, the UE_tx may notify the eNB of the concealment information used for PC5 communication in advance.

In this manner, a problem that the data received by the eNB from the UE_tx by using Uu is unknown between the V2V use and the V2X use can be avoided.

Regarding the data received from the eNB, the UE_rx judges whether or not the data is data subjected to packet duplication, by using the information indicating the data for V2V transmission provided for the received data. The judgement may be performed in the PDCP layer of Uu. Alternatively, the judgement may be performed in the layer higher than the PDCP. After completion of the processing of the PDCP of Uu between the eNB and the UE_rx, the judgement may be performed by using the information indicating the data for V2V transmission provided for the received data.

When the UE_rx judges that the data received from the eNB is data subjected to packet duplication, the UE_rx inputs the data that has been subjected to processing in the PDCP of Uu to the PDCP layer of PC5. The PDCP of PC5 releases the concealment processing performed in the PDCP of the UE_tx, and detects redundancy between the data for V2V transmission transmitted from the eNB and the data for V2V transmission transmitted in PC5 from the UE_tx by using the SN of the PDCP. Redundant data is discarded. Non-redundant data is transmitted to a higher layer.

FIG. 49 and FIG. 50 are a diagram illustrating an example of a sequence for bearer configuration for packet duplication according to the first modification of the sixth embodiment. FIG. 49 and FIG. 50 are connected at the position of the boundary line BL4950. In FIG. 49 and FIG. 50, configured PC5 resource configuration and Uu bearer configuration are used for packet duplication. As the Uu bearer configuration, an existing bearer configuration for V2X may be used.

In Step ST5701, V2V communication in PC5 is performed between the UE_tx and the UE_rx. In Step ST5702, V2X communication in Uu is performed between the UE_tx and the eNB. In Step ST5713, V2X communication in Uu is performed between the eNB and the UE_rx.

In Step ST5703, the UE_tx determines whether or not packet duplication is performed. As a determination method of packet duplication, the method disclosed in the sixth embodiment may be applied. The eNB may determine whether or not packet duplication is to be executed. The method disclosed in the sixth embodiment may be applied. The UE_tx that has determined to execute packet duplication in Step ST5703 starts packet duplication in Step ST5704. The UE_tx performs duplication of data in the PDCP layer of PC5, and provides information indicating the data for transmission for V2V. The information may be provided only for the data transmitted to the eNB by using Uu. In Step ST5705, a piece of duplicated data is transmitted to the UE_rx by using PC5, and in Step ST5706, the other piece of the duplicated data is transmitted to the eNB by using Uu.

In Step ST5707, the eNB performs duplicated packet detection and transfer for the data received from the UE_tx in the PDCP layer or a layer higher than the PDCP. The eNB detects whether or not the data received from the UE_tx is data for V2V communication by using the information indicating the data for transmission for V2V, and when the data is the data for V2V communication, the eNB transfers the data from the receiver to the transmitter. In Step ST5708, the eNB transmits the transferred duplicated data to the UE_rx.

The communication of Steps ST5705, ST5706, and ST5708 may be performed by using the PC5 resource configuration and the Uu bearer configuration used in Steps ST5701, ST5702, and ST5713.

In Step ST5709, the UE_rx performs detection of duplicated packet. The detection is performed in the PDCP layer or a layer higher than the PDCP. The UE_rx detects whether or not the data received from the eNB is duplicated data by using the information indicating the data for transmission for V2V, and when the data is duplicated data, the UE_rx transfers the data to the PDCP layer of PC5 in Step ST5710. When the UE_rx judges that the data is not duplicated data in Step ST5709, the UE_rx transmits the data to the IP layer and the application layer.

The UE_rx performs the detection and discard processing for the redundant data in the PDCP of PC5. In Step ST5711, the UE_rx detects whether or not the data transferred from Uu and the data received from the UE_tx are redundant, by using the SN provided in the PDCP layer of the UE_tx. When those pieces of data are redundant, in Step ST5712, the data received the latest is discarded. The data received first and non-redundant data are transmitted to the IP layer and the application layer.

In this manner, the UE_rx becomes capable of receiving the data for V2V communication subjected to packet duplication in the UE_tx.

The UE_tx may determine whether or not packet duplication is to be ended. As a determination method, the method disclosed in the sixth embodiment may be applied. The eNB may determine whether or not packet duplication is to be ended. The method disclosed in the sixth embodiment may be applied.

By adopting the method as disclosed in the first modification of the sixth embodiment, effects similar to those described in the sixth embodiment can be obtained. Further, packet duplication is performed in the PDCP, and thus judgement as to whether or not data is the data for V2V communication can be performed in the RAN, for example, the eNB. Further, packet duplication is performed in the PDCP, and thus duplicated data detection processing and redundant data detection processing and discard processing can be performed in the PDCP of the UE_rx.

Further, in the judgement as to whether or not the data is data for V2V communication in the base station, processing in the application layer and the IP layer is not required. Thus, in the base station, detection and transfer of the data for V2V communication can be performed at an early stage. Delay time in Uu-based V2V communication can be reduced. Therefore, packet duplication using PC5-based V2V communication and Uu-based V2V communication can be performed with a low delay, and enhancement of reliability and enhancement of throughput can be achieved.

Further, determination of packet duplication can be judged in the AS of the UE_tx, and thus a higher layer need not be involved. An indicator for the UE_tx to judge determination of packet duplication is in many cases acquired by the AS of the UE_tx. Therefore, packet duplication determination in the UE_tx can be judged at an early stage. The change of the radio wave propagation environment of the SL over the course of time can be promptly handled.

Further, in the method as disclosed in the first modification of the sixth embodiment, packet duplication is performed in the PDCP. Thus, the method as disclosed in the first modification of the sixth embodiment may also be applied to packet duplication using V2V communication via the base station (gNB) in NR and the base station in LTE connected to a 5G core network. Effects similar to the above can be obtained.

Second Modification of Sixth Embodiment

Another method for solving the problem as described in the sixth embodiment will be disclosed. Packet duplication is performed in the PDCP layer of PC5 of the UE_tx, and duplicated data is split between PC5 and Uu. A split bearer may be provided between PC5 and Uu.

Figure 51:
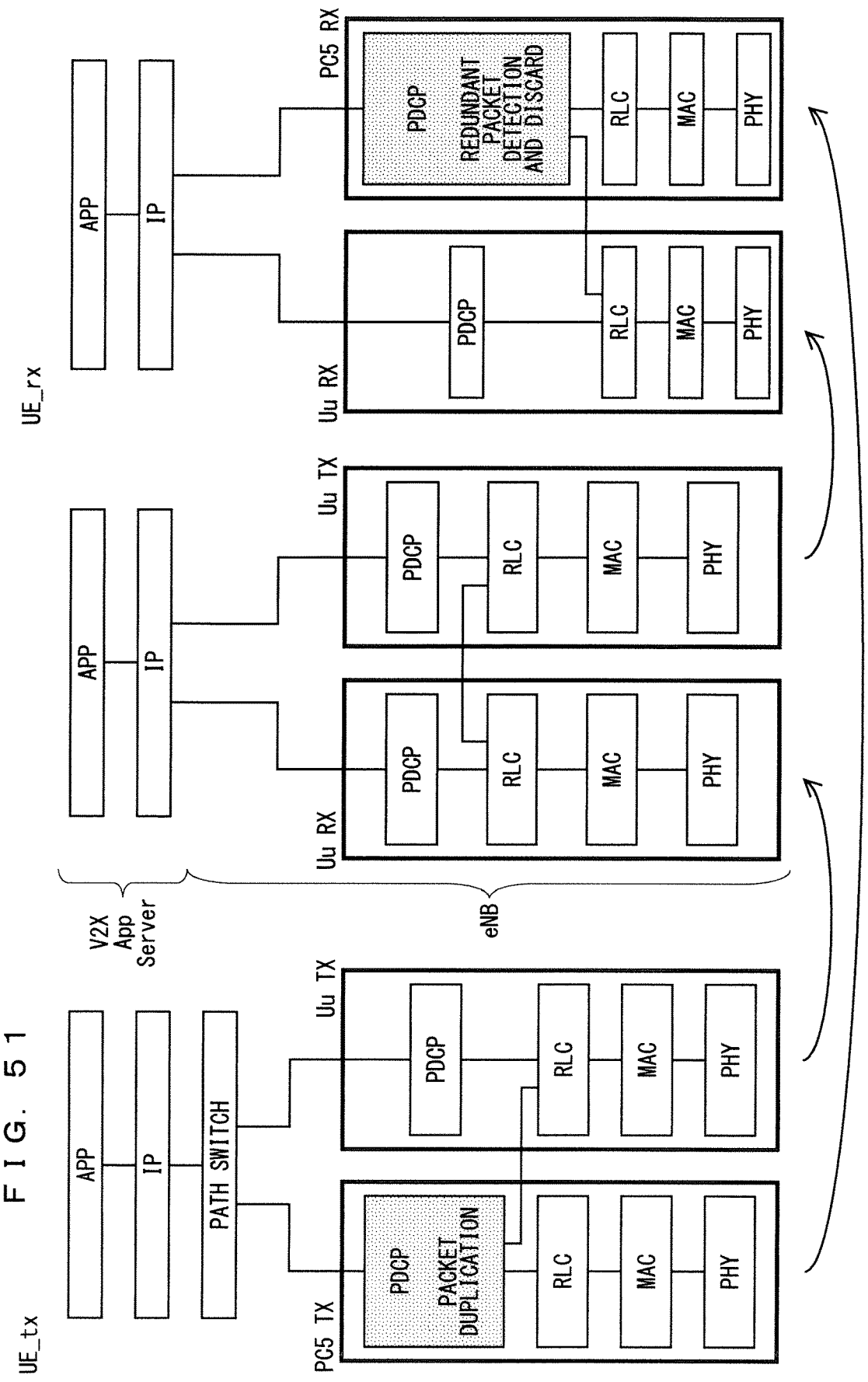
FIG. 51 is a diagram illustrating an example of packet duplication using PC5-based V2V communication and Uu-based V2V communication according to the second modification of the sixth embodiment.

FIG. 51 is a diagram illustrating an example of packet duplication using PC5-based V2V communication and Uu-based V2V communication. FIG. 51 discloses a case in which the packet duplication function is provided in the PDCP layer of PC5 of the UE_tx and is split between PC5 and Uu.

Packet duplication is performed in the PDCP for PC5 of the UE_tx, and duplicated data is split. A piece of split data is transmitted to the UE_rx through the protocol stack for PC5. The other piece of the split data is input to the RLC layer of Uu, and is transmitted to the eNB through the protocol stack for Uu. When the split duplicated data is input to the RLC of Uu, the data may be input to the RLC for Uu as the RLC SDU.

The eNB transfers duplicated data received from the UE_tx from the receiver to the transmitter in the RLC layer, and transmits to the UE_rx. The UE_rx detects the duplicated data received from the eNB in the RLC layer of Uu, and transfers to the PDCP layer of PC5. The UE_rx performs detection as to whether or not the data is redundant in the PDCP of PC5, and when the data is redundant, the UE_rx discards the redundant data.

In this manner, packet duplication is enabled by using PC5-based V2V communication and Uu-based V2V communication.

When the data received from the UE_tx is for V2X use, the eNB terminates the received data in the eNB, and when the receive data is for V2V use, the eNB transfers the received data from the receiver to the transmitter in the RLC layer. A method enabling judgement as to whether the data received by the eNB is for V2X use or V2V use will be disclosed.

A split bearer is provided between PC5 and Uu. Provided is a split bearer for performing in parallel first communication, which is directly connected from PC5 of the UE_tx to PC5 of the UE_rx, and second communication, which is connected from PC5 of the UE_tx to PC5 of the UE_rx via Uu of the UE_tx, RX and TX of Uu of the eNB, and Uu of the UE_rx. The split bearer is provided, and a channel and/or a channel group used for communication using the split bearer is arranged to be different from a channel and/or a channel group used for other communication. A channel and/or a channel group dedicated to communication using the split bearer may be configured.

In the split bearer, the SN provision and concealment processing may be performed as in the conventional method in the PDCP of PC5 of the UE_tx. Packet duplication may be performed after performing the SN provision and concealment processing as in the conventional method in the PDCP of PC5 of the UE_tx, and the data subjected to the packet duplication may be split so as to be input to the RLC of PC5 and the RLC of Uu.

In this manner, the split bearer is provided, and communication using the split bearer is separated from other communication. With this, whether or not the data received by the eNB is for V2V use can be judged in the RLC layer of the receiver of Uu of the eNB.

The eNB transmits, to the UE_rx, the data for V2V use transferred from the receiver to the transmitter in the RLC layer in the configured split bearer. The UE_rx performs processing up to the RLC in the configured split bearer on the data received from the eNB, and transfers the data subjected to the RLC processing to the PDCP of PC5.

In this manner, the split bearer is also provided between the eNB and the UE_rx, and communication using the split bearer is separated from other communication in the UE_rx. With this, whether or not the data received from the eNB is data subjected to packet duplication in the PDCP of PC5 of the UE_tx can be judged in the RLC layer of the receiver of Uu of the UE_rx.

The PDCP of PC5 of the UE_rx releases the concealment processing performed in the PDCP of the UE_tx, and detects redundancy between the data for V2V transmission transmitted from the eNB and the data for V2V transmission transmitted in PC5 from the UE_tx by using the SN of the PDCP. Redundant data is discarded. Non-redundant data is transmitted to a higher layer.

As another method, the UE_tx may provide information indicating the V2V communication use in input of the RLC of Uu (RLC SDU) or output of the PDCP of PC5 (PDCP PDU). The eNB can judge whether or not the data is for the V2V communication in the RLC or between the RLC and the PDCP of Uu of the receiver, by using the information indicating the V2V communication use. Further, in this manner, in the UE_rx as well, whether or not the data is data subjected to packet duplication can be judged in the RLC or between the RLC and the PDCP of Uu.

Figure 52:
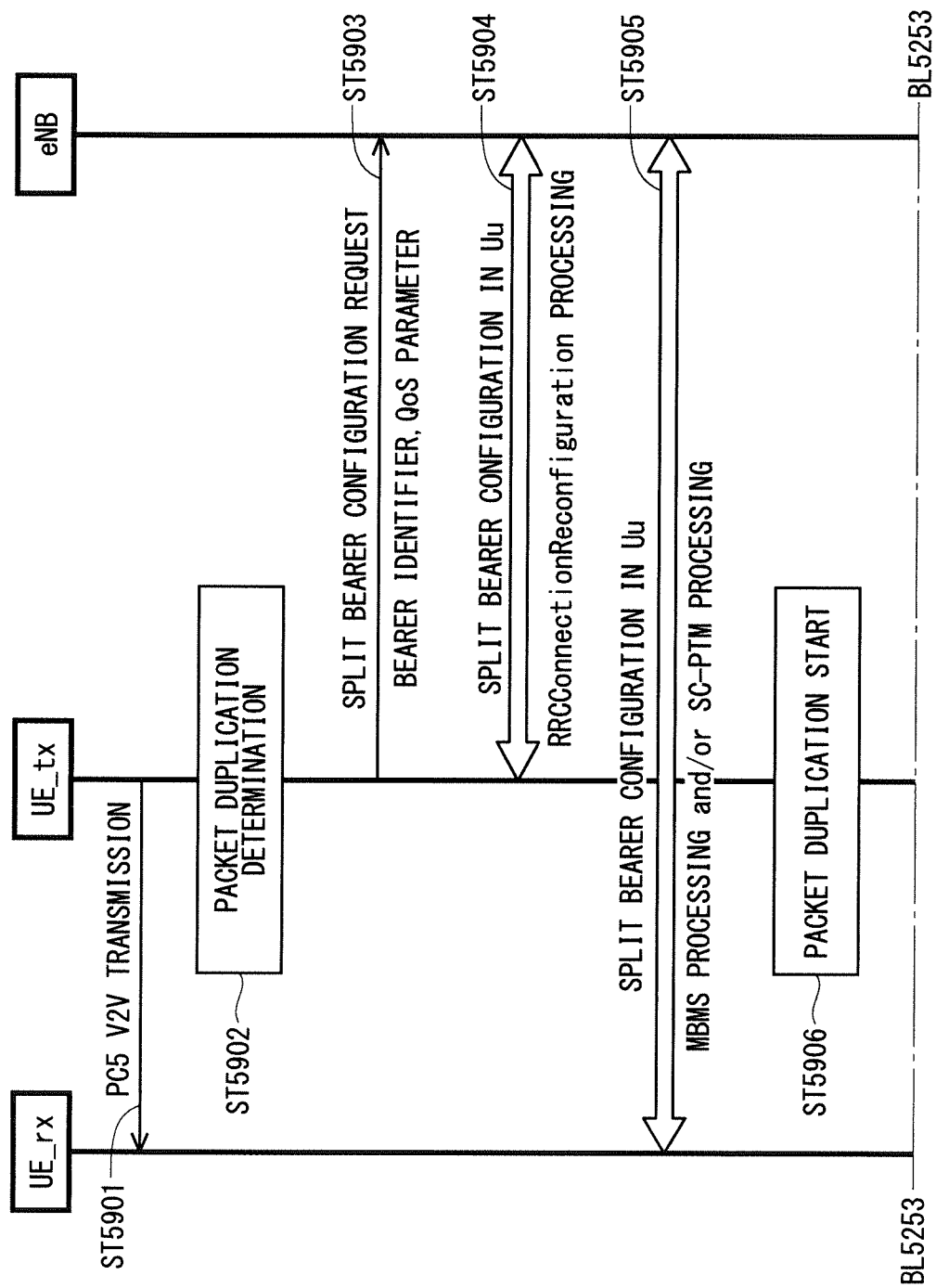
FIG. 52 is a diagram illustrating an example of a sequence for split bearer configuration according to the second modification of the sixth embodiment.
Figure 53:
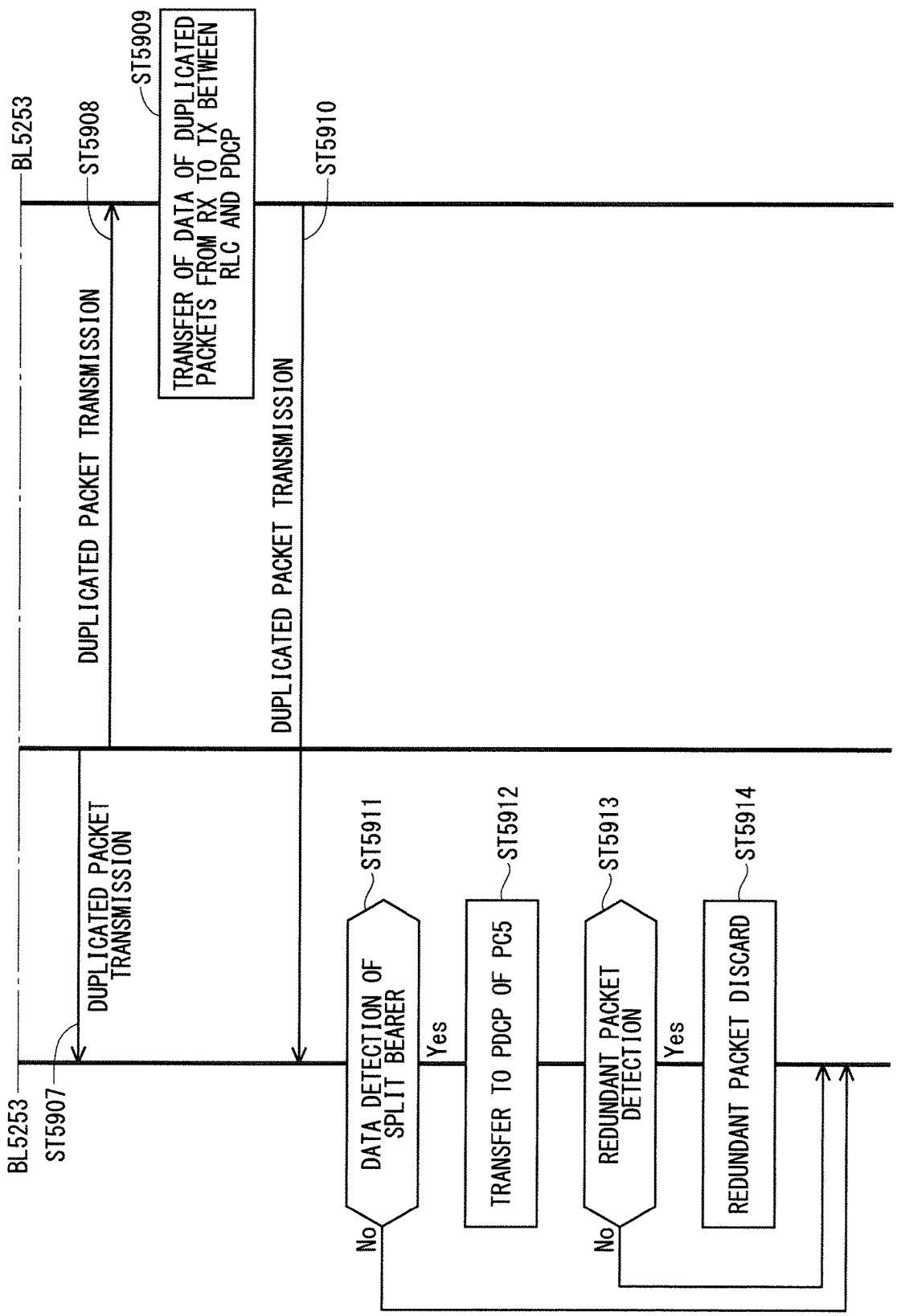
FIG. 53 is a diagram illustrating an example of a sequence for split bearer configuration according to the second modification of the sixth embodiment.

FIG. 52 and FIG. 53 are each a diagram illustrating an example of a sequence for split bearer configuration according to the second modification of the sixth embodiment. FIG. 52 and FIG. 53 are connected at the position of the boundary line BL5253. Packet duplication is performed by using a configured split bearer.

In Step ST5901, V2V communication in PC5 is performed between the UE_tx and the UE_rx. In Step ST5902, the UE_tx determines whether or not packet duplication is performed. As a determination method of packet duplication, the method disclosed in the sixth embodiment may be applied. The eNB may determine whether or not packet duplication is to be executed. The method disclosed in the sixth embodiment may be applied.

The UE_tx that has determined execution of packet duplication in Step ST5902 notifies the eNB of a split bearer configuration request in Step ST5903. In the request, information such as an identifier of a bearer, a QoS indicator, and a load amount of SL resources may be included. The QoS indicator may be information as described above. The request may be notified by using RRC signaling, or may be notified by using MAC signaling. Alternatively, the request may be included in UCI so as to be notified by using the PUCCH.

In Step ST5904, split bearer configuration is performed in Uu between the eNB and the UE_tx. The configuration may be notified by using RRC signaling, or may be notified by using MAC signaling. Alternatively, the configuration may be included in DCI so as to be notified by using the PDCCH. When RRC signaling is used, RRCConnectionReconfiguration being an existing RRC message may be used. This eliminates the necessity of providing a new message, and can thus facilitate control.

In Step ST5905, split bearer configuration is performed in Uu between the eNB and the UE_rx. For example, configuration of MBMS communication and SC-PTM communication may be performed for the DL. The configuration may be notified by using RRC signaling, or may be notified by using MAC signaling. Alternatively, the configuration may be included in DCI so as to be notified by using the PDCCH.

When configuration of MBMS communication and SC-PTM communication is performed, the eNB may perform bearer configuration for MBMS communication and SC-PTM communication with the core network.

The UE_tx that has performed the split bearer configuration in Uu starts packet duplication in Step ST5906. The UE_tx performs duplication of data in the PDCP layer of PC5, and splits the duplicated data into the RLC of PC5 and the RLC of Uu. The UE_tx performs duplication of data in the packet duplication layer, transmits a piece of the duplicated data to the UE_rx by using PC5 in Step ST5907, and transmits the other piece of the duplicated data to the eNB by using Uu in Step ST5908.

In Step ST5909, the eNB performs packet detection for V2V communication on the data received from the UE_tx in the RLC or between the RLC and the PDCP. The eNB detects whether or not the received data is data for V2V communication, by using the information indicating the V2V use or the V2X use. The detection may be performed by judging whether or not communication is communication using the split bearer. When the data is the data for V2V communication, the eNB transfers the data from the RLC of the receiver of Uu to the RLC of the transmitter. In Step ST5910, the eNB transmits the transferred duplicated data to the UE_rx.

In Step ST5911, the UE_rx performs detection of data for communication using the split bearer. The detection may be performed by judging whether or not data is data using the split bearer. The detection is performed in the RLC or between the RLC and the PDCP. When the data is the data using the split bearer, the UE_rx transfers the data to the PDCP layer of PC5 in Step ST5912. When the UE_rx judges that the communication is not the communication using the split bearer in Step ST5911, the UE_rx transmits the data to the IP layer and the application layer.

The UE_rx performs the detection and discard processing for the redundant data in the PDCP of PC5. In Step ST5913, the UE_rx detects whether or not the data transferred from Uu and the data received from the UE_tx are redundant, by using the SN provided in the PDCP layer of the UE_tx. When those pieces of data are redundant, in Step ST5914, the data received the latest is discarded. The data received first and non-redundant data are transmitted to the IP layer and the application layer.

In this manner, the UE_rx becomes capable of receiving data for V2V communication that has been subjected to packet duplication in the UE_tx.

The UE_tx may determine whether or not packet duplication is to be ended. As a determination method, the method disclosed in the sixth embodiment may be applied. The eNB may determine whether or not packet duplication is to be ended. The method disclosed in the sixth embodiment may be applied.

By adopting the method as disclosed in the second modification of the sixth embodiment, effects similar to those described in the first modification of the sixth embodiment can be obtained. Further, in the eNB, duplicated packet data is transferred from the receiver to the transmitter in the RLC or between the RLC and the PDCP, and thus processing time can be reduced. Delay time of PC5-based V2V communication can further be reduced. Therefore, throughput at the time of packet duplication operation can be enhanced.

Further, in the provision processing and the concealment processing of the SN in the PDCP of the UE_tx, conventional processing can be used. Therefore, processing in the PDCP of the UE_tx can be facilitated. Further, occurrence of malfunction can be reduced.

Further, in the method as disclosed in the second modification of the sixth embodiment, packet duplication is performed in the PDCP. Thus, the method as disclosed in the second modification of the sixth embodiment may also be applied to packet duplication using V2V communication via the base station (gNB) in NR and the base station in LTE connected to a 5G core network. Effects similar to the above can be obtained.

In the base station, detection and transfer of the data for V2V communication may be performed in a layer lower than the layer in which packet duplication is performed. In this case, although it is disclosed that the UE_tx provides information indicating the V2V use or the V2X use, provision of information need not be performed. It is only necessary that the V2V use and the V2X use can be identified.

For example, the UE_tx uses different logical channels for the V2V communication use and the V2X communication use. The base station judges which logical channel of the V2V communication use or the V2X communication use is used in the MAC layer or between the MAC layer and the RLC layer, and performs detection and transfer of the data for V2V communication.

For example, the UE_tx uses different logical channels for the V2V communication use and the V2X communication use. Further, the base station or the UE_tx uses different physical resources to which data is mapped for the V2V communication use and the V2X communication use, in accordance with the logical channels. The base station judges to which physical resources of the V2V communication use or the V2X communication use the data is mapped in the PHY layer, and performs detection and transfer of the data for V2V communication.

In this manner, by enabling identification of the V2V use and the V2X use, the base station becomes capable of performing detection and transfer of the data for V2V communication in a layer lower than the layer in which packet duplication is performed, for example, the layers of the RLC, the MAC, and the PHY. In this manner, processing delay time in the base station can be reduced. Processing delay of Uu-based V2V communication can be reduced. Therefore, packet duplication using PC5-based V2V communication and Uu-based V2V communication can be performed with a low delay, and enhancement of reliability and enhancement of throughput can be achieved.

Because delay time of Uu-based V2V communication is reduced, higher priority may be given to the data for V2V communication than other communication. Further, because delay time of Uu-based V2V communication is reduced, the number of times of retransmission of the HARQ supported in Uu may be reduced. Further, in Uu-based V2V communication, a transmission mode in the RLC may be a mode without an ARQ. Further, in the description above, the use is the V2V communication use. However, the use may be limited to the packet duplication use. In this manner, delay time of Uu-based V2V communication or delay time in packet duplication can be reduced.

In 3GPP, operation of a roadside unit (RSU) is studied for the V2X communication use. The RSU includes a base station-type RSU having a function of the base station and a UE-type RSU having a function of the UE. The UE according to the method disclosed in the sixth embodiment to the second modification of the sixth embodiment may be the UE-type RSU. Further, the base station according to the method disclosed in the sixth embodiment to the second modification of the sixth embodiment may be the base station-type RSU. Similar effects can be obtained.

In V2V communication, a method for connecting the UE and the base station via the UE-type RSU is studied. For example, the UE_tx transmits data for V2V communication to the UE-type RSU, the UE-type RSU transmits the data to the base station, the base station transmits the data to another UE-type RSU, and the another UE-type RSU transmits the data to the UE_rx.

Also in such a case, the method disclosed in the sixth embodiment to the second modification of the sixth embodiment may be applied. The UE-type RSU is used, and thus detection and transfer of the data for V2V communication is required in the UE-type RSU. The function may be applied to the method disclosed in the sixth embodiment to the second modification of the sixth embodiment. The detection and transfer for the data for V2V communication may be performed in a layer appropriate for each method.

In this manner, in V2V communication, V2V communication via the UE-type RSU is enabled, and packet duplication using PC5-based V2V communication and Uu-based V2V communication is enabled.

The first modification and the second modification of the sixth embodiment disclose that data for PC5-based V2V communication of the UE_tx is subjected to packet duplication. Packet duplication may be applied to data for Uu-based V2V communication of the UE_tx. The method disclosed in the first modification and the second modification of the sixth embodiment may be applied as appropriate. Similar effects can be obtained owing to packet duplication.

The embodiments and the modifications are mere exemplifications of the present invention, and can be freely combined within the scope of the present invention. The arbitrary constituent elements of the embodiments and the modifications can be appropriately modified or omitted.

For example, a subframe in the embodiments and the modifications is an example time unit of communication in the fifth generation base station communication system. The slot may be configured per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

EXPLANATION OF REFERENCE SIGNS 200 communication system, 202 communication terminal device, 203 base station device.

The invention claimed is:

1. A user apparatus in a communication system comprising the user apparatus; and a plurality of base stations configured to wirelessly communicate with the user apparatus, the user apparatus comprising:
a processor communicating with the plurality of base stations,
wherein the plurality of base stations include a master node and a secondary node that support dual connectivity for the user apparatus,
the processor of the user apparatus receives from the master node Radio Resource Control (RRC) signaling including information related to usage of a split Signal Radio Bearer (SRB) or usage of an SRB3 in a procedure for adding or modifying the secondary node,
the processor of the user apparatus determines which of the split SRB and the SRB3 is configured,
in a case in which the split SRB is configured in a state of Master Cell Group (MCG) failure, the processor of the user apparatus transmits information related to the MCG failure to the master node via the secondary node using the split SRB, and receives an RRC Reconfiguration using the split SRB from the master node via the secondary node and
in a case in which the split SRB is not configured and the SRB3 is configured in a state of the MCG failure, the processor of the user apparatus transmits the information related to the MCG failure to the secondary node using the SRB3, and receives an RRC Reconfiguration from the secondary node using the SRB3.

2. The user apparatus according to claim 1, wherein the processor of the user apparatus receives an RRC Release transmitted using the split SRB from the master node via the secondary node.

3. The user apparatus according to claim 1, wherein the secondary node transmits a request for releasing the secondary node to the master node.

4. The user apparatus according to claim 1, wherein the processor of the user apparatus transmits a response for the RRC Reconfiguration to the secondary node.

5. The user apparatus according to claim 1, wherein the processor of the user apparatus performs configuration related to change of a role of the master node and the secondary node, using the received RRC Reconfiguration.

6. A base station in a communication system comprising a user apparatus; and a plurality of base stations configured to wirelessly communicate with the user apparatus, the base station comprising:
a processor communicating with the user apparatus,
wherein the plurality of base stations include a master node and a secondary node that support dual connectivity for the user apparatus,
the processor of the base station operates the base station as the secondary node,
the processor of the base station transmits to the user apparatus Radio Resource Control (RRC) signaling including information related to usage of a split Signal Radio Bearer (SRB) or usage of an SRB3 in a procedure for adding or modifying the secondary node,
the processor of the user apparatus determines which of the split SRB and the SRB3 is configured,
in a case in which the split SRB is configured in a state of Master Cell Group (MCG) failure, the processor of the base station receives from the user apparatus information related to the MCG failure using the split SRB, transmits the information related to the MCG failure using the split SRB to the master node, receives an RRC Reconfiguration from the master node using the split SRB, and transmits to the user apparatus the RRC Reconfiguration using the split SRB, and
in a case in which the split SRB is not configured and the SRB3 is configured in a state of the MCG failure, the processor of the base station receives the information related to the MCG failure from the user apparatus using the SRB3, and transmits an RRC Reconfiguration to the user apparatus using the SRB3.

7. A communication system comprising a user apparatus; and a plurality of base stations configured to wirelessly communicate with the user apparatus, the user apparatus comprising:
a processor communicating with the plurality of base stations,
wherein the plurality of base stations include a master node and a secondary node that support dual connectivity for the user apparatus,
the processor of the user apparatus receives from the master node Radio Resource Control (RRC) signaling including information related to usage of a split Signal Radio Bearer (SRB) or usage of an SRB3 in a procedure for adding or modifying the secondary node,
the processor of the user apparatus determines which of the split SRB and the SRB3 is configured,
in a case in which the split SRB is configured in a state of Master Cell Group (MCG) failure, the processor of the user apparatus transmits information related to the MCG failure to the master node via the secondary node using the split SRB, and receives an RRC Reconfiguration using the split SRB from the master node via the secondary node, and
in a case in which the split SRB is not configured and the SRB3 is configured in a state of the MCG failure, the processor of the user apparatus transmits the information related to the MCG failure to the secondary node using the SRB3, and receives an RRC Reconfiguration from the secondary node using the SRB3.

* * * * *